United States Patent
Li et al.

(10) Patent No.: US 11,412,544 B2
(45) Date of Patent: Aug. 9, 2022

(54) METHOD AND APPARATUS FOR CONFIGURATION OF A RACH OCCASION IN NR UNLICENSED

(71) Applicant: Samsung Electronics Co., Ltd., Suwon-si (KR)

(72) Inventors: Yingzhe Li, Mountain View, CA (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 16/798,045

(22) Filed: Feb. 21, 2020

(65) Prior Publication Data
US 2020/0275483 A1 Aug. 27, 2020

Related U.S. Application Data

(60) Provisional application No. 62/838,014, filed on Apr. 24, 2019, provisional application No. 62/818,474, (Continued)

(51) Int. Cl.
*H04W 74/08* (2009.01)
*H04W 72/04* (2009.01)
(Continued)

(52) U.S. Cl.
CPC ....... *H04W 74/0808* (2013.01); *H04L 5/0092* (2013.01); *H04L 27/2607* (2013.01); *H04W 72/042* (2013.01); *H04W 72/0446* (2013.01)

(58) Field of Classification Search
None
See application file for complete search history.

(56) References Cited

U.S. PATENT DOCUMENTS 10,716,148 B2 7/2020 Kim et al.
2017/0331577 A1* 11/2017 Parkvall ............... H04L 5/1469
(Continued)

FOREIGN PATENT DOCUMENTS

KR 10-2018-0102515 A 9/2018

OTHER PUBLICATIONS

Notification of Transmittal of the International Search Report and the Written Opinion of the International Searching Authority, or the Declaration dated Jun. 4, 2020 in connection with International Patent Application No. PCT/KR2020/002800, 10 pages.
(Continued)

*Primary Examiner* — Phirin Sam
*Assistant Examiner* — Faiyazkhan Ghafoerkhan

(57) ABSTRACT

A method and apparatus of user equipment (UE) in a wireless communication system supporting a shared spectrum channel access is provided. The method and apparatus comprises: receiving, from a base station (BS), a physical downlink control channel (PDCCH) including downlink control information (DCI); determining, based on the received DCI, time domain resource allocation information of a random access channel (RACH) occasion and channel sensing information; performing channel sensing on an uplink (UL) channel based on the determined channel sensing information; identifying a status of the UL channel based on a result of the channel sensing on the UL channel; and transmitting, to the BS, a physical random access channel (PRACH) preamble over the UL channel based on the determined time domain resource allocation information and the identified status of the UL channel.

17 Claims, 27 Drawing Sheets

Related U.S. Application Data filed on Mar. 14, 2019, provisional application No. 62/811,288, filed on Feb. 27, 2019.

(51) Int. Cl.
*H04L 27/26* (2006.01)
*H04L 5/00* (2006.01)

(56) References Cited

U.S. PATENT DOCUMENTS

| | | | |
|---|---|---|---|
| 2017/0331670 A1* | 11/2017 | Parkvall | H04B 7/0695 |
| 2018/0110057 A1* | 4/2018 | Park | H04B 7/0452 |
| 2018/0183551 A1* | 6/2018 | Chou | H04W 72/1268 |
| 2019/0053271 A1* | 2/2019 | Islam | H04W 74/0866 |
| 2019/0124688 A1* | 4/2019 | Golitschek Edler von Elbwart | H04W 72/1284 |
| 2019/0141734 A1* | 5/2019 | Lei | H04W 72/0453 |
| 2020/0120482 A1* | 4/2020 | Parkvall | H04L 5/1469 |
| 2020/0221308 A1* | 7/2020 | Liao | H04W 74/0833 |
| 2020/0221506 A1* | 7/2020 | Jeon | H04W 74/0833 |
| 2020/0314902 A1* | 10/2020 | Sun | H04W 74/0808 |
| 2021/0274555 A1* | 9/2021 | Alfarhan | H04W 74/0808 |

OTHER PUBLICATIONS

TCL Communications, "Discussion on multiplexing issues for configured grants in NR-U", 3GPP TSG RAN WG1 #96, Feb. 25-Mar. 1, 2019, R1-1902543, 6 pages.

"3rd Generation Partnership Project; Technical Specification Group Radio Access Network; NR; Physical channels and modulation (Release 15)", 3GPP TS 38.211 V15.4.0, Dec. 2018, 96 pages.

"3rd Generation Partnership Project; Technical Specification Group Radio Access Network; NR; Multiplexing and channel coding (Release 15)", 3GPP TS 38.212 V15.4.0, Dec. 2018, 100 pages.

"3rd Generation Partnership Project; Technical Specification Group Radio Access Network; NR; Physical layer procedures for control (Release 15)" 3GPP TS 38.213 V15.4.0, Dec. 2018, 104 pages.

"3rd Generation Partnership Project; Technical Specification Group Radio Access Network; NR; Physical layer procedures for data (Release 15)", 3GPP TS 38.214 V15.4.0, Dec. 2018, 102 pages.

"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.

"5GHz RLAN; Harmonised Standard covering the essential requirements of article 3.2 of Directive 2014/53/EU", ETSI EN 301 893 V2.1.1, May 2017, 135 pages.

"Multiple-Gigabit/s radio equipment operating in the 60 GHz band; Harmonised Standard covering the essential requirements of article 3.2 of Directive 2014/53/EU", ETSI EN 302 567 V2.1.1, Jul. 2017, 40 pages.

"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 87 pages.

IEEE Std 802.11-2016, "Part 11: Wireless LAN Medium Access Control (MAC) and Physical Layer (PHY) Specifications", 2016, 3534 pages.

Extended European Search Report dated Apr. 4, 2022 regarding Application No. 20763449.4, 6 pages.

LG Electronics, "Initial access and mobility for NR-U", 3GPP TSG RAN WG1 #96, R1-1902041, Feb. 2019, 22 pages.

Intel Corporation, "Enhancements to initial access and mobility for NR-unlicensed", 3GPP TSG RAN WG1 Meeting #95, R1-1812483, Nov. 2018, 6 pages.

\* cited by examiner

METHOD AND APPARATUS FOR CONFIGURATION OF A RACH OCCASION IN NR UNLICENSED

CROSS-REFERENCE TO RELATED APPLICATIONS AND CLAIM OF PRIORITY

The present application claims priority to:
U.S. Provisional Patent Application Ser. No. 62/811,288, filed on Feb. 27, 2019;
U.S. Provisional Patent Application Ser. No. 62/818,474, filed on Mar. 14, 2019; and
U.S. Provisional Patent Application Ser. No. 62/838,014, filed on Apr. 24, 2019. The content of the above-identified patent document is incorporated herein by reference.

TECHNICAL FIELD

The present application relates generally to wireless communication systems, more specifically, the present disclosure relates to configuration of a RACH occasion in NR unlicensed through discovery reference signals.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for a configuration of RACH occasion in NR unlicensed through discovery reference signal.

In one embodiment, a user equipment (UE) in a wireless communication system supporting a shared spectrum channel access is provided. The UE comprises at least one transceiver configured to receive, from a base station (BS), a physical downlink control channel (PDCCH) including downlink control information (DCI). The UE further comprises at least one processor operably connected to the at least one transceiver, the at least one processor configured to: determine, based on the received DCI, time domain resource allocation information of a random access channel (RACH) occasion and channel sensing information, perform channel sensing on an uplink (UL) channel based on the determined channel sensing information, and identify a status of the UL channel based on a result of the channel sensing on the UL channel. The at least one transceiver is further configured to transmit, to the BS, a physical random access channel (PRACH) preamble over the UL channel based on the determined time domain resource allocation information and the identified status of the UL channel.

In another embodiment, a base station (BS) in a wireless communication system supporting a shared spectrum channel access is provided. The BS comprises at least one processor configured to determine time domain resource allocation information of a random access channel (RACH) occasion and channel sensing information. The BS further comprises at least one transceiver operably connected to the at least one processor, the at least one transceiver configured to: transmit, to a user equipment (UE), a physical downlink control channel (PDCCH) including downlink control information (DCI), wherein the DCI includes the time domain resource allocation information of the RACH occasion and the channel sensing information; and receive, from the UE, a physical random access channel (PRACH) preamble over an uplink (UL) channel based on the time domain resource allocation information and a status of the UL channel. Channel sensing on the UL channel is performed, by the UE, based on the channel sensing information, and the status of the UL channel is determined, by the UE, based on a result of the channel sensing on the UL channel.

In yet another embodiment, a method of user equipment (UE) in a wireless communication system supporting a shared spectrum channel access is provided. The method comprises: receiving, from a base station (BS), a physical downlink control channel (PDCCH) including downlink control information (DCI); determining, based on the received DCI, time domain resource allocation information of a random access channel (RACH) occasion and channel sensing information; performing channel sensing on an uplink (UL) channel based on the determined channel sensing information; identifying a status of the UL channel based on a result of the channel sensing on the UL channel; and transmitting, to the BS, a physical random access channel (PRACH) preamble over the UL channel based on the determined time domain resource allocation information and the identified status of the UL channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 33, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation;" 3GPP TS 38.212 v15.4.0, "NR; Multiplexing and Channel coding;" 3GPP TS 38.213 v15.4.0, "NR; Physical Layer Procedures for Control;" 3GPP TS 38.214 v15.4.0, "NR; Physical Layer Procedures for Data;" 3GPP TS 38.331 v15.4.0, "NR; Radio Resource Control (RRC) Protocol Specification;" ETSI EN 301 893 V2.1.1, "5 GHz RLAN; Harmonized Standard covering the essential requirements of article 3.2 of Directive 2014/53/EU", 2017; ETSI EN 302 567 V2.1.1, "Multiple-Gigabit/s radio equipment operating in the 60 GHz band; Harmonized Standard covering the essential requirements of article 3.2 of Directive 2014/53/EU," 2017; 3GPP TR 36.889 V13.0.0, "Study on Licensed-Assisted Access to Unlicensed Spectrum," 2015; and IEEE Std 802.11-2016, "Part 11: Wireless LAN Medium Access Control (MAC) and Physical Layer (PHY) Specifications," 2016.

Figure 1:
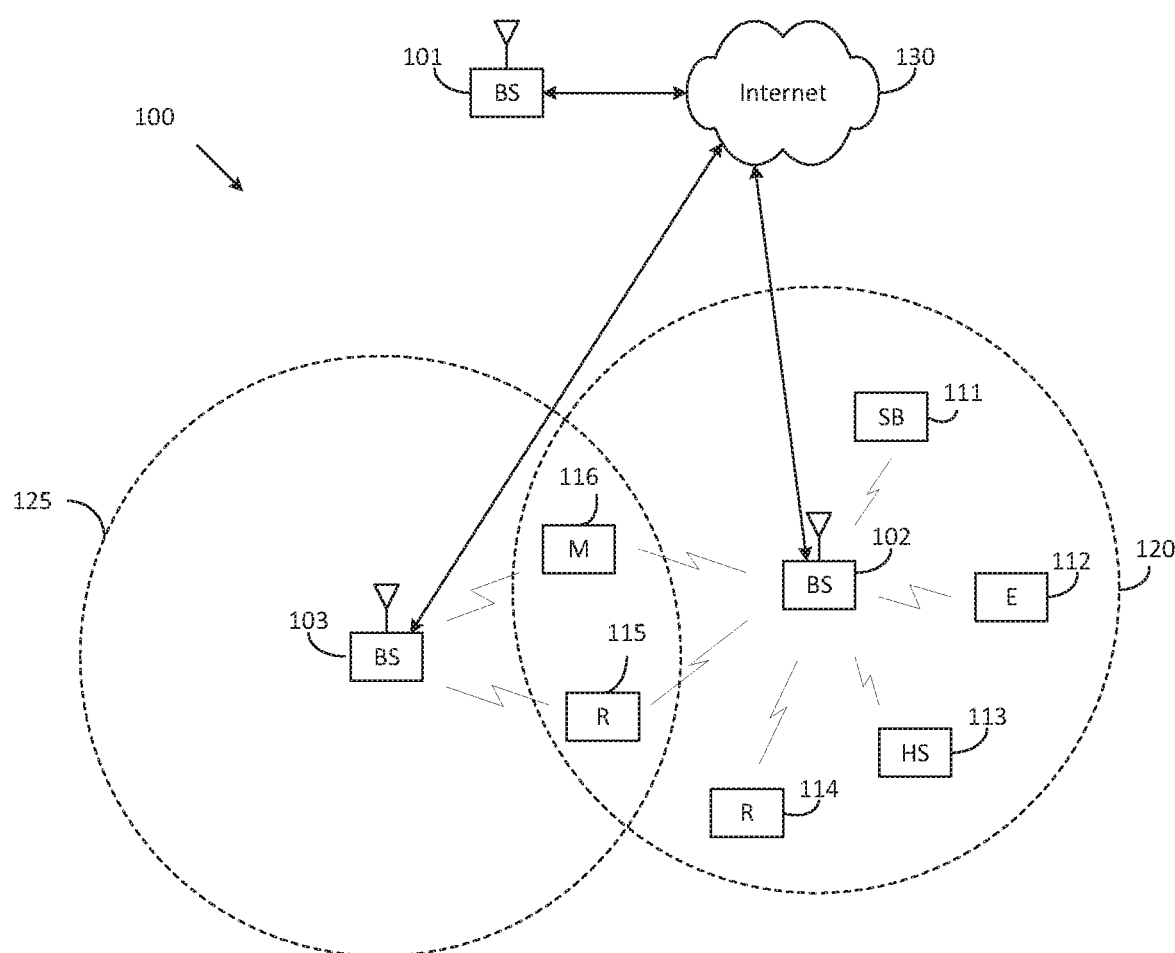
FIG. 1 illustrates an example wireless network according to embodiments of the present disclosure.
Figure 2:
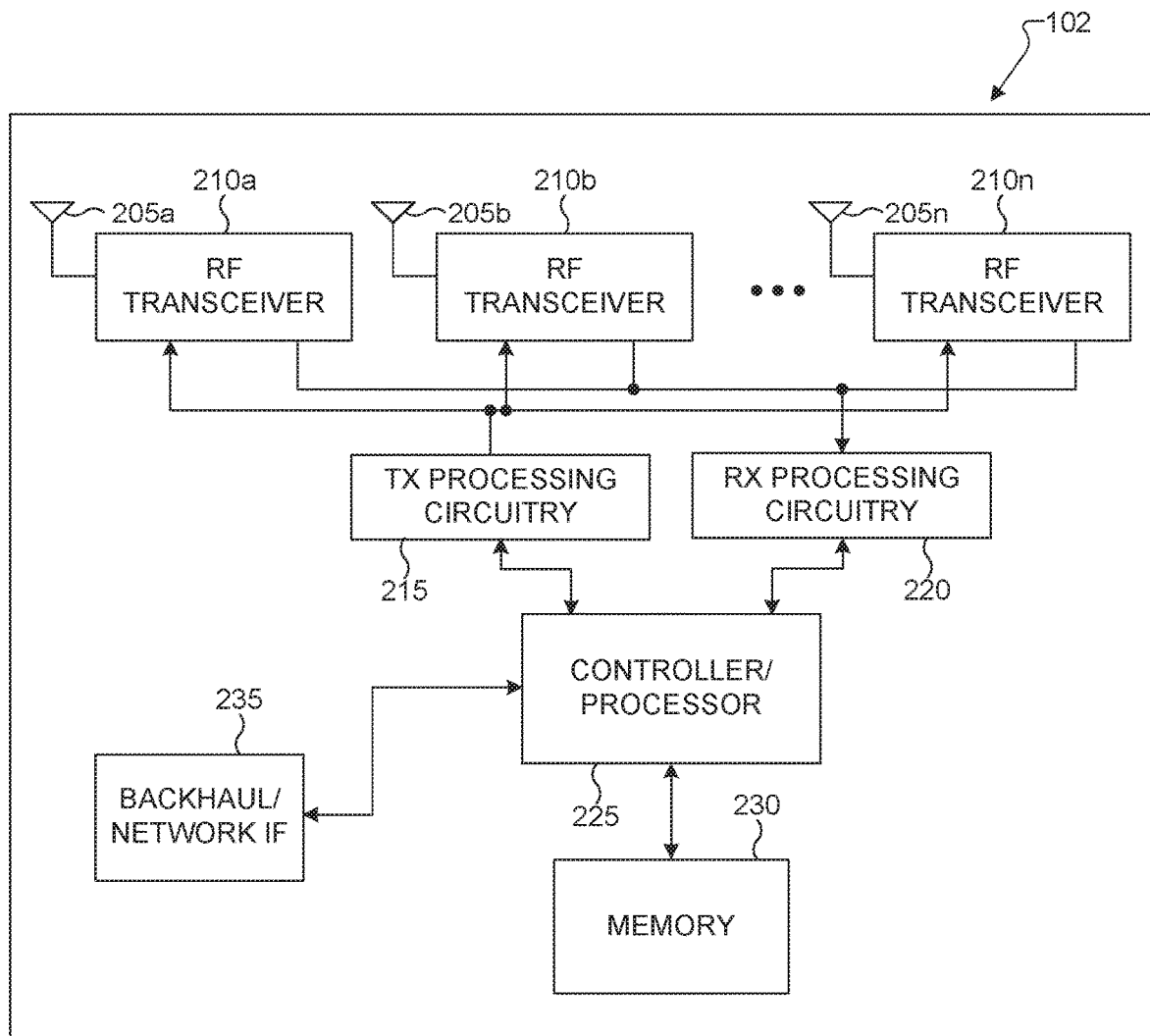
FIG. 2 illustrates an example gNB according to embodiments of the present disclosure.
Figure 3:
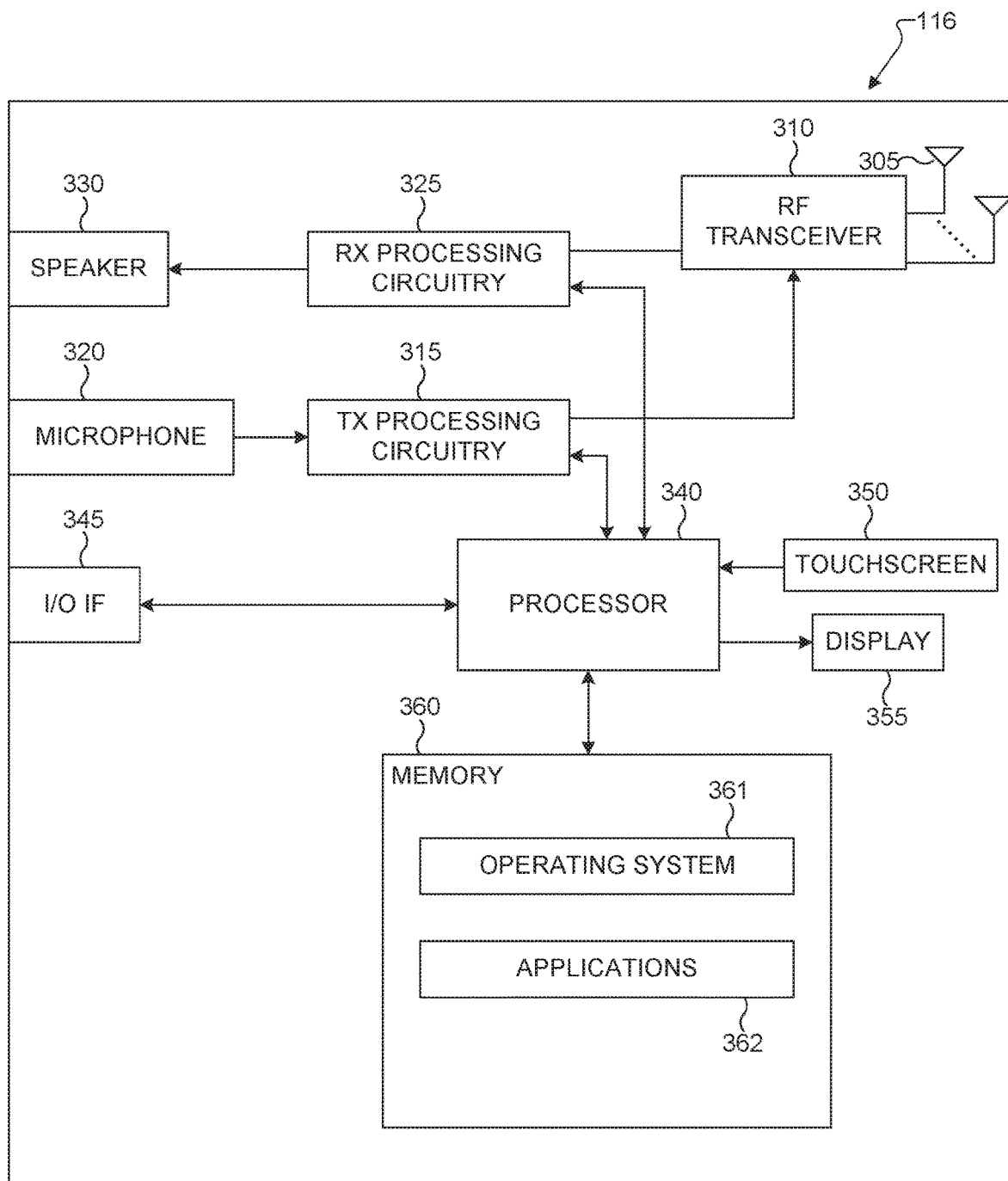
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient configuration of RACH occasion in NR unlicensed through discovery reference signal.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
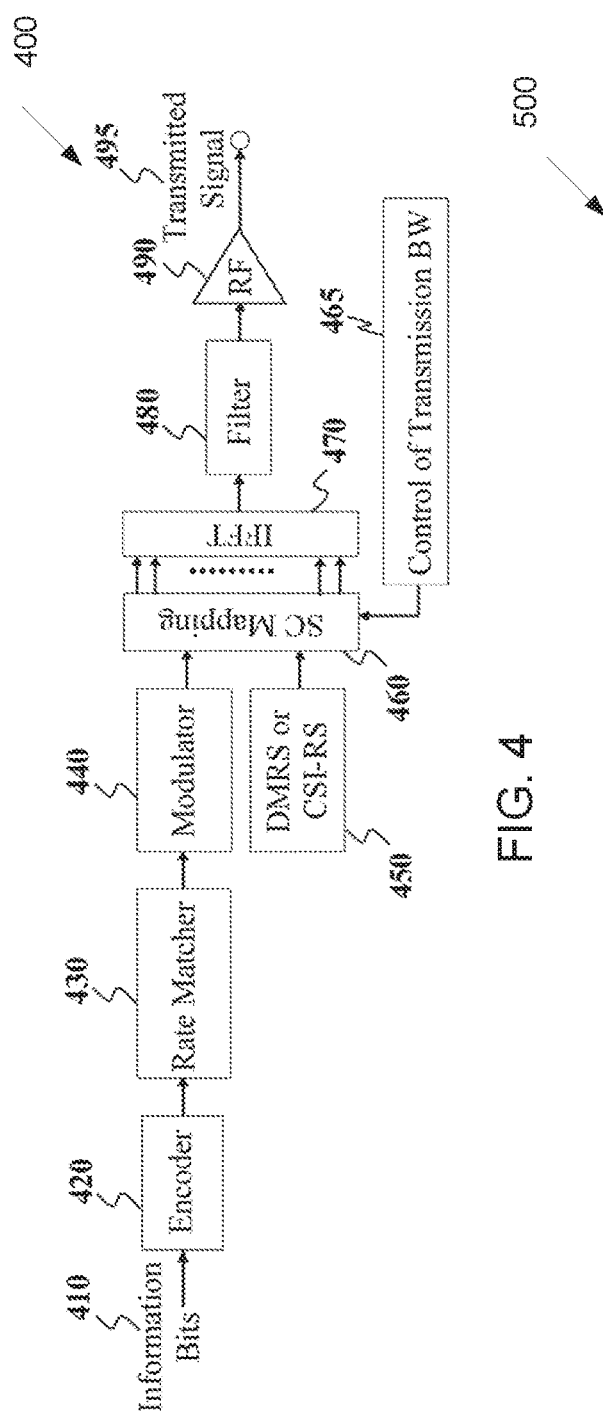
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by a radio frequency (RF) unit 495.

Figure 5:
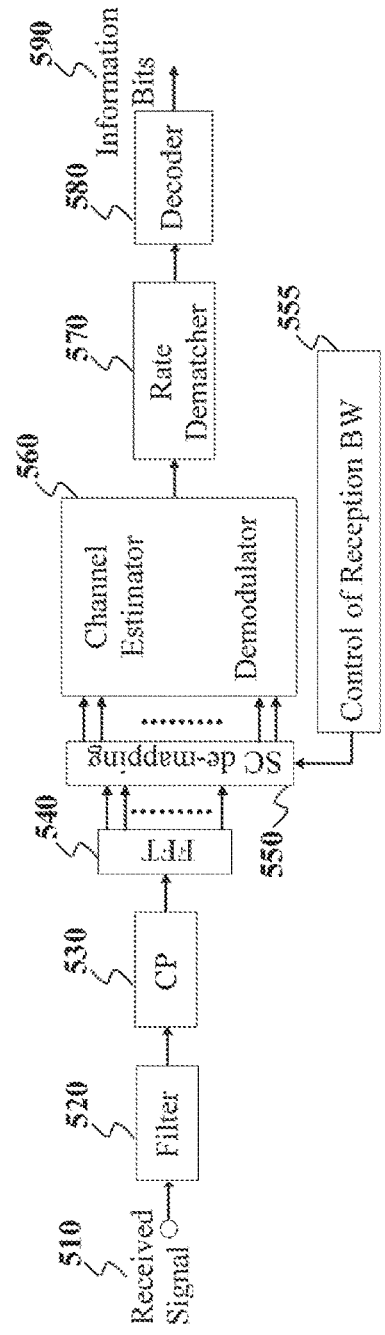
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
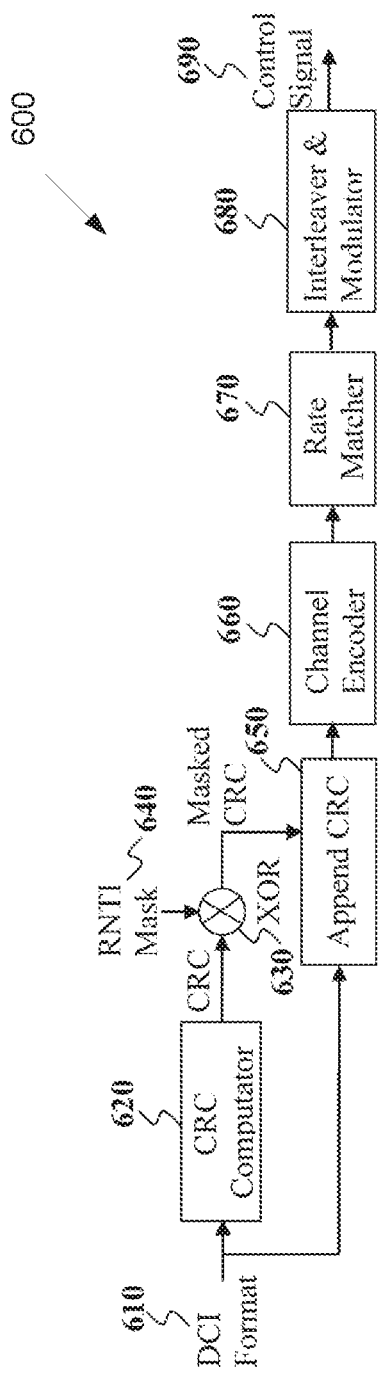
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
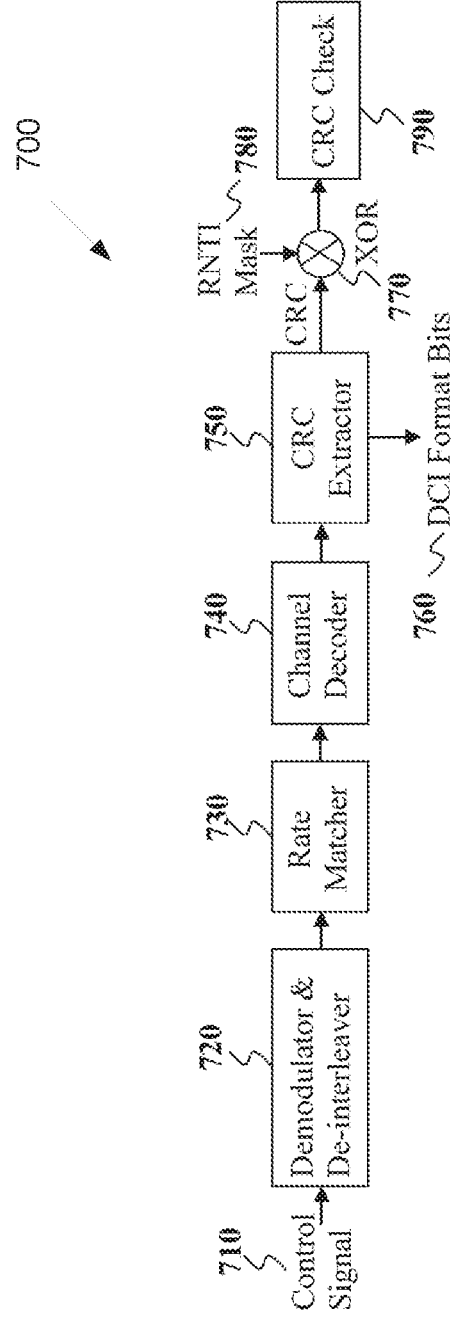
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

Figure 8:
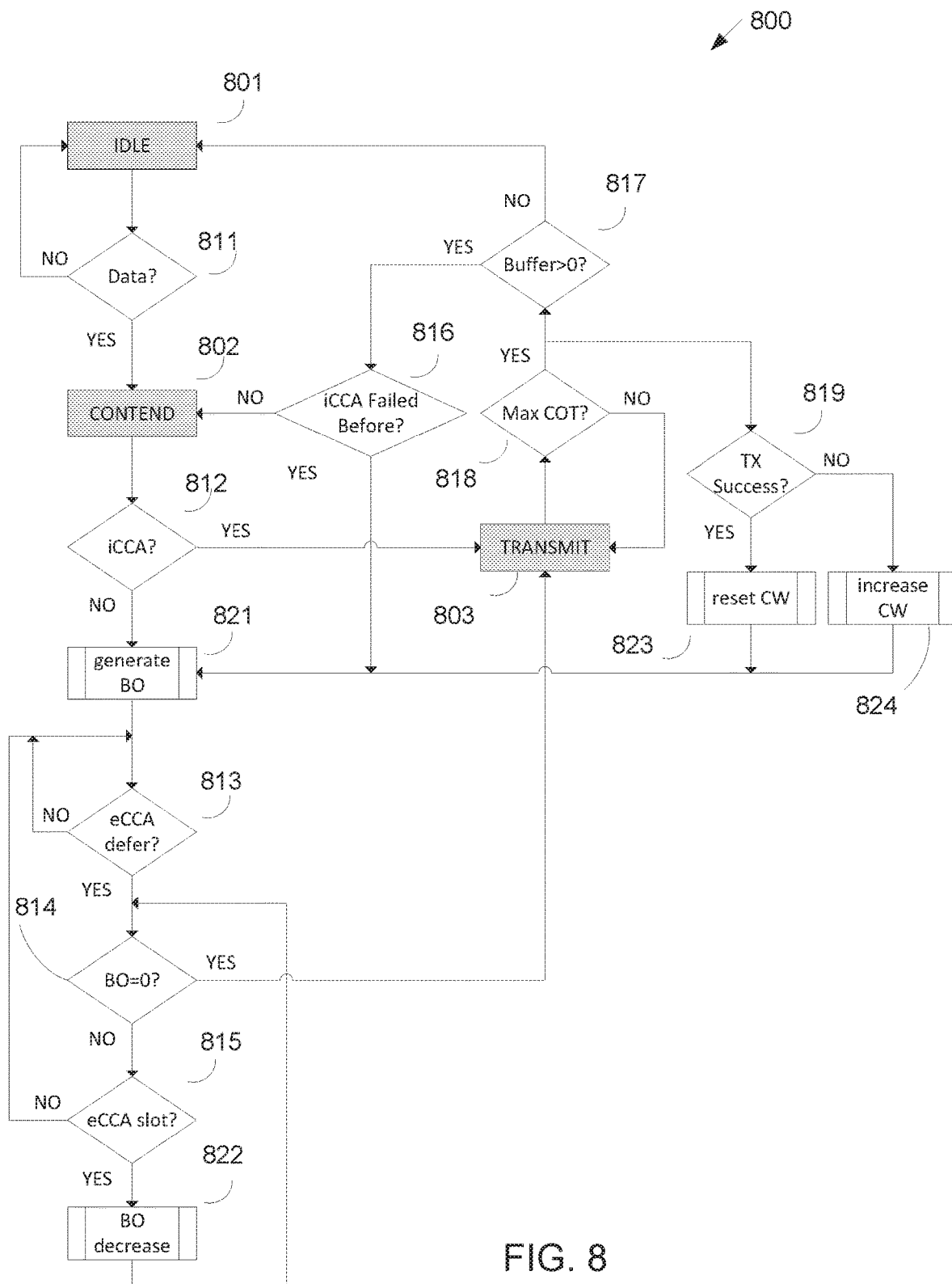
FIG. 8 illustrates an example channel access procedure according to embodiments of the present disclosure.

FIG. 8 illustrates an example channel access procedure 800 according to embodiments of the present disclosure. An embodiment of the channel access procedure 800 shown in FIG. 8 is for illustration only. FIG. 8 does not limit a scope of the present disclosure.

In 3GPP standard specification, it is agreed that the downlink transmission including physical downlink shared channel (PDSCH) on a LAA carrier follows the category 4 listen-before-talk (Cat4 LBT) procedures (a flow chart is illustrated in FIG. 8). An eNB first stays in IDLE state (801). Depending on whether there is data traffic (811) or not, the gNB transfers to CONTEND state (802) or stays in IDLE state (801), respectively. The eNB first performs initial CCA (iCCA), where the eNB senses the channel the slot durations of a defer duration (812). If the channel is sensed as clear in the iCCA, the gNB begins to transmit (803); otherwise, the gNB generates a backoff (BO) counter (821) and perform extended CCA (eCCA). The eNB can start transmission after BO counter achieves 0 (814) as in step 4), wherein the BO counter is adjusted by sensing the channel for additional slot duration(s) according to the steps below: 1) set the counter as a random number (821) uniformly distributed between 0 and contention window size (CWS), and go to step 4; 2) if the counter is greater than 0, and the eNB chooses to decrement the counter, decrease the counter by 1 (822); 3) sense the channel for an additional slot duration, and if the additional slot duration is idle, go to step 4); else, go to step 5); 4) if the counter is 0 (814), stop; else, go to step 2). 5) sense the channel until either a busy slot is detected within an additional defer duration or all the slots of the additional defer duration are detected to be idle (815); 6) if the channel is sensed to be idle during all the slot durations of the additional defer duration, go to step 4); else, go to step 5).

The eNB can keep transmitting until the maximum channel occupancy is achieved (818). After the transmission, if the transmission is successful, the contention window size is reset (823); otherwise, the contention window size is increased (824). If the eNB still have data traffic after transmission (317), the eNB keeps contending the channel (802); otherwise, the eNB transfers to IDLE (801). If the eNB has not failed any iCCA before (816), the eNB can perform iCCA (812); otherwise, the gNB shall generate a BO counter (821) and perform eCCA (813).

In LTE-LAA standard specification, for transmission including physical downlink shared channel (PDSCH), or physical downlink control channel (PDCCH), or enhanced physical downlink control channel (EPDCCH), the channel access mechanism is based on LBE, which is also referred to as category-4 (CAT-4) LBT. Specifically, an LTE-LAA eNB can transmit after sensing the channel to be idle during the slot durations of a defer duration; and after the backoff counter (BO) is zero in step 4). An example of this channel access procedure it illustrated in FIG. 8 (e.g., it is also referred to as Cat4 LBT for this type of channel access procedure).

The backoff counter is adjusted by sensing the channel for additional slot duration(s) according to the steps below: (1) set the counter as a random number uniformly distributed between 0 and contention window (CW) value, and go to step 4; (2) if the counter is greater than 0, and the eNB chooses to decrement the counter, decrease the counter by 1; (3) sense the channel for an additional slot duration, and if the additional slot duration is idle, go to step 4; else, go to step 5; (4) if the counter is 0, stop; else, go to step 2; (5) sense the channel until either a busy slot is detected within an additional defer duration or all the slots of the additional defer duration are detected to be idle; and (6) if the channel is sensed to be idle during all the slot durations of the additional defer duration, go to step 4; else, go to step 5.

In addition, for LTE-LAA, a DL transmission burst containing the discovery reference signal (DRS) without PDSCH can be transmitted after sensing the channel idle for a fixed observation interval of at least 25 μs and if the duration of the transmission is less than 1 ms. Such an LBT operation of fixed sensing interval is also referred to as Cat2 LBT.

In NR standard specification, each synchronization and PBCH signal block (SS/PBCH block) compromises of one symbol for PSS, two symbols for PBCH, one symbol for SSS and PBCH, where the four symbols are mapped consecutively, and time division multiplexed.

For initial cell selection for NR cell, a UE assumes the default SS burst set periodicity as 20 ms, and for detecting non-standalone NR cell, a network provides one SS burst set periodicity information per frequency carrier to UE and information to derive measurement timing/duration if possible. Other than the MIB, the remaining minimum system information (RMSI) is carried by physical downlink shared channel (PDSCH) with scheduling info carried by the corresponding physical downlink control channel (PDCCH). Similar structure applies to other system information (OSI) and paging message. The control resource set (CORESET) for receiving common control channels, such as RMSI, is configured in content of PBCH.

In NR-U, the transmission of SS/PBCH blocks may also be subject to the sensing result of LBT, such that the UE cannot always expect to receive the SS/PBCH blocks periodically. To address the LBT uncertainty of SS/PBCH block transmissions in NR-U, a discovery reference signal and channel, which can be referred to as DRS for the rest of this invention, can be supported for NR-U. The DRS can contain SS/PBCH block(s), and configurable CORESET(s) and PDSCH(s) of RMSI, OSI, or paging, as well as configurable channel state indicator reference signal (CSI-RS).

In addition, for transmission of SS/PBCH blocks in NR-U DRS, a DRS transmission timing configuration (short for DTTC) method can be considered for NR-U, wherein the configuration contains a window periodicity, a window duration, and a window offset. The DRS can be subject to a single-shot LBT of fixed duration (e.g., 25 μs for FR1 NR-U).

Figure 9:
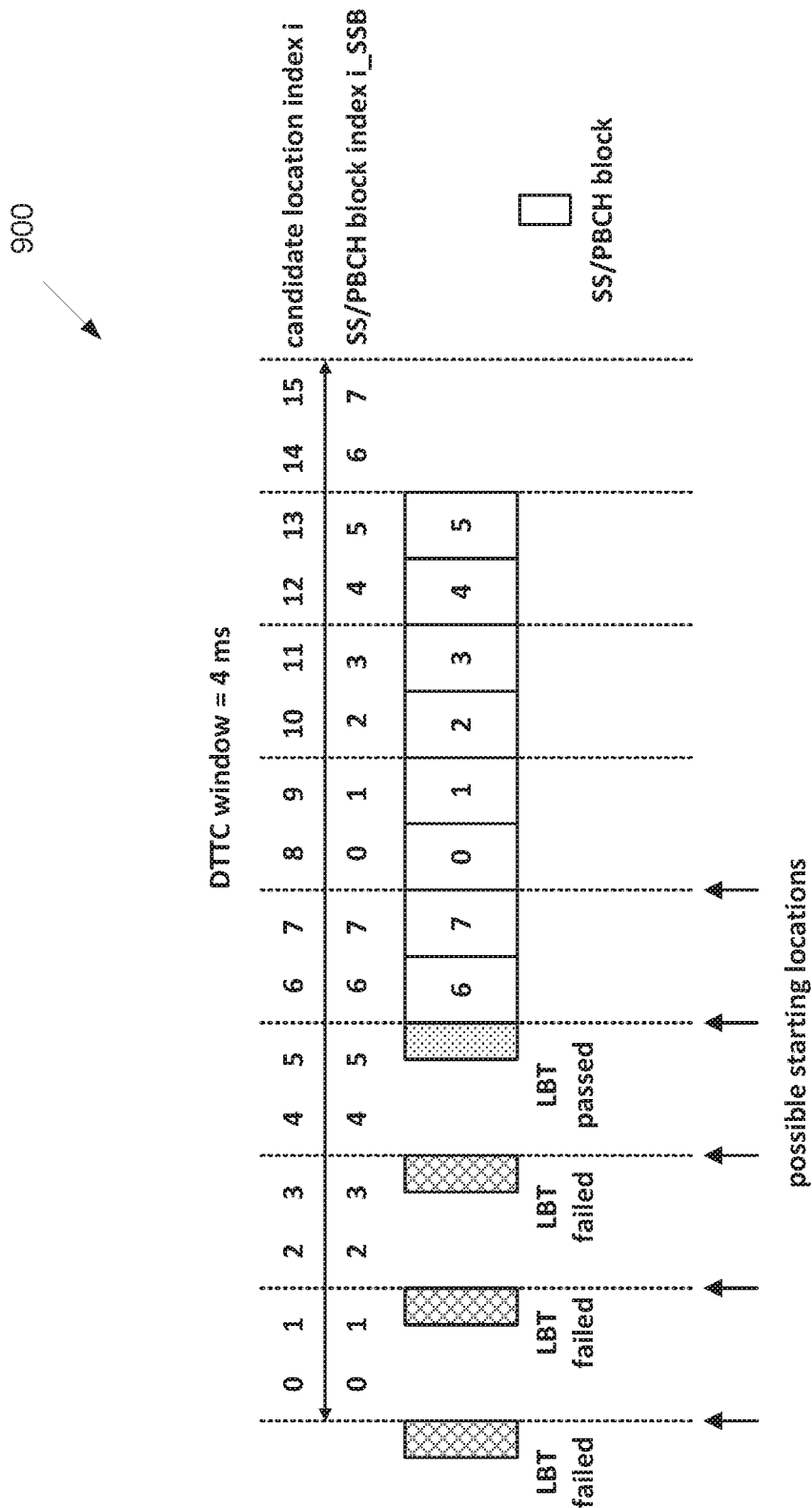
FIG. 9 illustrates an example DTTC according to embodiments of the present disclosure.

FIG. 9 illustrates an example DTTC 900 according to embodiments of the present disclosure. An embodiment of the DTTC 900 shown in FIG. 9 is for illustration only. FIG. 9 does not limit a scope of the present disclosure.

An illustration of DTTC is provided in FIG. 9, wherein the DRS transmission window duration is 4 ms; the DRS subcarrier spacing is 30 kHz; the maximum number of candidate SS/PBCH blocks within a DRS window is Y=16; the shift granularity between group of SS/PBCH blocks is 0.5 ms; the maximum number of transmitted SS/PBCH blocks is X=8; and the duration of the transmitted DRS within the window is up to 2 ms.

The candidate SS/PBCH block location index is periodically wrapping around in FIG. 9, such that the mapping between candidate SS/PBCH block location index i (e.g., i=0, 1, . . . , Y−1) to SS/PBCH block index i_SSB: i_SSB=i mod X. In an alternative to the wrap-around index mapping of SS/PBCH block index, depending on offset between the start of the DTTC window and the start of the transmitted SS/PBCH blocks, the candidate SS/PBCH block location index can be shifted within the DTTC window in an increasing order.

In NR standard specification, after detecting the SS/PBCH block, UE can obtain the configuration of time and frequency domain physical random access channel (PRACH) resources, the PRACH format and parameters for determining the PRACH preamble sequence, through the remaining system information (RMSI) or equivalently the system information block (SIB1). In addition, a UE can be provided through higher layer (e.g., via RRC) a number N of SS/PBCH blocks associated with one valid RACH occasion (RO), and UE can derive its associated RO(s) for PRACH transmission based on such association as well as the time/frequency resource configuration for PRACH.

Given the requirement of LBT, an NR-U UE is not guaranteed to have channel access to transmit PRACH at the higher-layer (e.g., RRC) configured RACH occasion, thereby potentially increasing the overall random access delay and reducing the PRACH resource utilization. To decrease the overall random access delay, an NR-U PRACH can be assigned a higher priority LBT (e.g., single-shot LBT) subject to regulation allowance, or configure additional RACH occasions besides those configured through PRACH configuration table (as illustrated in NR standard specification).

In the present disclosure, the type-0 RACH occasions and type-1 RACH occasions are used, which are defined as follows respectively: (1) Type-0 RACH occasion: type-0

ROs are the time-domain and frequency-domain resources that are configured by the higher layer (e.g., RRC) for PRACH transmissions through similar examples as in NR, wherein the time-domain resources for type-0 ROs are configured through a higher-layer parameter (e.g., prach-ConfigurationIndex) that maps to an entry in the PRACH configuration table, and the frequency resources for type-0 ROs can also be configured by higher layer parameters (e.g., msg1-FrequencyStart and msg1-FDM). Type-0 ROs are configured within a configurable subset of slots of a RACH configurable period, which will repeat across different RACH configurable periods; and (2) Type-1 ROs: type-1 ROs refer to the additionally configured ROs other than the type-0 ROs.

The present disclosure focuses on the design aspects for valid RO determination for NR-U with non-deterministic DRS location, configuration to indicate start of DRS within DTTC window, enhancement to association from SS/PBCH blocks to RACH occasions, and joint usage of CAT-2 LBT for PRACH and DRS.

The present disclosure includes several embodiments, principles, approaches and examples that can be used in conjunction or in combination with another or can operate as standalone. The embodiments/principles/approaches/examples in this disclosure can be applied to FBE-based NR-U, LBE-based NR-U, or both FBE-based and LBE-based NR-U.

In the present disclosure, FR1 NR-U refers to NR-U that operates in the unlicensed/shared bands in FR1, such as the 5 GHz unlicensed bands or the 6 GHz unlicensed/shared bands; and FR2 GHz NR-U refers to NR-U that operators in the unlicensed/shared bands in FR2, such as the 60 GHz unlicensed bands. In addition, DTTC window can also be referred to as the DRS transmission window.

Figure 10:
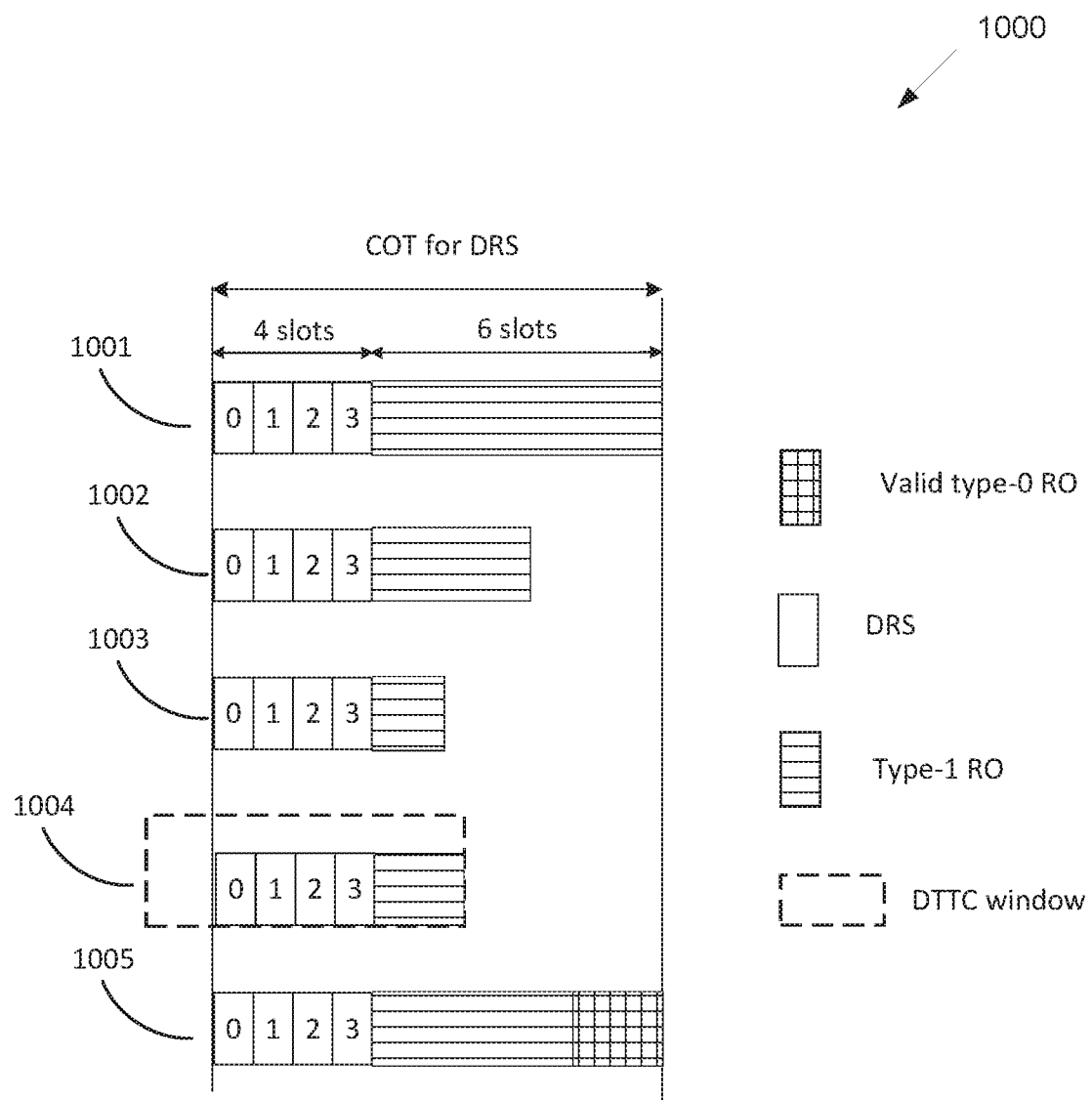
FIG. 10 illustrates an example configuration for transmission parameters according to embodiments of the present disclosure.

FIG. 10 illustrates an example configuration for transmission parameters 1000 according to embodiments of the present disclosure. An embodiment of the configuration for transmission parameters 1000 shown in FIG. 10 is for illustration only. FIG. 10 does not limit a scope of the present disclosure.

In one embodiment, a configuration of PRACH parameters for additional type-1 RACH occasions following DRS is provided.

In one embodiment, a configuration of related PRACH parameters for additional type-1 RACH occasions following the DRS transmission is provided. Specifically, since DRS transmission is subject to the LBT at a gNB side, it is beneficial to configure additional type-1 RACH occasions for UEs to share the remaining channel occupancy time (COT) of the DRS, such that UEs utilizing such type-1 RACH occasion can transmit PRACH subject to a CAT-2 LBT, or even no-LBT if the gap from the start of the RACH occasion to the end of last DL symbol is within a certain duration (e.g., 16 µs for FR1 NR-U).

In one example, an additional type-1 RACH occasion is the configuration of the root sequence and their cyclic shifts in the PRACH preamble sequence set for the additional type-1 ROs allocated following DRS.

In one example, higher layer parameters for determining the root sequence and their cyclic shifts in the PRACH preamble sequence set for the additional type-1 ROs allocated following DRS, can reuse the same higher layer parameters as those in determining the regular type-0 ROs.

In one example, the higher layer parameters can be included but not limited to: prach-RootSequenceIndex, msg1-SubcarrierSpacing, restrictedSetConfig, zeroCorrelationZoneConfig.

In another example, one or more than one additional higher layer parameters (i.e., RRC) for determining the root sequence and their cyclic shifts in the PRACH preamble sequence set for the additional type-1 ROs allocated following DRS can be introduced, and override the corresponding higher layer parameters used in determining the regular type-0 ROs.

In one instance, the one or more than one additional higher layer parameters can be choosing from: prach-RootSequenceIndex, msg1-SubcarrierSpacing, restrictedSetConfig, zeroCorrelationZoneConfig.

In one example, the configuration for the type-1 RO transmission parameters i provided, including the PRACH preamble format, time and frequency domain resources allocated for the type-1 ROs following the DRS.

In one example, the duration of all the available time-domain resources allocated for type-1 ROs following the DRS transmission can be indicated to the UE.

In one instance, the duration of all the available time-domain resource allocated for type-1 ROs can be the remaining COT corresponding to the DRS LBT after the DRS transmission. An illustration of this example is provided in 1001 as illustrated in FIG. 10.

In one sub-example, the duration of remaining COT after the DRS can be indicated to the UE through DCI. For instance, this can be indicated in the PDCCH for RMSI and/or OSI.

In one sub-example, the duration of remaining COT after the DRS can be indicated to the UE through higher layer parameters, which can be transmitted in RMSI and/or OSI.

In another sub-example, the duration of remaining COT after the DRS can be derived in the units of slots or OFDM symbols.

In another sub-example, this example can be extended to the remaining COT after both the DRS transmission and potentially other DL signals/channels that are scheduled by the DRS to be transmitted following the DRS. For instance, other DL signals/channels can be RMSI and/or OSI.

In another sub-example, the remaining COT duration corresponding to the DRS LBT can be inferred by the UE through the COT duration corresponding to DRS LBT and the DRS duration; wherein both can be indicated to the UE through DRS.

In one example, the duration of all the available time-domain resource allocated for type-1 ROs can be the maximum value in a set of durations supported for the type-1 ROs following the DRS, which is smaller than or equal to the remaining COT after the DRS.

In one sub-example, the set of durations can be {1, 2, 4, 8} slots, and the remaining COT after the DRS is 6 slots, then the time-domain resource allocated for type-1 ROs can be 4 slots. An illustration of this example is provided in 1002 as illustrated in FIG. 10.

In another sub-example, this example can be extended to the remaining COT after the DRS transmission, and potentially other DL signals/channels that are scheduled by the DRS to be transmitted following the DRS. For instance, other DL signals/channels can be RMSI and/or OSI.

In one example, the duration of all the available time-domain resource allocated for type-1 ROs can be indicated through an index to a set of supported durations for the type-1 ROs following the DRS.

In one sub-example, if the size of the set of durations is N, the indication requires $\lceil \log_2 N \rceil$ bits. An illustration of this example is provided in 1003 as illustrated in FIG. 10, wherein the set of durations can be {1, 2, 4, 8} slots, and the indicated time-domain resource allocated for type-1 ROs is 2 slots.

In one example, the duration of all the available time-domain resource allocated for type-1 ROs can be the remaining COT duration within the DTTC window. An illustration of this example is provided in 1004 as illustrated in FIG. 10.

In one sub-example, the duration of remaining COT after the DRS can be derived in the units of slots or OFDM symbols.

In another sub-example, this example can be extended to the remaining COT duration within the DTTC window after the DRS transmission, and potentially other DL signals/channels that are scheduled by the DRS to be transmitted following the DRS. For instance, other DL signals/channels can be RMSI and/or OSI.

In one example, the duration of all the available time-domain resource allocated for type-1 ROs can be the remaining COT duration after the DRS and excluding the valid time-domain resources allocated to type-0 ROs. An illustration of this example is provided in 1005 as illustrated in FIG. 10.

In one sub-example, the duration of remaining COT after the DRS can be derived in the units of slots or OFDM symbols.

In another sub-example, this example can be extended to the remaining COT after both the DRS transmission and potentially other DL signals/channels that are scheduled by the DRS to be transmitted following the DRS. For instance, other DL signals/channels can be RMSI and/or OSI.

In one example, the duration of all the available time-domain resource allocated for type-1 ROs can be explicitly indicated through the remaining system information and/or other system information.

In one example, the duration of all the available time-domain resource allocated for type-1 ROs can be explicitly indicated through the PDCCH for remaining system information and/or PDCCH for other system information.

In one example, the duration of all the available time-domain resource allocated for type-1 ROs can be implicitly derived by the UE through obtaining the COT corresponding to DRS and following one of the examples.

In one example, the starting position of the first available time-domain resource allocated for type-1 ROs can be immediately following the end of the DRS transmission. For instance, the examples in FIG. 10 all start immediately following the end of the DRS transmission, wherein the UE can derive the time instance for end of DRS transmission, or by network indication.

In one example, the starting position of the first available time-domain resource allocated for type-1 ROs can be the start of the first slot following the end of the DRS transmission.

In one example, the starting position of the first available time-domain resource allocated for type-1 ROs can be the start of N-th slot (N>=1) following the end of the DRS transmission.

In one example, when RMSI and/or OSI are TDM'ed with the SS/PBCH block(s) and possibly configured to be transmitted after the DRS, the starting position of the first available time-domain resource allocated for type-1 ROs can be immediately after the end of the RMSI and/or OSI configured by the DRS, or can be the start of the first slot following the end of the RMSI and/or OSI configured by the DRS.

In one example, the starting position of the first available time-domain resource allocated for type-1 ROs can be explicitly indicated through one of the PDCCH for remaining system information, the PDCCH for other system information, the RMSI, or the OSI.

In one example, the PRACH time-domain configuration for type-1 ROs following DRS, including the PRACH format, and potentially also including the number of time-domain ROs within a PRACH slot and starting symbol of the type-1 RO within the PRACH slot, can be indicated through reusing the existing NR PRACH configuration table.

In one example, a subset of columns of the NR PRACH configuration table can be used for the type-1 ROs. For instance, the columns for one or multiple of the PRACH configuration index, preamble format, starting symbol, number of time-domain PRACH occasions within a PRACH slot can be used for type-1 ROs.

In one example, a subset of rows/entries of the NR PRACH configuration table can be used for the type-1 ROs.

In another example, the existing entry of the NR PRACH configuration table can be re-interpreted. For instance, the number of time-domain PRACH occasions within a PRACH slot and the symbol position can be re-interpreted, such that a gap duration can be introduced for neighboring ROs to perform a CAT-2 LBT.

In yet another example, if a PRACH slot contains downlink symbols for the DRS, the type-1 RO(s) within the PRACH slot following the DRS are valid type-1 ROs.

In one example, the PRACH time-domain configuration for type-1 ROs following DRS, including the PRACH format, and potentially also including the number of time-domain ROs within a PRACH slot and starting symbol of the type-1 RO within the PRACH slot, PRACH LBT overhead, can be indicated together through introducing a new PRACH configuration table for type-1 ROs following DRS. TABLE 1 provides an illustration of the first three entries of a PRACH configuration table for type-1 ROs.

In one example, if PRACH slot contains downlink symbols for the DRS, the type-1 RO(s) within the PRACH slot following the DRS are valid type-1 ROs.

In another example, the entry to the PRACH configuration table for type-1 ROs following DRS can be indicated through higher layer parameter (e.g., RRC parameter).

In another example, the entry to the PRACH configuration table for type-1 ROs following DRS can be indicated through the DCI. For instance, the DCI can be DCI for RMSI, or DCI format 1_0 with CRC scrambled by SI-RNTI.

In another example, the starting symbol can refer to the starting symbol of the type-1 RO, and the LBT is performed in the symbol before the type-1 RO.

In another example, the starting symbol can refer to the starting symbol of the type-1 RO and corresponding LBT.

TABLE 1

PRACH configuration table for type-1 ROs

| Type-1 RO configuration index | Preamble format | Starting symbol | LBT overhead in number OFDM symbol | Number of time-domain ROs within a PRACH slot |
|---|---|---|---|---|
| 0 | A1 | 0 | 1 | 4 |
| 1 | A2 | 0 | 1 | 2 |
| 2 | A3 | 0 | 1 | 1 |
| ... | ... | ... | ... | ... |

In one embodiment, the PRACH time-domain configuration for type-1 ROs following DRS, including the PRACH format, and potentially also including PRACH LBT type, the number of time-domain ROs within a PRACH slot, starting symbol of the type-1 RO within the PRACH slot, can be indicated separately.

In one example, all or partial information of the PRACH time-domain configuration for type-1 ROs can be indicated through the DCI. For instance, the DCI can be of DCI format 1_0 with CRC scrambled by SI-RNTI, such as the PDCCH for RMSI, and the reserved bits can be used to indicate the PRACH time-domain configuration.

In another example, all or partial information of the PRACH time-domain configuration for type-1 ROs can be indicated through the RMSI.

In yet another example, all or partial information of the PRACH time-domain configuration for type-1 ROs can be indicated through other system information, if OSI has been configured within the DRS.

In yet another example, the PRACH format can be indicated through $\lceil \log_2 N \rceil$ bits wherein N is the number of supported PRACH formats. If all the short preamble formats from NR are supported, N=9.

In yet another example, the LBT type can be fixed to be one of CAT-2 LBT or no-LBT; or LBT type can be indicated through 1 bit, which can indicate whether the LBT type is CAT-2 LBT or no-LBT.

In yet another example, the starting symbol of the type-1 RO within the PRACH slot can be fixed to be 0. In one sub-example, if PRACH slot contains downlink symbols for the DRS, the type-1 RO(s) within the PRACH slot following the DRS are valid type-1 ROs.

In yet another example, the number of time-domain ROs within a PRACH slot can be implicitly inferred from PRACH format, PRACH LBT type, and starting symbol without any explicit configuration/indication.

In one embodiment, the frequency domain resource for additional type-1 ROs following DRS can be indicated to the UE.

In one example, this can be indicated through same higher-layer parameters from NR, such as msg1-FrequencyStart, and msg1-FDM. In one sub-example, the values of the higher-layer parameters such as msg1-FrequencyStart, and msg1-FDM for NR-U can be extended to different values from NR.

In one example, the frequency domain resource for additional type-1 ROs following DRS can be indicated through additional higher-layer parameters different from the NR, which can be transmitted through the remaining system information and/or other system information.

In one example, the frequency domain resource for additional type-1 ROs following DRS can be indicated through DCI.

In one sub-example, the DCI can be of DCI format 1_0 with CRC scrambled by SI-RNTI. For instance, the PDCCH for RMSI. In another sub-example, the number of FDM'ed type-1 ROs and the starting frequency offset for FDM'ed type-1 ROs can be indicated jointly. In yet another sub-example, the number of FDM'ed type-1 ROs and the starting frequency offset for FDM'ed type-1 ROs can be indicated separately.

In one example, the frequency domain resource for additional type-1 ROs following DRS can be configured within the same bandwidth part (BWP) and/or LBT sub-band as the DRS.

In one instance, a UE can derive the subcarrier spacing for additional type-1 ROs following DRS through one of the following examples: in one example, the subcarrier spacing for type-1 ROs can be the same as the subcarrier spacing for type-0 ROs, which can be derived from higher layer parameter through RMSI; and in one example, the subcarrier spacing for type-1 ROs can be can be indicated through additional higher-layer parameters different from the NR, which can be transmitted through the remaining system information and/or other system information.

In one example, the subcarrier spacing for type-1 ROs can be indicated through DCI. In one sub-example, the DCI can be of DCI format 1_0 with CRC scrambled by SI-RNTI. For instance, the PDCCH for RMSI.

In one example, the subcarrier spacing for additional type-1 ROs following DRS can be using the same subcarrier spacing of the DRS.

In one example, a UE can derive the PRACH sequence length L through one of the following examples: (1) the PRACH sequence length can be fixed by specification. For instance, the PRACH sequence length can be 139, and 12 PRBs are required to transmit each PRACH sequence; (2) the PRACH sequence length can be derived through the PRACH format configured for type-1 RO according to the aforementioned embodiments and examples; and (3) the PRACH sequence length for type-1 RO can be the same as the type-0 RO, and can be derived through higher layer parameter.

In one embodiment, fixed timing relation between SS/PBCH block and additional type-1 RO is provided.

Another design consideration is that a given UE has detected the SS/PBCH block from DRS and has received related information from the higher layer regarding the type-1 ROs following with the DRS through one or multiple examples, the procedure for the UE to derive actually associated type-1 RO(s).

This embodiment includes examples for the UEs to derive associated type-1 ROs following DRS, through a fixed timing relation between actually transmitted SS/PBCH and the type-1 ROs.

In one embodiment, the time-domain resource for additional type-1 ROs can be associated with the actually transmitted SS/PBCH block through a fixed timing relation.

In one example, with a cyclically wrapped around order of SS/PBCH block indexes within the DRS, the fixed timing relation can be that for UEs associated with SS/PBCH block of index i_SSB, the time gap between the staring time for type-1 ROs associated with SS/PBCH block of index i_SSB, and the starting time for SS/PBCH block of index i_SSB, does not depend on the SS/PBCH block index i_SSB.

In one sub-example, the total time-domain resources of the type-1 ROs association with an SS/PBCH block can be of the same duration of each SS/PBCH block.

In another sub-example, when the each SSB is TDM'ed with other signals/channels associated with the SSB, the duration for each SSB can be extended to the duration of SSB and TDM'ed signals/channels associated with the SSB; and the time gap can be extended to the gap between the staring time for type-1 ROs associated with SSB, and the starting time for SSB and TDM'ed signals channels associated with SSB.

In one sub-example, the time gap can be t_SSB*n_SSB+T; wherein t_SSB is the duration of each SS/PBCH block; n_SSB is the number of actually transmitted SS/PBCH blocks; T>=0 is duration of other downlink signals/channels (e.g., PDCCH/PDSCH for RMSI) that are transmitted following the cyclically wrapped around SS/PBCH blocks.

Figure 11:
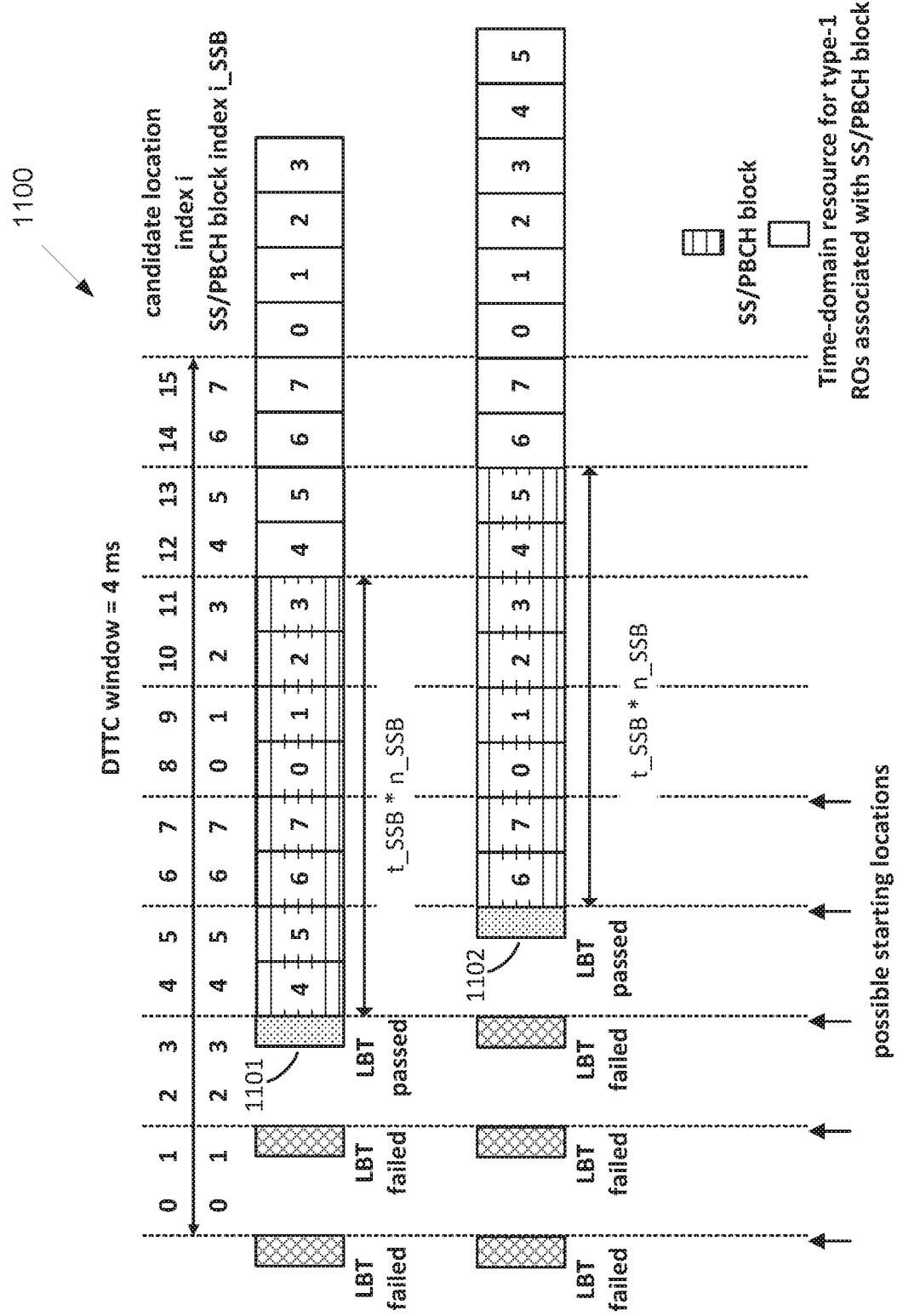
FIG. 11 illustrates an example timing relation according to embodiments of the present disclosure.

FIG. 11 illustrates an example timing relation 1100 according to embodiments of the present disclosure. An embodiment of the timing relation 1100 shown in FIG. 11 is for illustration only. FIG. 11 does not limit a scope of the present disclosure.

An illustration of this example is provided in FIG. 11, wherein t_SSB=0.25 ms, n_SSB=8, and T=0, and the index in the time-domain resource for type-1 ROs indicates the associated SS/PBCH block index.

In another sub-example, this example can be applied without indication to the UE of the offset from the start of the DRS to the start of the DTTC window.

In another example, for both cyclically wrapped around order and increasing order of SS/PBCH block indexes within the DRS, the fixed timing relation can be that for UEs associated with SS/PBCH block of index i_SSB (0<=i_SSB<=#actually transmitted SSBs), the time gap between the staring time for type-1 ROs associated with SS/PBCH block of index i_SSB, and the starting time for SS/PBCH block of index i_SSB can depend on the SS/PBCH block index i_SSB.

In one sub-example, when the each SSB is TDM'ed with other signals/channels associated with the SSB, the time gap can be extended to the gap between the staring time for type-1 ROs associated with SSB, and the starting time for SSB and TDM'ed signals channels associated with SSB.

In another sub-example, the SSB index i_SSB can be the index within the actually transmitted SSBs, instead of the SSB index within the maximum number of configurable SSBs.

In another sub-example, the time gap can be (n_SSB-i_SSB)*t_SSB+i_SSB*t_RO+T; wherein t_SSB is the duration of each SS/PBCH block; n_SSB is the number of actually transmitted SS/PBCH blocks; T>=0 is duration of other downlink signals/channels (e.g., PDCCH/PDSCH for RMSI) that are transmitted following the SS/PBCH blocks; t_RO is the duration of the time-domain resources for type-1 ROs associated with each SSB.

Figure 12:
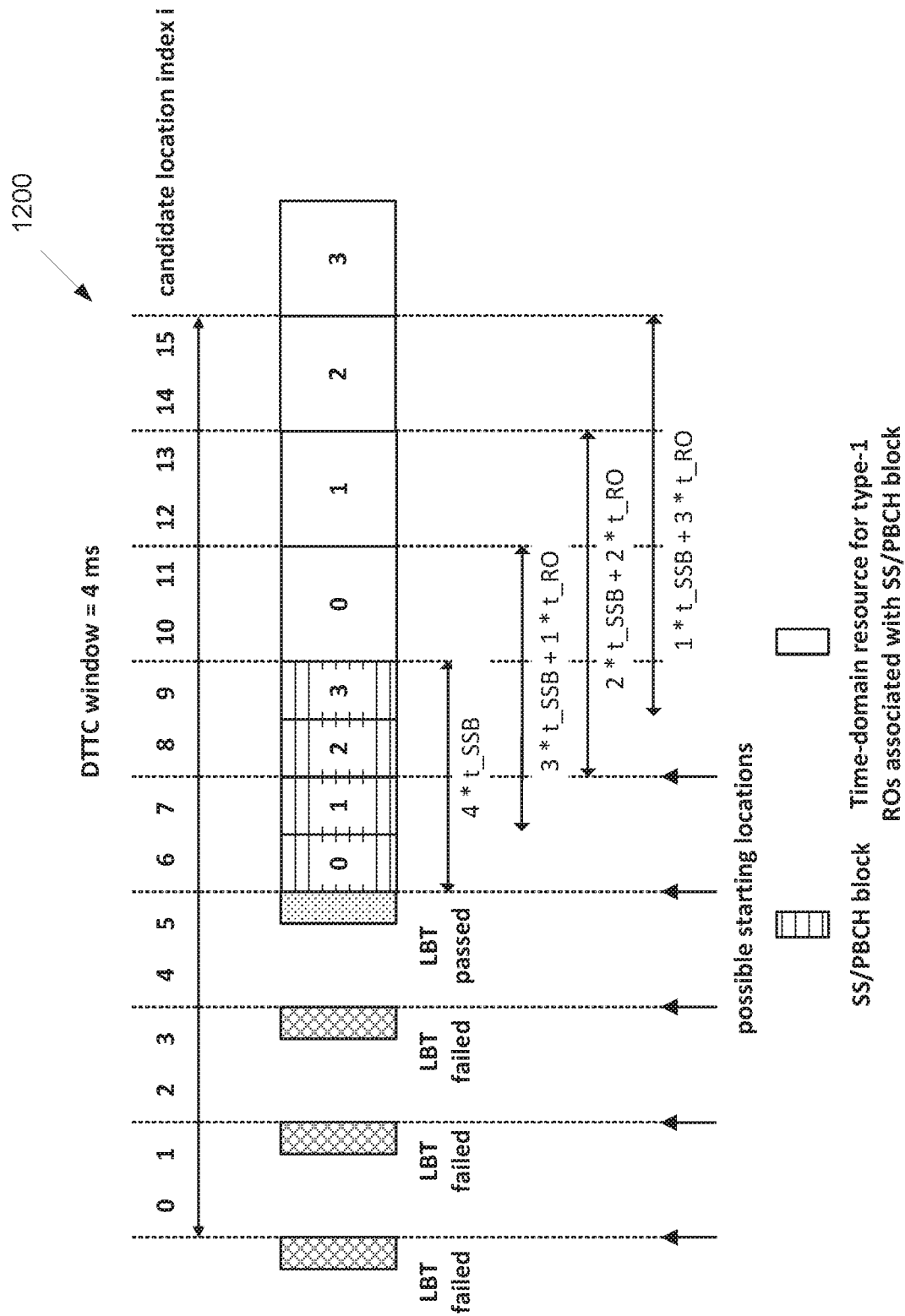
FIG. 12 illustrates another example timing relation according to embodiments of the present disclosure.

FIG. 12 illustrates another example timing relation 1200 according to embodiments of the present disclosure. An embodiment of the timing relation 1200 shown in FIG. 12 is for illustration only. FIG. 12 does not limit a scope of the present disclosure.

An illustration of this example is provided in FIG. 12 with increasing order SSB index, wherein t_SSB=0.25 ms, n_SSB=4, T=0, and t_RO=0.5 ms, and the index in the time-domain resource for type-1 ROs indicates the associated SS/PBCH block index.

In another sub-example, a group of SSBs can share the same time-domain resource for type-1 ROs, wherein the time gap can be extended to (N_SSBG-i_SSBG)*t_SSBG+i_SSBG*t_RO+T; wherein t_SSBG is the sum duration of SSBs in each group; N_SSBG is the number of SSB groups; T>=0 is duration of other downlink signals/channels (e.g., PDCCH/PDSCH for RMSI) that are transmitted following the SSB; t_RO is the duration of the time-domain resources for type-1 ROs associated with each SSB group, and i_SSBG is the index of the SSB group starting from 0.

Figure 13:
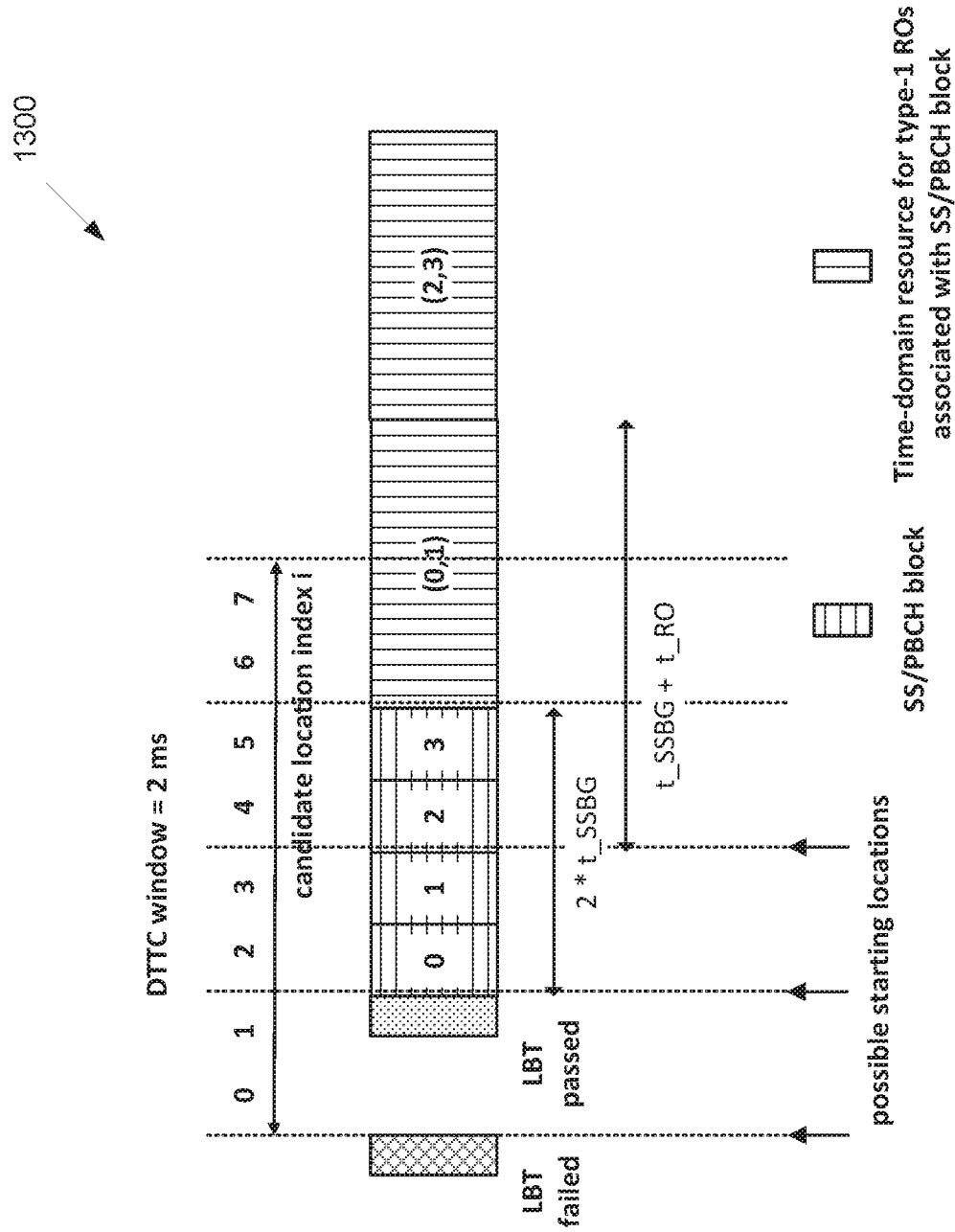
FIG. 13 illustrates yet another example timing relation according to embodiments of the present disclosure.

FIG. 13 illustrates yet another example timing relation 1300 according to embodiments of the present disclosure. An embodiment of the timing relation 1300 shown in FIG. 13 is for illustration only. FIG. 13 does not limit a scope of the present disclosure.

An illustration of this example is provided in FIG. 13 with increasing order SSB index, wherein (SSB0, SSB1) and (SSB2, SSB3) are the two SSB groups, and t_SSBG=0.5 ms, N_SSBG=2, T=0, and t_RO=1 ms, and the index in the time-domain resource for type-1 ROs indicates the associated SS/PBCH block indexes.

In one example, a UE can derive associated type-1 RO(s) through the fixed timing relation from the aforementioned example, the actually transmitted SS/PBCH blocks (i.e., higher layer parameter ssb-PositionsInBurst), and potentially other information such as associated SS/PBCH block index, and other PRACH parameters for type-1 RO such as the PRACH format for type-1 ROs, the LBT type for type-1 ROs.

In one example, the PRACH parameters for type-1 ROs such as the PRACH format for type-1 ROs and the LBT type for type-1 ROs can be derived according to the aforementioned embodiment.

In another example, a UE can derive the frequency domain resource for additional type-1 ROs through the aforementioned embodiment.

In one embodiment, association rule between SS/PBCH block and additional type-1 RO is provided. This embodiment includes examples for the UEs to derive associated type-1 ROs following DRS, through an association rule between actually transmitted SS/PBCH and the type-1 ROs.

In one embodiment, the additional type-1 ROs can be associated with the SS/PBCH block through a certain association rule.

In one example, the association rule can include a mapping order from the actually transmitted SSB index to the type-1 ROs following the DRS transmission.

In one sub-example, the mapping order can reuse the mapping order from SSB indexes to valid type-0 ROs from NR. In another sub-example, a new mapping order can be introduced for type-1 ROs following the DRS transmission.

For instance, the mapping order can map type-1 ROs in a group of multiple time-domain type-1 ROs, wherein the number of type-1 ROs within a group can be fixed by specification (e.g., 4, or group of type-1 ROs within a full slot); or be configurable by higher layer parameter or indicated through L-1 signal/channel.

In another example, the association rule can include a number of actually transmitted SSBs associated with one type-1 RO. In one sub-example, the number of actually transmitted SSBs associated with one type-1 RO reuse the higher layer parameter from NR, i.e., ssb-perRACH-OccasionAndCBPreamblesPerSSB. In another sub-example, the number of actually transmitted SSBs associated with one type-1 RO can be indicated through additional higher-layer parameters different from NR, which can be transmitted through the remaining system information and/or other system information. For instance, the higher layer parameter can be ssb-per_Type1_RO, whose value can be chosen from {⅛, ¼, ½, 1, 2, 4, 8, 16}.

In another example, the type-1 ROs following the DRS can be mapped starting from the type-1 ROs associated with the first actually transmitted SS/PBCH block.

In another example, the type-1 ROs following the DRS can be mapped from the type-1 ROs associated with the 0-th actually transmitted SSB (i.e., the first SSB index).

In one embodiment, a UE can derive associated type-1 RO(s) through the association rule and related parameters according to the aforementioned examples, associated SS/PBCH block index, all the available time-domain resources allocated for type-1 ROs following the DRS transmission, the frequency domain resource allocated for type-1 ROs, and potentially other information, such as the indexes of the actually transmitted SS/PBCH blocks (i.e., higher layer parameter ssb-PositionsInBurst), and other PRACH parameters for type-1 RO such as the PRACH format for type-1 ROs, the LBT type for type-1 ROs.

In one example, the PRACH parameters for type-1 ROs such as the PRACH format for type-1 ROs and the LBT type for type-1 ROs can be derived according to the aforementioned embodiment.

In another example, a UE can derive the available time-domain resources allocated for type-1 ROs following the DRS transmission as detailed in the aforementioned examples of the aforementioned embodiment. In another example, a UE can derive the frequency domain resource for additional type-1 ROs through the aforementioned examples and embodiments.

In yet another example, if the type-1 RO following the DRS derived through an association rule overlaps with a valid type-0 RO semi-statically configured through RMSI, the UE can utilize the type-1 RO for PRACH transmission. In one sub-example, a UE can utilize the type-1 RO for PRACH transmission if the overlapped type-1 RO can the valid type-0 RO are associated with the same SS/PBCH block index. In another sub-example, the gNB is expected to detect PRACH according to the configuration for the type-1 ROs.

In another example, if the type-1 RO following the DRS derived through an association rule overlaps with a valid type-0 RO semi-statically configured through RMSI, the UE can utilize the type-0 RO for PRACH transmission. In one sub-example, a UE utilizes the type-0 RO for PRACH transmission if the overlapped type-1 RO can the valid type-0 RO are associated with the different SS/PBCH block index. In another sub-example, the gNB is expected to detect PRACH according to the configuration for the type-0 ROs.

In another example, if defining one mapping cycle from the SS/PBCH blocks to type-1 ROs is such that every actually transmitted SS/PBCH block is mapped at least once to associated type-1 ROs, then after a maximum integer number of mapping cycles within the available time-domain resources allocated for type-1 ROs following the DRS, if there are left-over type-1 ROs not mapped to the actually transmitted SS/PBCH blocks transmission, such left-over type-1 ROs are not utilized.

In another example, if defining one mapping cycle from the SS/PBCH blocks to type-1 ROs is such that every actually transmitted SS/PBCH block is mapped at least once to associated type-1 ROs, then after a maximum integer number of mapping cycles within the available time-domain resources allocated for type-1 ROs following the DRS, if there are left-over type-1 ROs not mapped to the actually transmitted SS/PBCH blocks transmission, such left-over type-1 ROs can still be utilized.

In one sub-example, such type-1 ROs can be associated with SS/PBCH blocks according to the same association rule. In one sub-example, the mapping from SS/PBCH blocks to leftover type-1 ROs can be enhanced such that actually transmitted SS/PBCH blocks can be mapped to the leftover type-1 ROs at least once. In another sub-example, the mapping rule and/or number of SSB per RACH occasion from actually transmitted SS/PBCH blocks to leftover type-1 ROs can be enhanced such that the SS/PBCH blocks can be divided into N (N>=1) subsets, and UEs associated with the i-th (0<=i<=N−1) subset of actually transmitted SS/PBCH blocks can be mapped to the leftover type-1 ROs in STTC window period n, and the UEs associated with the ((i+1) mod N)-th (0<=i<=N−1) subset of actually transmitted SS/PBCH blocks can be mapped to the leftover type-1 ROs in STTC window period n+1.

In another example, if an SS/PBCH block is associated with more than one type-1 ROs following the DRS within one mapping cycle, such as when the mapping is on a group type-1 RO basis, or the number of actually transmitted SSBs associated with one type-1 RO is less than 1; then a UE can utilize the multiple type-1 ROs associated with a selected SS/PBCH block according to one of (1) randomly selects one type-1 RO and transmit PRACH subject to LBT; (2) utilize every associated type-1 RO and transmit PRACH subject to LBT; (3) attempt LBT for UE's associated type-1 ROs since the first associated type-1 RO; until either the LBT is succeeded and utilize the corresponding type-1 RO for PRACH transmission, or there is no remaining type-1 ROs associated with the SS/PBCH block in current mapping cycle.

Figure 14:
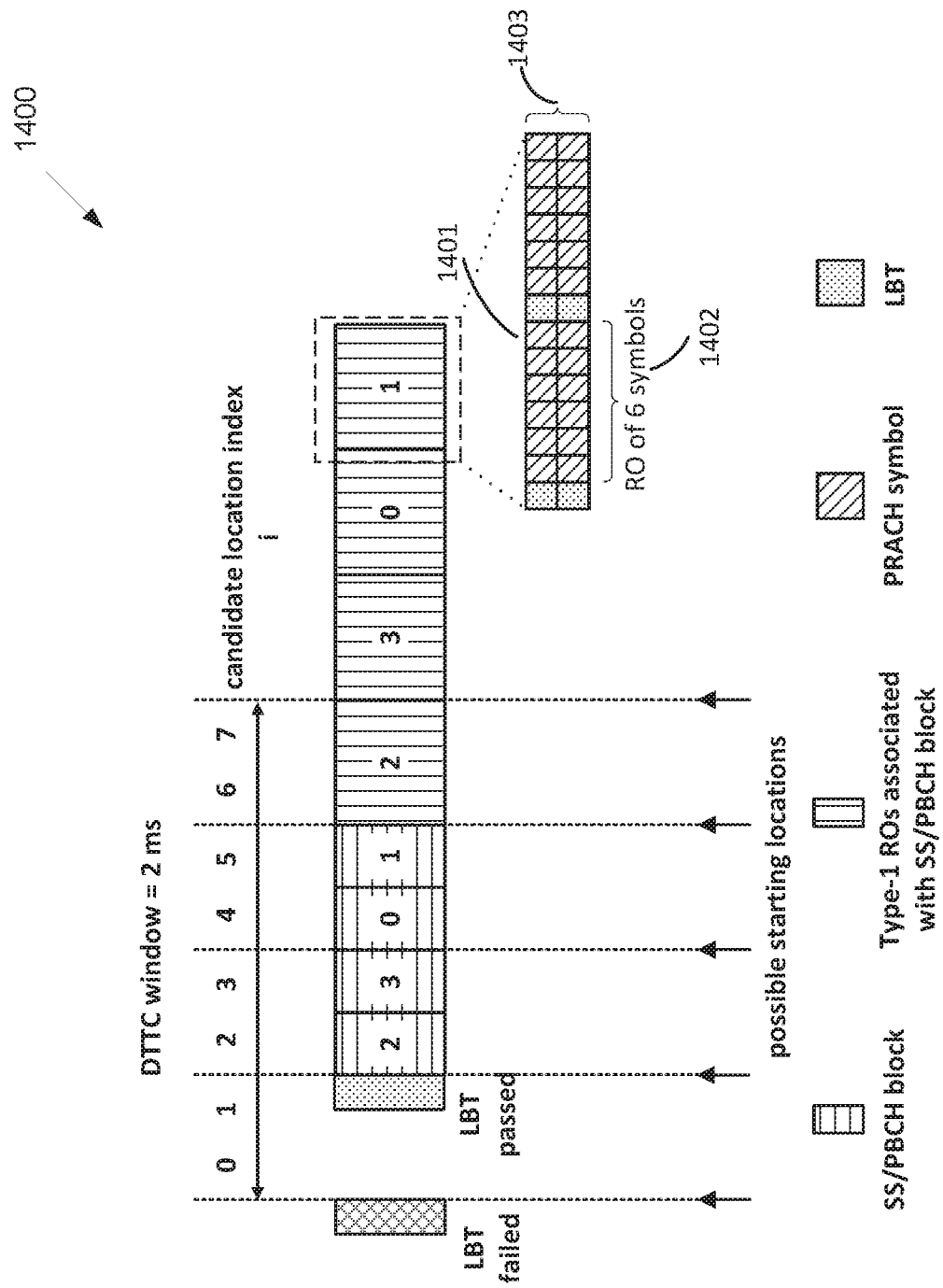
FIG. 14 illustrates yet another example timing relation according to embodiments of the present disclosure.

FIG. 14 illustrates yet another example timing relation 1400 according to embodiments of the present disclosure. An embodiment of the timing relation 1400 shown in FIG. 14 is for illustration only. FIG. 14 does not limit a scope of the present disclosure.

An illustration of this embodiment is provided in FIG. 14, wherein the number of FDM'ed RO is 2 (1402), the configured PRACH format is A3 with 6 symbols (1403), and the PRACH LBT is one-shot LBT, the PRACH subcarrier spacing is 30 kHz, and the number of SS/PBCH blocks associated with each type-1 RO is ¼, the mapping order from SS/PBCH block to type-1 RO follows same as NR and the mapping starts from the type-1 ROs associated with the first actually transmitted SS/PBCH block. In addition, the type-1 ROs associated with SS/PBCH block 1 is detailed in 1401.

Figure 15:
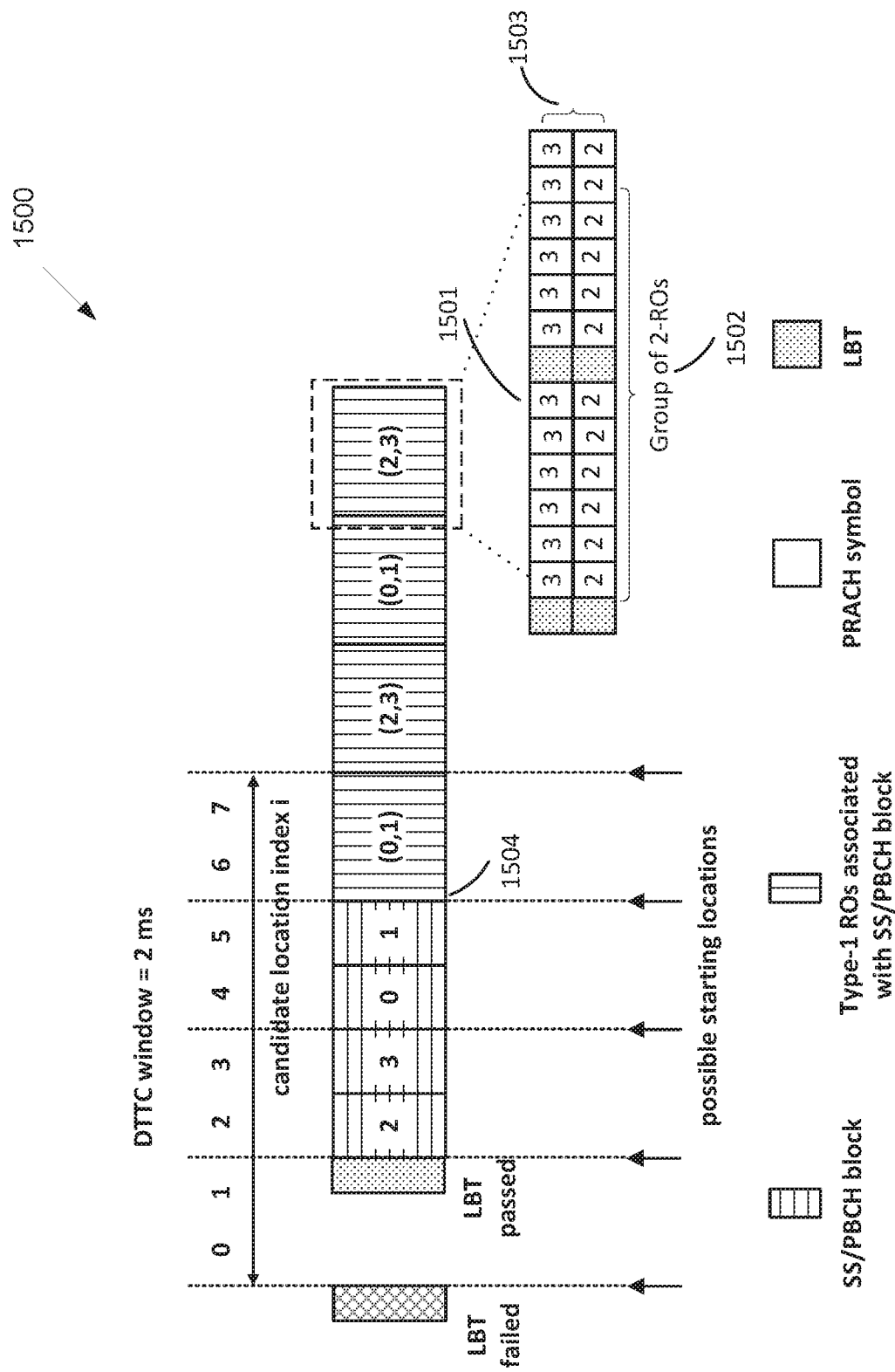
FIG. 15 illustrates yet another example timing relation according to embodiments of the present disclosure.

FIG. 15 illustrates yet another example timing relation 1500 according to embodiments of the present disclosure. An embodiment of the timing relation 1500 shown in FIG. 15 is for illustration only. FIG. 15 does not limit a scope of the present disclosure.

Another illustration of this embodiment is provided in FIG. 15, wherein the number of FDM'ed RO is 2 (1503), the configured PRACH format is A3 with 6 symbols (1502), and the PRACH LBT is one-shot LBT, the PRACH subcarrier spacing is 30 kHz. The mapping order from SS/PBCH block to type-1 RO follows a group-wise SS/PBCH to type-1 RO, with each group consisting 2 type-1 ROs in time-domain (1502); and the mapping starts from the type-1 ROs associated with the 0-th actually SS/PBCH block index. The mapping cycle is 2 slots, and there are 2 mapping cycles allocated for type-1 ROs in the example of FIG. 15. In addition, the type-1 ROs associated with SS/PBCH block 2 and 3 are detailed in 1501.

In one embodiment, direct scheduling of type-1 RO by DRS is provided. This embodiment includes examples for the UEs to derive associated type-1 ROs following DRS, through direct scheduling from the DRS, wherein the time-domain resource and/or the frequency domain resources for additional type-1 ROs can be directly indicated by the DRS.

In one embodiment, a UE can derive the frequency-domain resource allocation of associated type-1 RO(s) through the DCI corresponding to RMSI and/or OSI of associated SS/PBCH block, and potentially in combination with higher layer parameters from RMSI and/or OSI.

In one example, the number of PRBs/REs of the type-1 RO can be derived through the PRACH sequence length L according to the aforementioned embodiment.

In another example, the frequency-domain resource of each type-1 RO can be consecutively allocated in the frequency-domain.

In yet another example, with consecutive allocation of type-1 RO in frequency domain, the frequency domain resource can be derived by the UE through a frequency offset from the starting of the allocated type-1 RO (e.g., starting RB or starting RE) to a reference frequency location.

In one sub-example, this offset can be indicated by higher layer parameter through RMSI and/or OSI. In another sub-example, this offset can be indicated using $\lceil \log_2 O \rceil$ bits, wherein O represents the total number of possible frequency offsets to allocate the type-1 RO, and the indication can be by the DCI, or by higher layer parameter through RMSI and/or OSI. In another sub-example, a number of N consecutive type-1 ROs can be allocated starting from the starting RB of the allocated type-1 RO, wherein N can be indicated through DCI using $\lceil \log_2 N_{max} \rceil$ bits with $N_{max}$ being the supported number of FDM'ed type-1 ROs can be allocated; or through higher layer parameter. In yet another sub-example, the reference frequency location can the starting RB or RE of the BWP containing the type-1 RO; or a common reference point of the resource grid (e.g., Point A).

Figure 16:
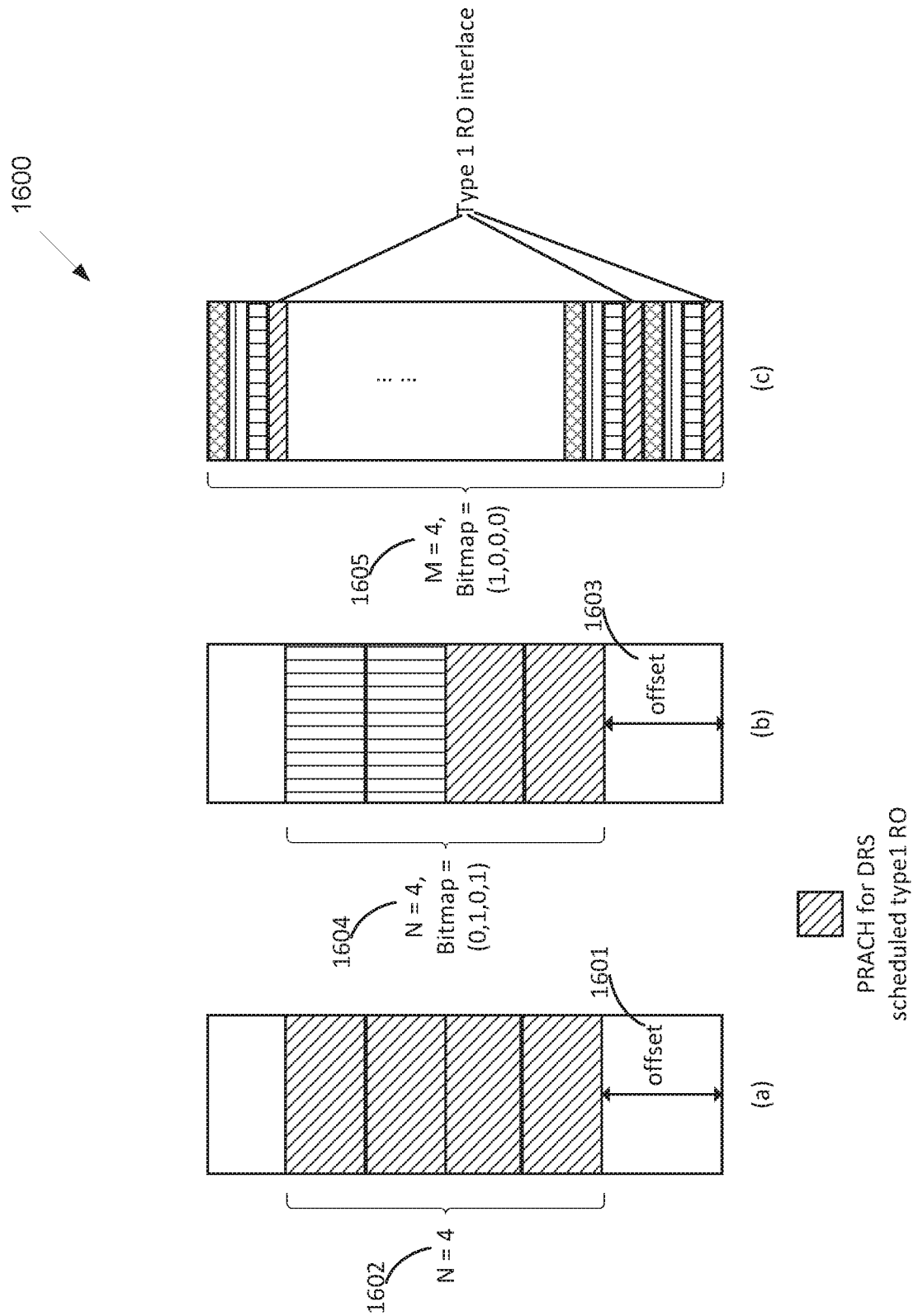
FIG. 16 illustrates an example direct scheduling according to embodiments of the present disclosure.

FIG. 16 illustrates an example direct scheduling 1600 according to embodiments of the present disclosure. An embodiment of the direct scheduling 1600 shown in FIG. 16 is for illustration only. FIG. 16 does not limit a scope of the present disclosure.

An illustration of this example is provided in FIG. 16 (e.g., (a) of FIG. 16), wherein reference point for frequency offset (1601) is starting RB/RE of BWP, and N=4 (1602).

In one example, with consecutive allocation of type-1 RO in frequency domain, the frequency domain resource can be derived by the UE through a frequency offset from the starting RB of the FDM'ed type-1 ROs to a reference frequency location, and an indication to one or multiple of the FDM'ed type-1 ROs.

In one sub-example, the frequency offset can be indicated by higher layer parameter through RMSI and/or OSI. In another sub-example, the frequency offset can be indicated using $\lceil \log_2 O \rceil$ bits, wherein O represents the total number of possible frequency offsets to allocate the type-1 RO, and the indication can be by the DCI, or by higher layer parameter through RMSI and/or OSI. In yet another sub-example, the reference frequency location can the starting RB or RE of the BWP containing the type-1 RO; or a common reference point of the resource grid (e.g., Point A). In yet another sub-example, a number of N FDM'ed type-1 ROs can be allocated starting from the starting RB of the allocated type-1 ROs, wherein N can be fixed by specification; or indicated through DCI using $\lceil \log_2 N_{max} \rceil$ bits with $N_{max}$ being the supported number of FDM'ed type-1 ROs (e.g., $N_{max}=4$ if supported number N is $\{1, 2, 4, 8\}$); or indicated through higher layer parameter.

In yet another sub-example, all the N FDM'ed type-1 ROs can be allocated to the UE. In yet another sub-example, a UE can be allocated a subset of the N FDM'ed type-1 ROs, wherein the subset allocated to the UE can be indicated through a bitmap of size N bits; and the indication can be by the DCI, or by higher layer parameter through RMSI and/or OSI. In yet another sub-example, a UE can be allocated one of the N FDM'ed type-1 ROs, which can indicated through $\lceil \log_2 N \rceil$ bits; and the indication can be by the DCI, or by higher layer parameter through RMSI and/or OSI.

An illustration of this example is provided in FIG. 16 (e.g., (b) of FIG. 16), wherein reference point for frequency offset (1603) is starting RB/RE of BWP, N=4 (1602) and a bitmap of (1, 1, 0, 0) is used to indicate the scheduled FDM'ed type-1 ROs.

In another example, the frequency-domain resource of each type-1 RO can be non-consecutively allocated in the frequency-domain through a regular or irregular interlaced structure. For instance, within a given bandwidth part (e.g., the initial active DL/UL BWP), there can be a finite number of possible PRACH interlaces allocated to the UE at a given PRACH subcarrier spacing.

In another example, with interlaced structure for type-1 RO in frequency domain and a finite number M of FDM'ed type-1 ROs within the BWP of the PRACH, the frequency domain resource can be derived by the UE through an indication in the DC.

In one sub-example, M can be fixed by specification. In another sub-example, the M can be derived from the bandwidth of the BWP containing the type-1 ROs, the subcarrier spacing of each type-1 RO and the number of PRBs/REs in each type-1 RO. In another sub-example, the indication can be through a bit map of M bits; and the indication can be by the DCI, or by higher layer parameter through RMSI and/or OSI. In another sub-example, the UE can be allocated 1 PRACH interlace, which can be indicated through $\lceil \log_2 M \rceil$ bits; and the indication can be by the DCI, or by higher layer parameter through RMSI and/or OSI.

An illustration of this example is provided in FIG. 16 (e.g., (c) of FIG. 16), wherein M=4 (1605) and a bitmap of (1, 0, 0, 0) is used to indicate the scheduled FDM'ed type-1 ROs.

In another example, a UE can derive the frequency-domain resource allocation of associated type-1 RO(s) only through RMSI and/or OSI corresponding to associated SS/PBCH block, such as when the frequency allocation of type-1 ROs are all indicated by higher layer parameter through RMSI and/or OSI. For instance, a UE can derive the frequency-domain resource allocation of associated type-1 RO(s) according to the aforementioned embodiment.

In one embodiment, a UE can derive the time-domain resource allocation of associated type-1 RO(s) through the DCI corresponding to RMSI and/or OSI of associated SS/PBCH block, and potentially in combination with higher layer parameters from RMSI and/or OSI.

In one example, the DCI can indicate the slot offset K from the slot containing the DCI to the start of the slot containing the scheduled type-1 RO(s).

In another example, the DCI can indicate the symbol offset S from the start of the first scheduled type-1 RO to the start of the slot containing the scheduled type-1 RO(s).

In one sub-example, LBT for the type-1 RO, if configured, can be performed in the symbol that precedes the symbol indicated by the offset S, while type-1 RO can transmit starting at the symbol indicated by offset S. In one sub-example, LBT for the type-1 RO, if configured, can be performed in the symbol that is indicated by the symbol offset S; while type-1 RO can transmit starting at the symbol that comes after the symbol indicated by offset S, or type-1 RO can transmit starting at the symbol indicated by offset S, such as when CP extension is used for type-1 RO.

In another example, the DCI can indicate the number of type-1 ROs P scheduled within the slot containing the scheduled type-1 RO(s).

In another example, the DCI can indicate the number of slots N that contains the scheduled type-1 RO(s).

In another example, the DCI can indicate the PRACH format of the DRS-scheduled type-1 RO, through which the UE can derive the number of symbols of each scheduled type-1 RO.

In another example, the DCI can indicate the LBT type associated with the DRS-scheduled type-1 RO. The time-domain overhead for LBT can be inferred from the LBT type of the type-1 RO, and the subcarrier spacing of the type-1 RO.

In another example, one or multiple of the time-domain configuration parameters for the DRS-scheduled type-1 RO(s), including the slot offset K, the symbol offset S, the number of slots N that contains the scheduled type-1 ROs, the number of type-1 ROs P scheduled within the slot containing the scheduled type-1 RO(s), the PRACH format of DRS scheduled type-1 RO, the LBT type for type-1 RO, can be each indicated by a dedicated field in the DCI. In one sub-example, one or multiple of the slot offset K/symbol offset S/number of slots N/number of type-1 ROs P/PRACH format/LBT type can be fixed in the specification.

For instance, the number of type-1 ROs P can be fixed to be 1. In another instance, the LBT type can be 1.

In one sub-example, the dedicated field in the DCI for the slot offset K/symbol offset S/number of slots N/number of type-1 ROs/PRACH format/LBT type can be chosen from a set with finite number of values $N_{tot}$, which can be indicated using $\lceil \log_2 N_{tot} \rceil$ bits.

In another sub-example, the dedicated field in the DCI for the slot offset K/symbol offset S/number of slots N/number of type-1 ROs/PRACH format/LBT type can be chosen from a default set of values fixed in the specification. For instance, the set can be {1, 2, 3, 4} with $N_{tot}=4$.

In another sub-example, the dedicated field in the DCI for the slot offset K/symbol offset S/number of slots N/number of type-1 ROs/PRACH format/LBT type can be configured by a list of slot offset values in RRC layer information element derived through RMSI and/or OSI corresponding to the associated SS/PBCH block of the UE; and bit width of the DCI field can be based on the number of entries of the higher layer list, wherein the bit width can be $\lceil \log_2 N_{tot} \rceil$ bits for a list $N_{tot}$ values for the slot offset; and the DCI value n refers to the (n+1)-th entry of the list.

For instance, the RRC layer configured list can be used if it has been configured, otherwise the default set of values fixed in the specification can be applied.

In another example, the DCI can indicate to the UE a joint configuration of the time-domain resource allocations of associated type-1 RO(s), wherein the joint configuration can include more than one of the slot offset K, the symbol offset S, the number of slots N that contains the scheduled type-1 ROs, the number of type-1 ROs P scheduled within the slot containing the scheduled type-1 RO(s), the PRACH format of DRS scheduled type-1 RO, and the LBT type for type-1 RO.

In one sub-example, the joint configuration for multiple of the slot offset K/symbol offset S/number of slots N/number of type-1 ROs P/PRACH format/LBT type can be fixed in the specification.

In one sub-example, the joint configuration for multiple of the slot offset K/symbol offset S/number of slots N/number of type-1 ROs/PRACH format/LBT type can be chosen from a set with finite number of values $N_{tot}$, which can be indicated using $\lceil \log_2 N_{tot} \rceil$ bits.

In another sub-example, the joint configuration for multiple of the slot offset K/symbol offset S/number of slots N/number of type-1 ROs/PRACH format/LBT type can be chosen from a default configuration table fixed in the specification, wherein DCI value n refers to the (n+1)-th entry of the joint configuration table for the time-domain configuration parameters.

For instance, TABLE 2 provides an illustration of the joint configuration table for slot offset and number of slots for type-1 ROs with 8 entries; while the symbol offset S and the number of type-1 ROs P scheduled within the slot can be either individually configured through the DCI, or derived through higher layer configuration.

TABLE 2

Joint configuration table

| Row Index | Slot offset K | Number of slots for type-1 ROs |
|---|---|---|
| 1 | 1 | 1 |
| 2 | 1 | 2 |
| 3 | 2 | 1 |
| 4 | 2 | 2 |
| 5 | 4 | 1 |
| 6 | 4 | 2 |
| 7 | 8 | 1 |
| 8 | 8 | 2 |

In another instance, TABLE 3 provides an illustration of the joint configuration table for slot offset, number of slots for type-1 ROs, symbol offset S, number of slots for type-1 ROs, PRACH format, and LBT type with 8 entries; wherein LBT type of 0 is no-LBT and LBT type of 1 is CAT-2 LBT.

TABLE 3

Joint configuration table

| Row Index | Slot offset K | Symbol offset S | Number of type-1 ROs P per slot | Number of slots for type-1 ROs | PRACH format | LBT type |
|---|---|---|---|---|---|---|
| 1 | 1 | 0 | 1 | 1 | A1 | 0 |
| 2 | 1 | 1 | 2 | 1 | A1 | 1 |
| 3 | 1 | 1 | 4 | 1 | A1 | 1 |
| 4 | 1 | 1 | 2 | 2 | A2 | 1 |
| 5 | 2 | 1 | 4 | 1 | A1 | 1 |
| 6 | 2 | 1 | 2 | 1 | A2 | 1 |
| 7 | 2 | 1 | 4 | 1 | A1 | 1 |
| 8 | 2 | 1 | 2 | 2 | A2 | 1 |

In another sub-example, the joint configuration can include more than one of the slot offset K/symbol offset S/number of slots N/number of type-1 ROs/PRACH format/LBT type, which can be configured by a type-1 RO time-domain resource allocation list field in RRC layer and can be derived through RMSI and/or OSI corresponding to the associated SS/PBCH block of the UE.

The type-1 RO time-domain resource allocation list field value provides a list of joint configurations of the type-1 RO time-domain resource allocation parameters.

The bit width of the DCI field can be based on the number of entries of the higher layer type-1 RO time-domain resource allocation list field, and the DCI value n refers to the (n+1)-th entry of the list.

For instance, the type-1 RO time-domain resource allocation list can be carried in the field defined as follows, wherein one or multiple elements in Type1RO-TimeDomainResourceAllocation can be optional.

```
Type1RO-TimeDomainResourceAllocationList ::= SEQUENCE
   (SIZE(1..maxNrofType1RO-Allocations)) OF Type1RO-
   TimeDomainResourceAllocation
Type1RO-TimeDomainResourceAllocation ::= SEQUENCE {
       Slot_offset              INTEGER(0..8),
       Symbol_offset            INTEGER (0..12),
       Num_RO_per_slot          INTEGER (0..12),
       Num_of_RO_slots          INTEGER (0..127)
       RACH_format              ENUMERATED
{A1,A2,A3,B1,B2,B3,B4,C0,C2}
       LBT_type                 CHOICE {'no LBT', 'CAT-2 LBT'}
   }
```

In another example, one or multiple of the time-domain configuration parameters for the DRS-scheduled type-1

RO(s), including the slot offset K, the symbol offset S, the number of slots N that contains the scheduled type-1 ROs, the number of type-1 ROs P scheduled within the slot containing the scheduled type-1 RO(s), the PRACH format of DRS scheduled type-1 RO, the LBT type for type-1 RO, can be configured by higher layer parameter(s).

In one sub-example, the time-domain configuration parameters not derived through the DCI can be configured through higher layer parameter(s). For instance, through one or multiple examples from the aforementioned embodiment.

In another example, the DRS scheduled type-1 RO can be scheduled in the time-domain on a per type-1 RO basis, or a per-group of type-1 ROs basis.

In another example, the DCI corresponding to RMSI and/or OSI of associated SS/PBCH block can indicate to the UE a joint configuration of both frequency domain resource allocation and time domain resource allocation related parameters of the DRS-scheduled type-1 RO(s).

In one example, a UE can derive associated type-1 RO(s) through detecting the PDCCH and corresponding DCI of the remaining system information and/or other system information corresponding to associated SS/PBCH block; and potentially in combination with information from the higher layer derived through RMSI and/or OSI.

In NR, after detecting the SS/PBCH block, a UE can obtain the configuration of time and frequency domain physical random access channel (PRACH) resources, the PRACH format and parameters for determining the PRACH preamble sequence, through the remaining system information (RMSI) or equivalently the system information block (SIB1). In addition, a UE can be provided through higher layer (e.g., via RRC) a number N of SS/PBCH blocks associated with one valid RACH occasion (RO), and a UE can derive associated RO(s) for PRACH transmission based on such association as well as the time/frequency resource configuration for PRACH.

Given the requirement of LBT, an NR-U UE is not guaranteed to have channel access to transmit PRACH at the higher-layer (e.g., RRC) configured RACH occasion, thereby potentially increasing the overall random access delay and reducing the PRACH resource utilization. To decrease the overall random access delay, NR-U PRACH can be assigned a higher priority LBT (e.g., single-shot LBT) subject to regulation allowance, or configure additional RACH occasions besides those configured through PRACH configuration table (as in NR).

In the present disclosure, the type-0 RACH occasions and type-1 RACH occasions are used, which are defined as follows respectively: Type-0 RACH occasion: type-0 ROs are the time-domain and frequency-domain resources that are semi-statically configured by the higher layer (e.g., RRC) for PRACH transmissions through similar examples as in NR, wherein the time-domain resources for type-0 ROs are configured through a higher-layer parameter (e.g., prach-ConfigurationIndex) that maps to an entry in the PRACH configuration table, and the frequency resources for type-0 ROs can also be configured by higher layer parameters (e.g., msg1-FrequencyStart and msg1-FDM). Type-0 ROs are configured within a configurable subset of slots of a RACH configurable period, which may repeat across different RACH configurable periods; and Type-1 ROs: type-1 ROs refer to the additionally configured ROs other than the type-0 ROs.

In NR-U, due to the LBT requirement for granting the PRACH transmission, the UEs are not guaranteed to pass the LBT and utilize the semi-statically configured type-0 ROs. As a result, as an alternative to semi-statically configured type-0 ROs, additional dynamically scheduled type-1 ROs can be configured by the network in order to increase the transmit opportunity of the PRACH. Such dynamic type-1 ROs can be scheduled through the downlink control information (DCI) for connected UEs.

The present disclosure is focused on the design aspects for the configuration of DCI scheduled ROs, which include the configuration of the DCI scheduled type-1 ROs including the frequency-domain resource and time-domain resource configurations.

The present disclosure includes several embodiments, principles, approaches and examples that can be used in conjunction or in combination with one another or can operate as standalone. The embodiments/principles/approaches/examples in this disclosure can be applied to FBE-based NR-U, LBE-based NR-U, or both FBE-based and LBE-based NR-U.

In the present disclosure, FR1 NR-U refers to NR-U that operates in the unlicensed/shared bands in FR1, such as the 5 GHz unlicensed bands or the 6 GHz unlicensed/shared bands; and FR2 GHz NR-U refers to NR-U that operators in the unlicensed/shared bands in FR2, such as the 60 GHz unlicensed bands.

In one embodiment, frequency-domain resource allocation of DCI scheduled type-1 RO is provided.

The UE needs to derive the following information of the dynamic type-1 RO scheduled by DCI: (1) the frequency-domain resource allocation of the type-1 RO; (2) the time-domain resource allocation of the type-1 RO; (3) the PRACH format; (4) the parameters for determining the PRACH sequence (e.g., root sequence, cyclic shift, set type, etc.); and (5) the LBT type associated with the DCI-scheduled type-1 RO.

A design consideration is the indication of the frequency-domain resource allocation of the type-1 RO from the DCI, wherein the frequency domain resource allocation of the type-1 RO from the DCI depends on the resource allocation of the type-1 RO in the frequency domain.

In one embodiment, the DCI can configure information of the frequency domain resources containing the DCI-scheduled type-1 RO(s), including one or multiple of the: carrier indicator, UL/supplemental UL (SUL) indicator, bandwidth part indicator, and sub-band indicator.

In one example, the carrier indicator can be present in the DCI scheduling type-1 RO(s), such that cross-carrier scheduling can be supported for a gNB to schedule additional type-1 ROs dynamically in the carrier different from the scheduling carrier. In a sub-example, the carrier indicator, when present, can be of 3 bits similar to NR standard specification.

In another example, the UL/SUL indicator can be present in the DCI scheduling type-1 RO(s), such that the dynamic type-1 ROs can be scheduled on supplemental UL carrier through the DCI. In a sub-example, the UL/SUL indicator can follow similar definition as in NR.

In another example, the bandwidth part (BWP) indicator can be present in the DCI scheduling type-1 RO(s), such that for the UEs supporting active BWP change via DCI, the dynamic type-1 ROs can be scheduled on different BWP(s) from the BWP containing the DCI.

In one sub-example, only one UL BWP is activated at a time, and the bit-width for the BWP indicator field can be determined as $\lceil \log_2(n_{BWP}) \rceil$, wherein $n_{BWP}=1+n_{BWP,RRC}$ if the number of additional RRC-configured UL BWPs (excluding initial active UL BWP) $n_{BWP,RRC} \leq 3$; otherwise $n_{BWP}=n_{BWP,RRC}$.

In another sub-example, only one UL BWP is activated at a time, the bit-width for the BWP indicator field can be determined as $\lceil \log_2(n_{BWP}) \rceil$, wherein $n_{BWP}=1+n_{BWP,RRC}$, wherein $n_{BWP,RRC}$ is the number of additional RRC-configured UL BWPs (excluding initial active UL BWP).

In another sub-example, more than one UL BWPs can be activated, and the activated BWPs can be indicated through a bitmap with the bit-width for the BWP indicator field can be determined as $n_{BWP}$, wherein $n_{BWP}=1+n_{BWP,RRC}$ if the number of additional RRC-configured UL BWPs (excluding initial active UL BWP) $n_{BWP,RRC} \leq 3$; otherwise $n_{BWP}=n_{BWP,RRC}$.

In another sub-example, more than one UL BWPs can be activated, and the activated BWPs can be indicated through a bitmap with the bit-width for the BWP indicator field can be determined as $n_{BWP}$, wherein $n_{BWP}=1+n_{BWP,RRC}$ and $n_{BWP,RRC}$ is the number of additional RRC-configured UL BWPs (excluding initial active UL BWP).

In another sub-example, multiple active UL BWPs can be configured to include DCI-scheduled type-1 ROs subject to certain constraints, such as the multiple active UL BWPs including the DCI-scheduled do not overlap in the frequency domain.

In one example, the sub-band indicator can be present in the DCI scheduling type-1 RO(s), such that for the configured active UL BWP containing the DCI-scheduled type-1 RO(s) with bandwidth larger than the sub-band bandwidth, the type-1 RO can only be configured on one or multiple of the sub-bands within the active UL BWP indicated by the sub-band indicator field (SIF).

In a sub-example, the sub-band bandwidth can be one of the fixed by specification, configured by the higher layer parameter, or configured by the DCI. For instance, the sub-band can be 20 MHz for FR1 NR-U. In another instance, there can exist a finite set of supported sub-band bandwidths, and DCI or higher layer parameter can indicate the selected sub-band bandwidth. In another instance, the sub-band can be fixed to be the same as the frequency-domain granularity for LBT operation corresponding to the type-1 ROs.

In another sub-example, the number of sub-bands within the BWP can be one of indicated explicitly by the higher layer parameter; indicated explicitly by DCI; inferred implicitly based on the sub-band bandwidth and BWP bandwidth respectively, wherein the sub-bands are non-overlapping in frequency domain.

Figure 17:
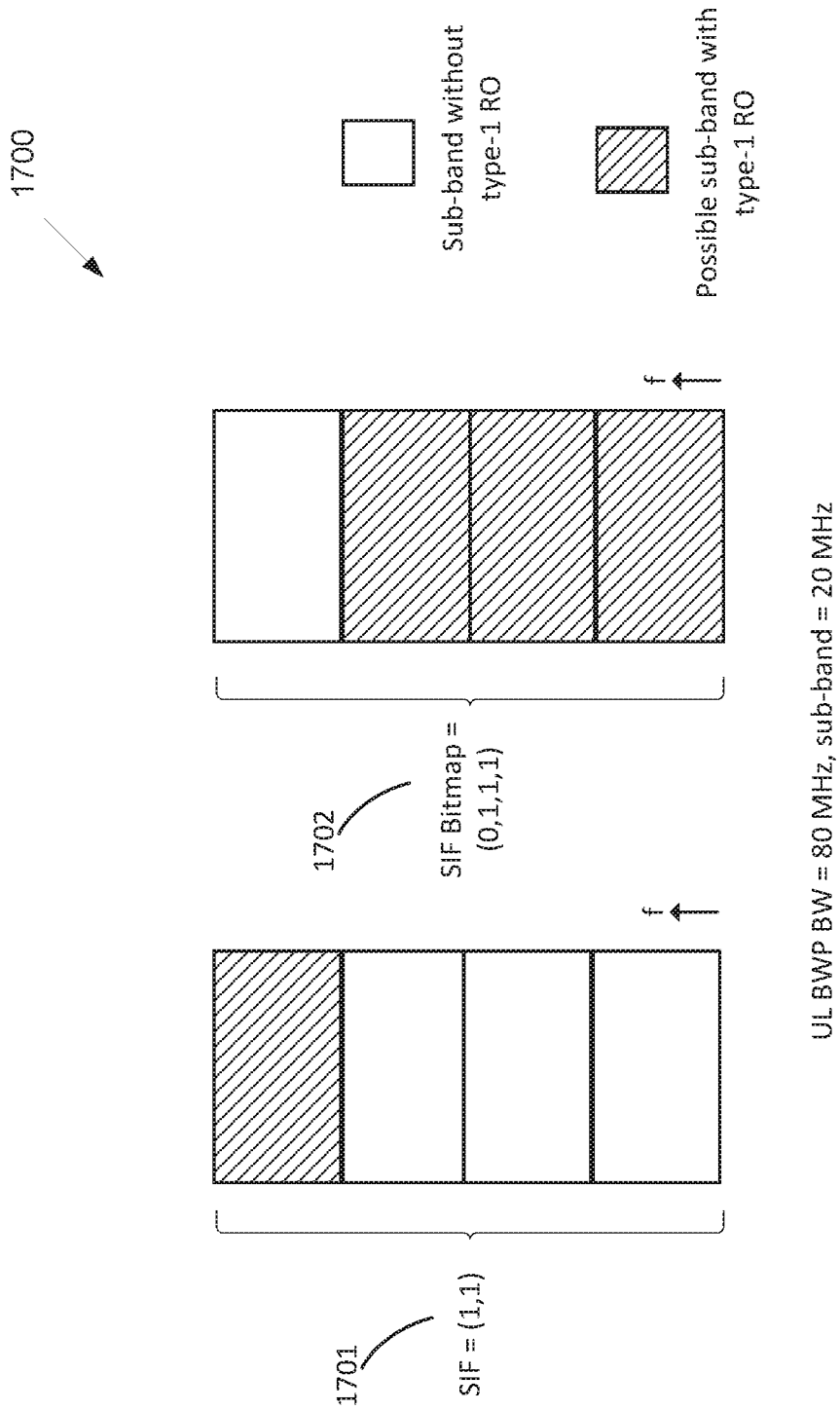
FIG. 17 illustrates an example frequency domain resource allocation according to embodiments of the present disclosure.

FIG. 17 illustrates an example frequency domain resource allocation 1700 according to embodiments of the present disclosure. An embodiment of the frequency domain resource allocation 1700 shown in FIG. 17 is for illustration only. FIG. 17 does not limit a scope of the present disclosure.

In another sub-example, one of the sub-bands within the active UL BWP can be configured to contain the type-1 ROs, and the bit-width for the sub-band indicator field can be determined as $\lceil \log_2(n_{subband,BWP}) \rceil$, wherein $n_{subband,BWP}$ is the number of non-overlapping sub-bands within the configured active UL BWP containing the DCI-scheduled type-1 RO(s). For instance, for active UL BWP of 80 MHz, and sub-band of 20 MHz, the bit-width for sub-band indicator field is 2. An illustration of this sub-example is provided in FIG. 17 (e.g., 1701).

In another sub-example, one or multiple the sub-bands within the active UL BWP can be configured to contain the type-1 ROs through a bitmap, and the bit-width for the sub-band indicator field can be determined as $n_{subband,BWP}$, wherein $n_{subband,BWP}$ is the number of non-overlapping sub-bands within the configured active UL BWP containing the DCI-scheduled type-1 RO(s). For instance, for active UL BWP of 80 MHz, and sub-band of 20 MHz, the bit-width for sub-band indicator field is 4. Another illustration of this sub-example is provided in FIG. 17 (e.g., 1702).

In another sub-example, when the sub-band indicator field is not present, or equivalently the number of bit for sub-band indicator field is 0, the type-1 RO(s) can possibly be configured on any sub-band within the active UL BWP containing the DCI-scheduled type-1 RO(s).

In one example, the frequency domain resource for DCI-scheduled type-1 RO can be configured with each type-1 RO being allocated through an interlaced-mapping in the frequency domain; and the frequency-domain allocation for type-1 RO(s) scheduled by the DCI in the BWP(s) and/or sub-band(s) containing the DCI-scheduled type-1 RO(s) of the serving cell can be indicated through a frequency-domain resource assignment field in the DCI.

In one example, for a given configured interlaced-mapping in the frequency domain for a type-1 RO, which can be a regular or irregular interlaced structure, the possible frequency positions for DCI-scheduled type-1 ROs and correspondingly the maximum number of DCI-scheduled type-1 ROs in the BWP(s) or sub-band(s) containing the DCI-scheduled type-1 RO(s) associated with the serving cell can be pre-determined or configured by the higher layer parameter(s).

In one sub-example, if each type-1 RO interlace contains L PRBs, and the bandwidth for the BWP containing the DCI-scheduled type-1 RO(s) is B1 PRBs; the potential interlace positions within the BWP of the serving cell can be pre-determined, and the maximum number of DCI-scheduled type-1 ROs in the BWP containing the DCI-scheduled type-1 RO(s) of the serving cell is $\lfloor B1/L \rfloor$.

In another sub-example, if each type-1 RO interlace contains L PRBs, the bandwidth for the sub-band containing the DCI-scheduled type-1 RO(s) is B2 PRBs; the number of sub-bands within the active UL BWP that can contain the DCI-scheduled type-1 ROs in the BWP is N; then the potential interlace positions within each sub-band containing the DCI-scheduled type-1 ROs of the serving cell can be pre-determined, and the maximum number of DCI-scheduled type-1 ROs in the BWP containing the DCI-scheduled type-1 RO(s) of the serving cell is $N \times \lfloor B2/L \rfloor$ or $\lfloor N \times B2/L \rfloor$.

In another sub-example, the higher layer parameter can configure the predetermined potential interlace positions and correspondingly the maximum number of DCI-scheduled type-1 ROs within the BWP and/or sub-band(s) containing the DCI-scheduled type-1 RO(s) of the serving cell.

In another sub-example, the type-1 ROs can share the interlace structure of the PUSCH and/or PUCCH, such that each type-1 RO interlace is mapped onto one or multiple of the PUSCH/PUCCH interlaces, and among such PUSCH/PUCCH interlaces, all or a subset of each PUSCH/PUCCH interlace is mapped to the PRACH sequence of the type-1 RO.

In another sub-example, the interlace mapping can be separately defined for type-1 ROs compared to PUSCH/PUCCH interlace, such that the type-1 RO interlace and PUSCH/PUCCH interlace can have different number of PRBs per interlace and number of interlaces for a given sub-band and/or BWP.

In another sub-example, the predetermined or configured potential interlaces for DCI-scheduled type-1 ROs can be ordered by increasing order of the lowest frequency resource of interlace.

In another sub-example, the predetermined or configured potential interlaces for DCI-scheduled type-1 ROs can be ordered by increasing order of the lowest frequency resource (e.g., RE or RB) of the interlace within the sub-band, then by increasing order of the lowest frequency resource (e.g., RE or RB) of the sub-bands containing the DCI-scheduled type-1 RO(s).

In one example, the frequency-domain resource assignment field of the DCI can indicate through a bitmap the scheduled frequency-domain interlace position(s), among the configured frequency-domain positions for DCI-scheduled type-1 ROs within the BWP containing the DCI-scheduled type-1 ROs of the serving cell.

In one sub-example, if the maximum number of DCI-scheduled type-1 ROs in the BWP containing the DCI-scheduled type-1 RO(s) associated with the serving cell is M_t, the bit-width for the frequency-domain resource assignment field in this example is M_t.

Figure 18:
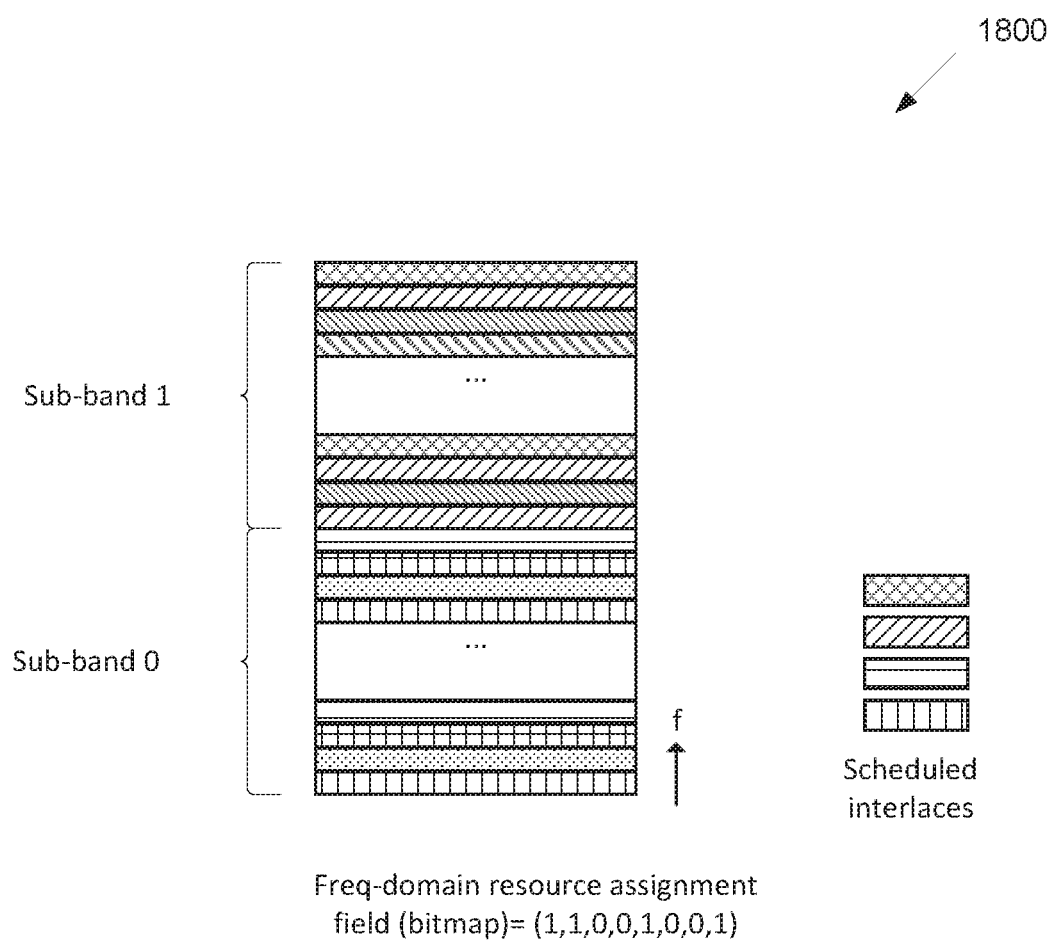
FIG. 18 illustrates another example frequency domain resource allocation according to embodiments of the present disclosure.

FIG. 18 illustrates another example frequency domain resource allocation 1800 according to embodiments of the present disclosure. An embodiment of the frequency domain resource allocation 1800 shown in FIG. 18 is for illustration only. FIG. 18 does not limit a scope of the present disclosure.

An illustration of this example is illustrated in FIG. 18, wherein the BWP containing the DCI-scheduled type-1 RO(s) of the serving cell is 40 MHz, which contains 2 sub-bands with each sub-band being 20 MHz and 4 interlaces configured per sub-band. The frequency-domain resource assignment field is of 8 bits, with the i-th bit (0<=i<=7) corresponds to the i-th interlace ordered by the increasing order of the lowest frequency domain position of the type-1 RO interlace, and 1 indicates the i-th interlace is scheduled and 0 otherwise.

In one example, when the sub-band indicator field is present, the frequency-domain resource assignment field of the DCI can indicate through a bitmap the scheduled frequency-domain interlace position(s), among the configured frequency-domain positions for DCI-scheduled type-1 ROs for each sub-band containing the DCI-scheduled type-1 ROs of the serving cell, wherein the sub-band is configured through the sub-band indicator field.

In one sub-example, if the number sub-bands configured by the sub-band indicator field to contain type-1 ROs is n, and maximum number of DCI-scheduled type-1 ROs in each sub-band containing the DCI-scheduled type-1 RO(s) is M, the bit-width for the frequency-domain resource assignment field in this example is n×M.

Figure 19:
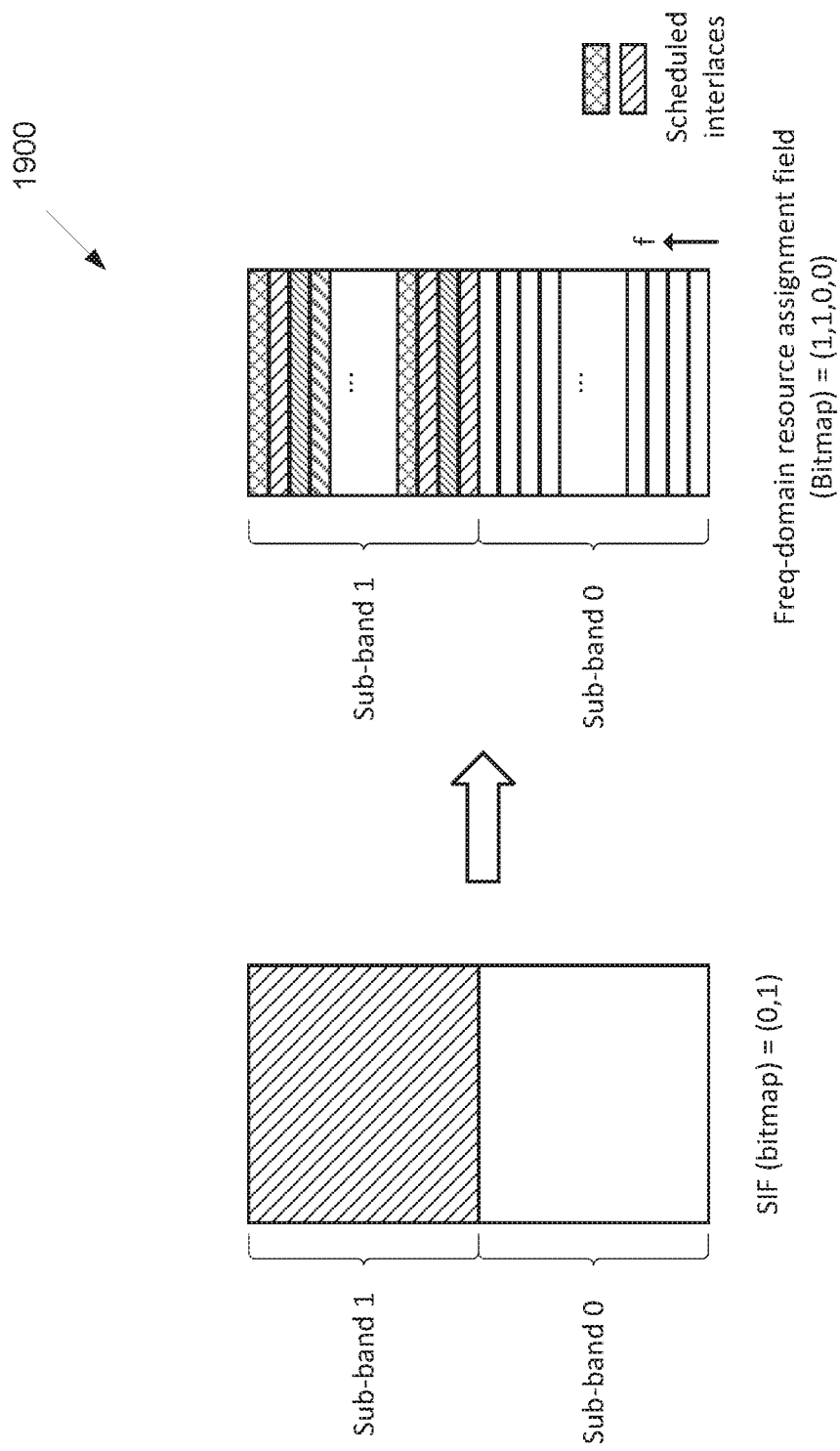
FIG. 19 illustrates yet another example frequency domain resource allocation according to embodiments of the present disclosure.

FIG. 19 illustrates yet another example frequency domain resource allocation 1900 according to embodiments of the present disclosure. An embodiment of the frequency domain resource allocation 1900 shown in FIG. 19 is for illustration only. FIG. 19 does not limit a scope of the present disclosure.

An illustration of this example is provided in FIG. 19, wherein the sub-band indicator field indicates n=1 sub-band (i.e., sub-band 1) contains type-1 ROs, wherein sub-band 1 is 20 MHz with M=4 interlaces being configured. The frequency-domain resource assignment field is of n×M=4 bits, with the i-th bit (0<=i<=3) corresponds to the i-th interlace in sub-band 1 ordered by the increasing order of the lowest frequency domain position of the type-1 RO interlace, and 1 indicates the i-th interlace is scheduled and 0 otherwise.

In one example, the frequency-domain resource assignment field of the DCI can indicate only one scheduled frequency-domain interlace position among the configured frequency-domain positions for DCI-scheduled type-1 ROs within the BWP containing the DCI-scheduled type-1 ROs of the serving cell.

In one sub-example, if the maximum number of DCI-scheduled type-1 ROs in the BWP containing the DCI-scheduled type-1 RO(s) associated with the serving cell is M_t, the bit-width for the frequency-domain resource assignment field in this example is $\lceil \log_2(M_t) \rceil$.

Figure 20:
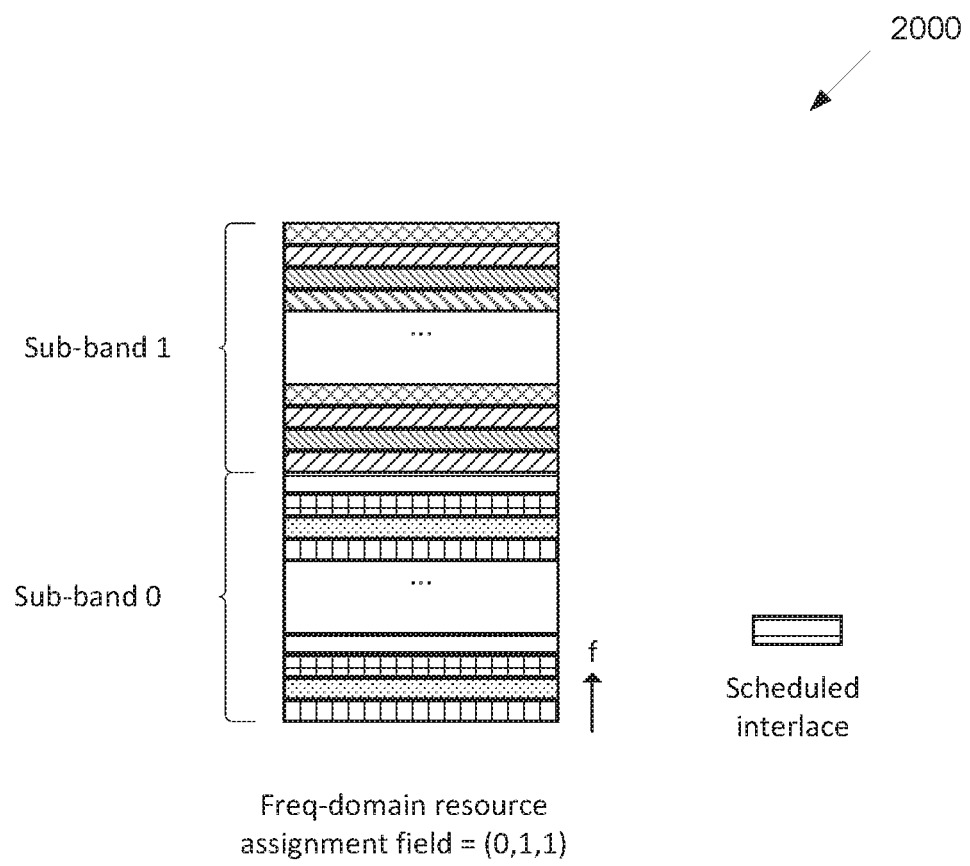
FIG. 20 illustrates yet another example frequency domain resource allocation according to embodiments of the present disclosure.

FIG. 20 illustrates yet another example frequency domain resource allocation 2000 according to embodiments of the present disclosure. An embodiment of the frequency domain resource allocation 2000 shown in FIG. 20 is for illustration only. FIG. 20 does not limit a scope of the present disclosure.

An illustration of this sub-example is provided in FIG. 20, wherein the BWP containing the DCI-scheduled type-1 RO(s) of the serving cell is 40 MHz, which contains 2 sub-bands with each sub-band being 20 MHz and 4 interlaces configured per sub-band. The frequency-domain resource assignment field is of $\lceil \log_2(M_t) \rceil = 3$, with value i (0<=i<=7) corresponds to the i-th interlace being scheduled, wherein the interlaces are ordered by the increasing order of the lowest frequency domain position of the type-1 RO interlace.

In another sub-example, if the maximum number of DCI-scheduled type-1 ROs in the BWP containing the DCI-scheduled type-1 RO(s) associated with the serving cell is M_t, the bit-width for the frequency-domain resource assignment field in this example is $\lceil \log_2(M_t+1) \rceil$ In one example, when the sub-band indicator field is present, the frequency-domain resource assignment field of the DCI can indicate only one scheduled frequency-domain interlace position among the configured frequency-domain positions for DCI-scheduled type-1 ROs within all the sub-band(s) containing the DCI-scheduled type-1 ROs of the serving cell.

In one sub-example, if the number sub-bands configured by the sub-band indicator field to contain type-1 ROs is n, and maximum number of DCI-scheduled type-1 ROs in each sub-band containing the DCI-scheduled type-1 RO(s) is M, the bit-width for the frequency-domain resource assignment field in this example is $\lceil \log_2(n \times M) \rceil$.

Figure 21:
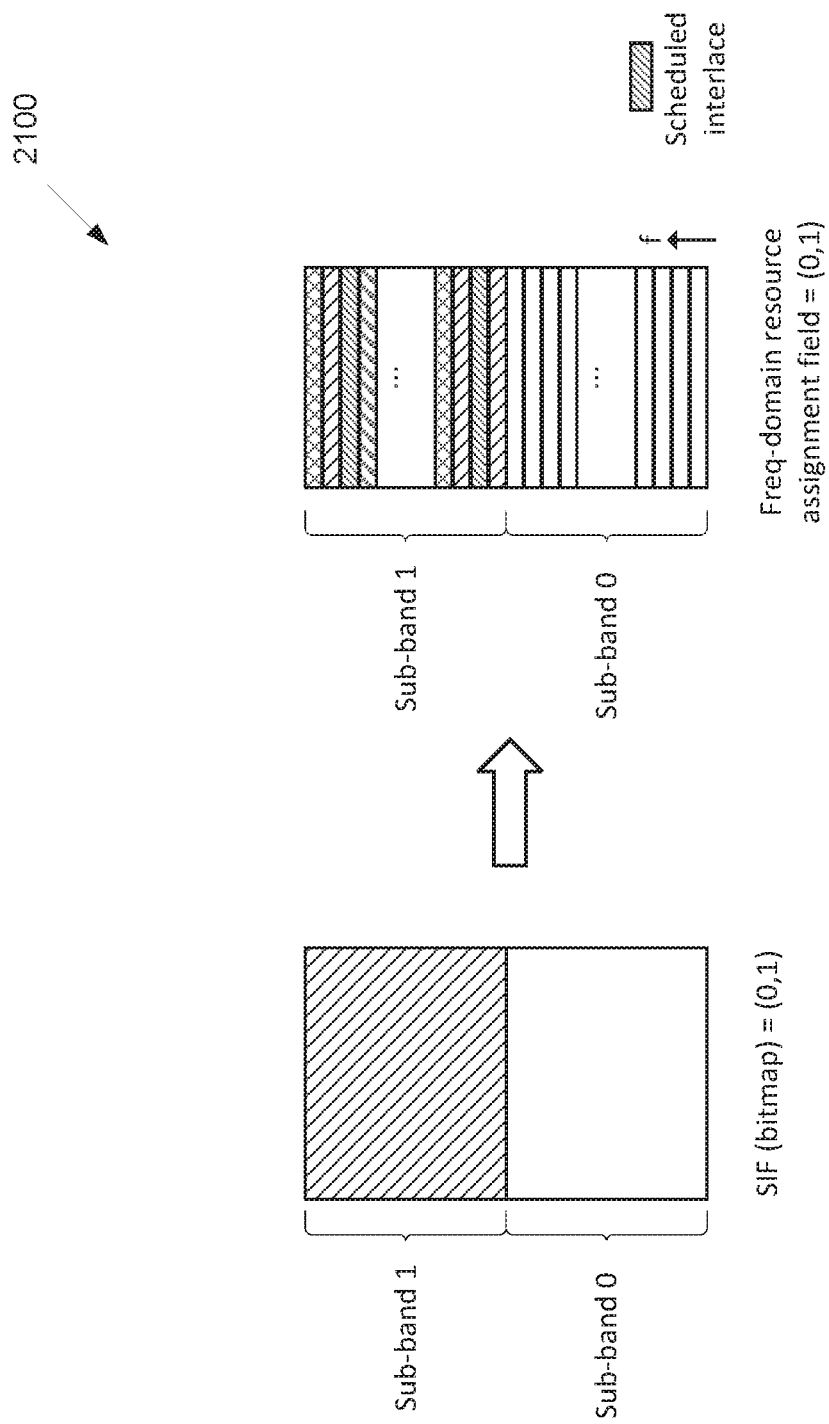
FIG. 21 illustrates yet another example frequency domain resource allocation according to embodiments of the present disclosure.

FIG. 21 illustrates yet another example frequency domain resource allocation 2100 according to embodiments of the present disclosure. An embodiment of the frequency domain resource allocation 2100 shown in FIG. 21 is for illustration only. FIG. 21 does not limit a scope of the present disclosure.

An illustration of this example is provided in FIG. 21, wherein the sub-band indicator field indicates n=1 sub-band (i.e., sub-band 1) contains type-1 ROs, wherein sub-band 1 is 20 MHz with M=4 interlaces being configured. The frequency-domain resource assignment field is of $\lceil \log_2(n \times M) \rceil = 2$ bits, with value i (0<=i<=3) corresponds to the i-th interlace being scheduled, wherein the interlaces are ordered by the increasing order of the lowest frequency domain position of the type-1 RO interlace.

In one example, the frequency-domain resource assignment field of the DCI can indicate for each sub-band within the BWP containing the DCI-scheduled type-1 ROs of the serving cell, one scheduled frequency-domain interlace position within this sub-band for type-1 RO.

In one sub-example, if the number sub-bands within the BWP containing the DCI-scheduled type-1 RO(s) of the serving cell is N, and the maximum number of DCI-scheduled type-1 ROs in each sub-band is M, the bit-width for the frequency-domain resource assignment field in this example is $\lceil N \times \log_2(M) \rceil$.

Figure 22:
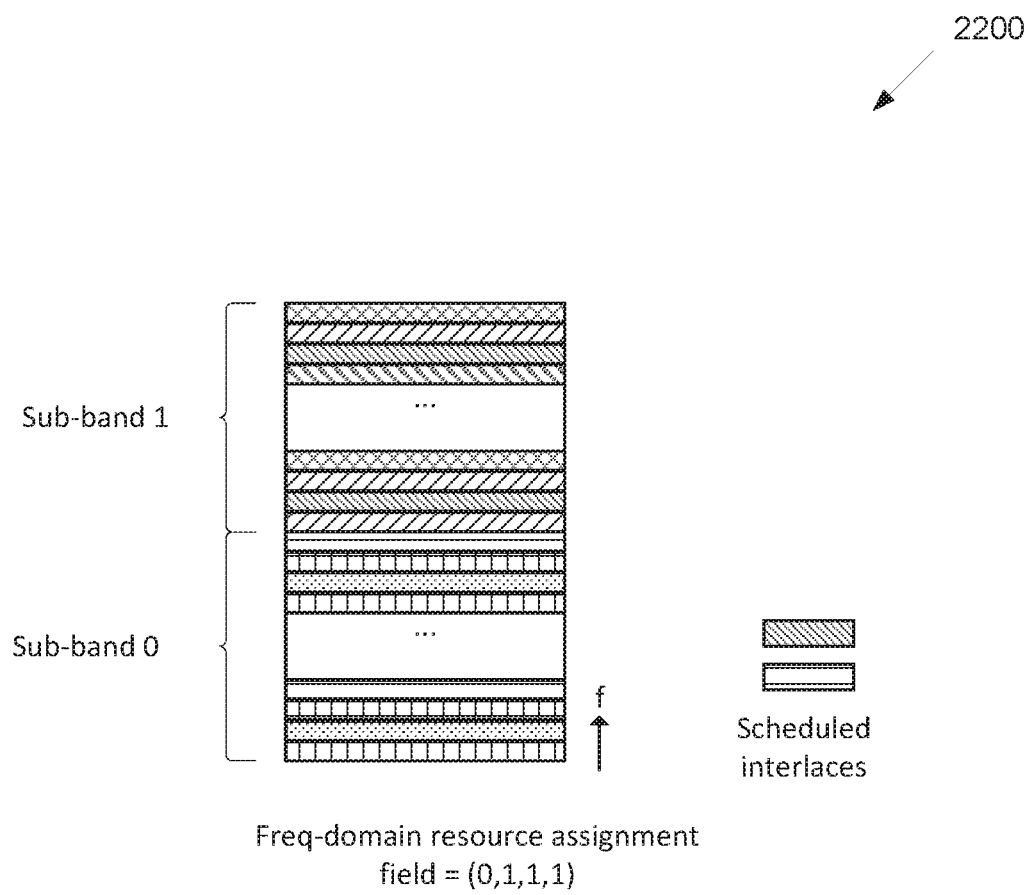
FIG. 22 illustrates yet another example frequency domain resource allocation according to embodiments of the present disclosure.

FIG. 22 illustrates yet another example frequency domain resource allocation 2200 according to embodiments of the present disclosure. An embodiment of the frequency domain resource allocation 2200 shown in FIG. 22 is for illustration only. FIG. 22 does not limit a scope of the present disclosure.

An illustration of this sub-example is provided in FIG. 22, wherein the BWP containing the DCI-scheduled type-1 RO(s) of the serving cell is 40 MHz, which contains N=2 sub-bands with each sub-band being 20 MHz and M=4 interlaces configured per sub-band. The frequency-domain resource assignment field is of $\lceil N \times \log_2(M)\rceil=4$, with the first 2 bits corresponds to the scheduled interlace in sub-band 0, and the $3^{rd}$ and $4^{th}$ bit correspond to the scheduled interlace in sub-band 1.

In one example, when the sub-band indicator field is present, the frequency-domain resource assignment field of the DCI can indicate for each configured sub-band containing the DCI-scheduled type-1 ROs of the serving cell, one scheduled frequency-domain interlace position within this sub-band.

In one sub-example, if the number sub-bands within the BWP configured by the sub-band indicator field to contain the DCI-scheduled type-1 RO(s) of the serving cell is n, and the maximum number of DCI-scheduled type-1 ROs in each sub-band is M, the bit-width for the frequency-domain resource assignment field in this example is $\lceil n \times \log_2(M)\rceil$.

Figure 23:
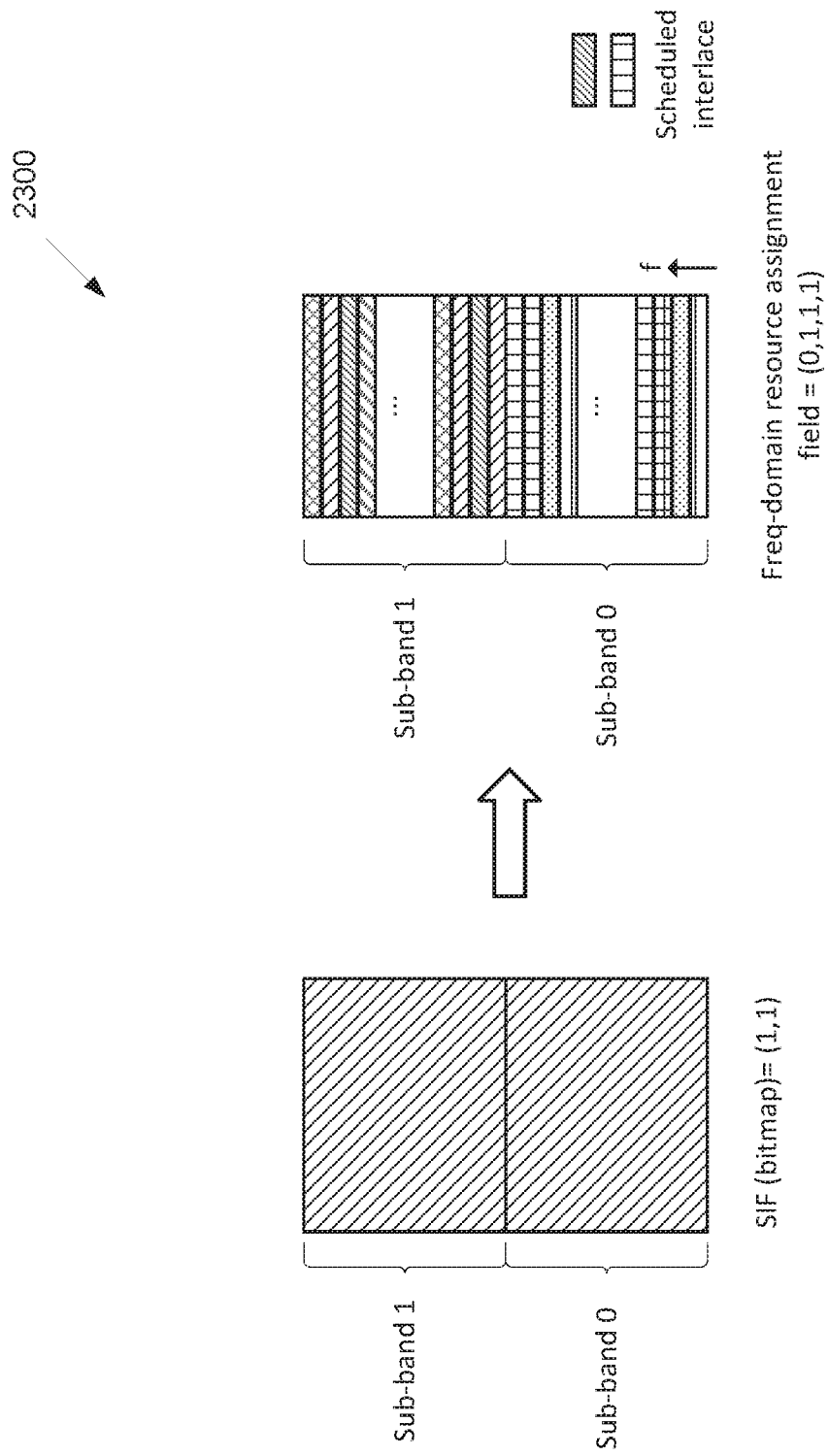
FIG. 23 illustrates yet another example frequency domain resource allocation according to embodiments of the present disclosure.

FIG. 23 illustrates yet another example frequency domain resource allocation 2300 according to embodiments of the present disclosure. An embodiment of the frequency domain resource allocation 2300 shown in FIG. 23 is for illustration only. FIG. 23 does not limit a scope of the present disclosure.

An illustration of this sub-example is provided in FIG. 23, wherein the sub-band indicator field indicates n=2 sub-bands (i.e., sub-band 0 and 1) contain type-1 ROs, and M=4 interlaces configured per sub-band. The frequency-domain resource assignment field is of $\lceil n \times \log_2(M)\rceil=4$, with the first 2 bits corresponds to the scheduled interlace in sub-band 0, and the $3^{rd}$ and $4^{th}$ bit correspond to the scheduled interlace in sub-band 1.

In one example, the frequency-domain resource assignment field of the DCI can indicate for every sub-band within BWP containing the DCI-scheduled type-1 ROs of the serving cell, a same scheduled frequency-domain interlace position within this sub-band for type-1 RO.

In one sub-example, the aforementioned examples and embodiments can be applied for either sub-band indicator field is present, or the sub-band indicator field is not present.

In another sub-example, if the maximum number of DCI-scheduled type-1 ROs in each sub-band is M, the bit-width for the frequency-domain resource assignment field in this example is $\lceil \log_2(M)\rceil$.

Figure 24:
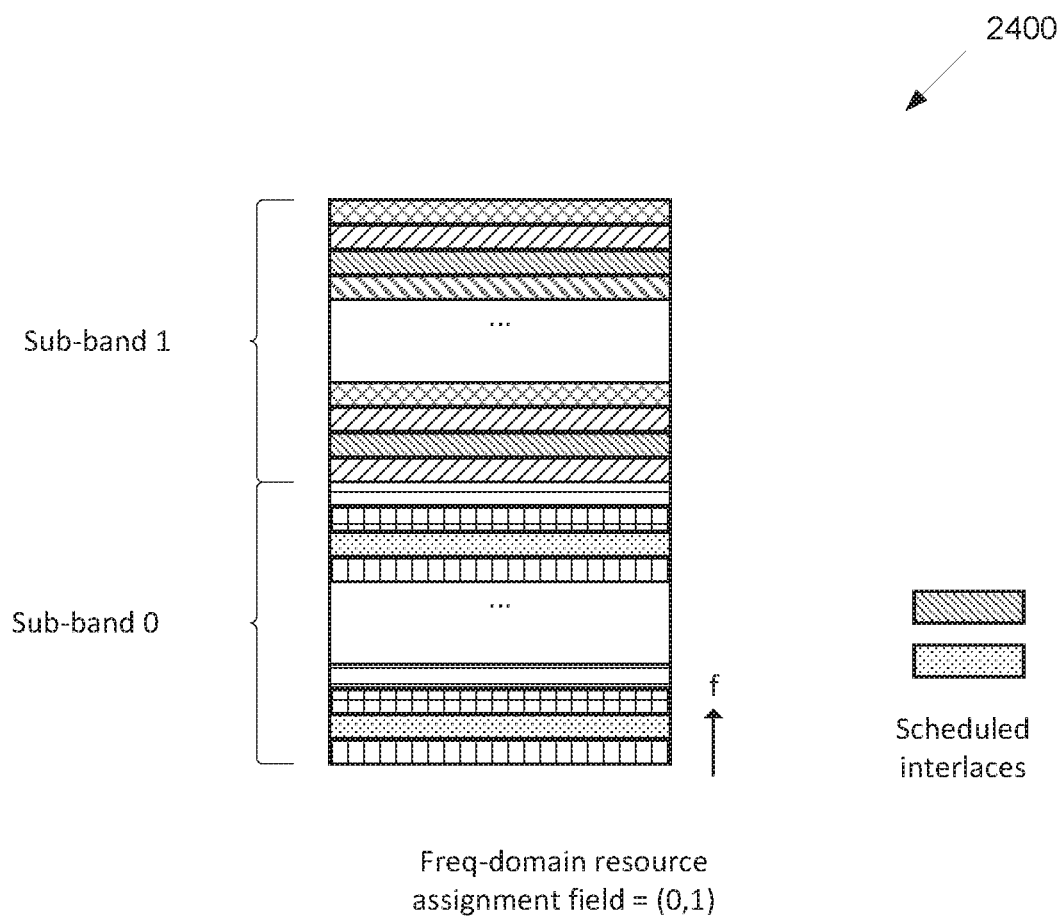
FIG. 24 illustrates yet another example frequency domain resource allocation according to embodiments of the present disclosure.

FIG. 24 illustrates yet another example frequency domain resource allocation 2400 according to embodiments of the present disclosure. An embodiment of the frequency domain resource allocation 2400 shown in FIG. 24 is for illustration only. FIG. 24 does not limit a scope of the present disclosure.

An illustration of this sub-example is provided in FIG. 24, wherein the sub-band indicator field is not present, and each sub-band is 20 MHz with M=4 interlaces configured per sub-band. The frequency-domain resource assignment field is of $\lceil \log_2(M)\rceil=2$, with value i ($0<=i<=3$) indicates the i-th interlace in each sub-band is scheduled, wherein the interlaces are ordered by the increasing order of the lowest frequency domain position of the type-1 RO interlace.

Figure 25:
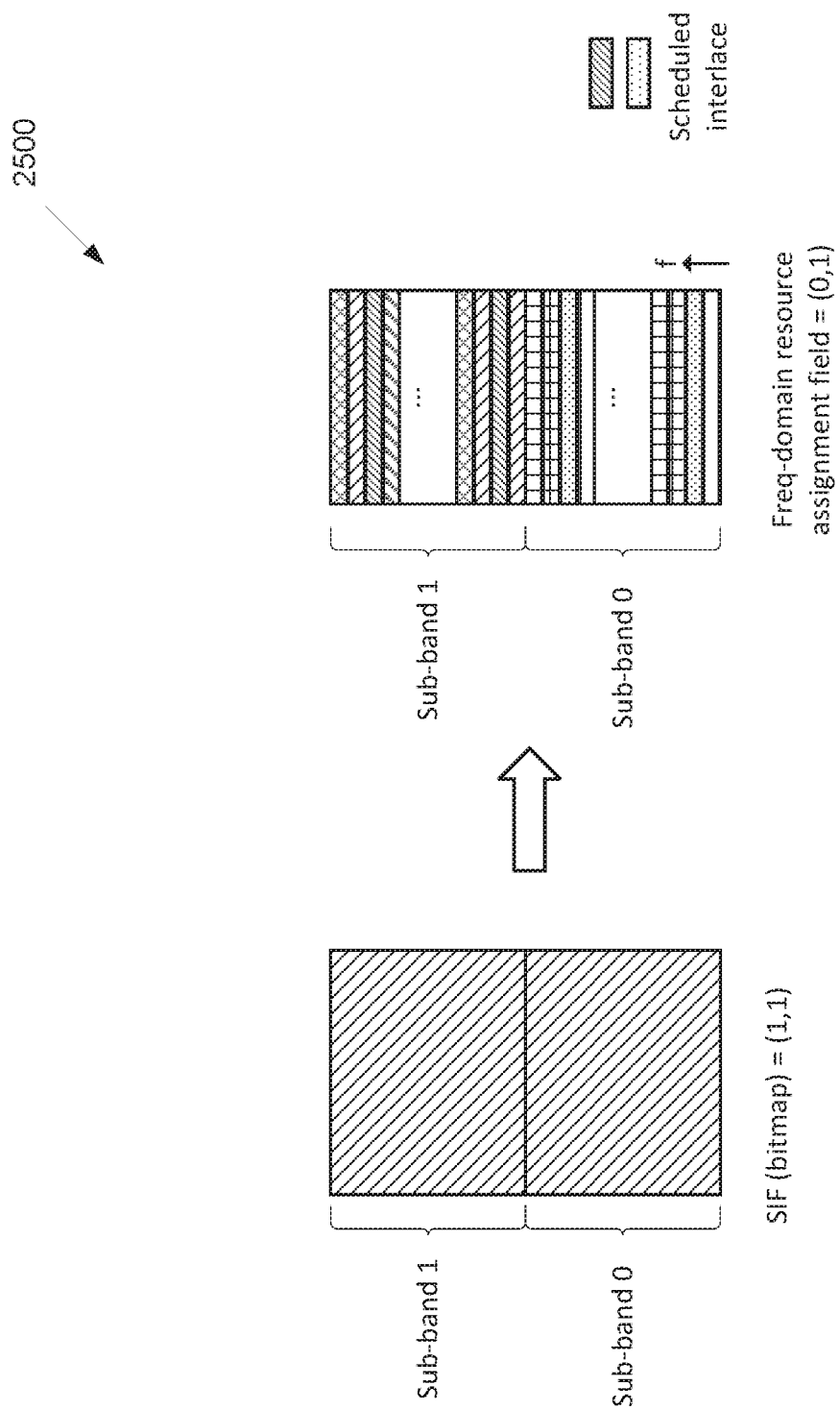
FIG. 25 illustrates yet another example frequency domain resource allocation according to embodiments of the present disclosure.

FIG. 25 illustrates yet another example frequency domain resource allocation 2500 according to embodiments of the present disclosure. An embodiment of the frequency domain resource allocation 2500 shown in FIG. 25 is for illustration only. FIG. 25 does not limit a scope of the present disclosure.

Another illustration of this sub-example is provided in FIG. 25, wherein the sub-band indicator field (SIF) is present, and each sub-band configured by the SIF is 20 MHz with M=4 interlaces configured per sub-band. The frequency-domain resource assignment field is of $\lceil \log_2(M)\rceil=2$, with value i ($0<=i<=3$) indicates the i-th interlace in each sub-band configured by the CIF is scheduled, wherein the interlaces are ordered by the increasing order of the lowest frequency domain position of the type-1 RO interlace.

In one example, for one or multiple of the aforementioned examples, the information in the frequency-domain resource assignment field can be indicated through higher layer parameter(s), such as the RRC layer parameters, instead of through the DCI.

In one example, one or multiple of the aforementioned examples can be utilized in configuring multiple type-1 PRACH resources across multiple LBT sub-bands and/or carriers, which can be utilized to increase the PRACH transmission opportunity when combined with LBT operations for PRACH transmission are performed in parallel across different sub-bands containing scheduled type-1 ROs.

In one example, the frequency domain resource for DCI-scheduled type-1 RO can be configured when each type-1 RO is allocated through a non-interlaced, continuous mapping in the frequency domain.

In one example, a frequency offset value from the lowest type-1 RO in the frequency domain with respect to PRB 0 of the UL active BWP containing DCI-scheduled type-1 ROs can be configured by the DCI or higher layer parameter.

In one sub-example, for the UL active BWP with M_t PRBs, and each type-1 RO containing L PRBs, the frequency offset indication field can be of $\lceil \log_2(M\_t-L)\rceil$ bits.

In another sub-example, for the UL active BWP with M_t PRBs, and each type-1 RO containing L PRBs, the frequency offset indication field can be of $\lceil \log_2(M\_t)\rceil$ bits; and no type-1 RO is configured in the UL BWP if the offset is larger than the highest PRB index of the BWP minus L.

In yet another sub-example, the lowest type-1 RO in the frequency domain of the UL active BWP can refer to the type-1 RO scheduled by the DCI.

In yet another sub-example, the lowest type-1 RO in the frequency domain of the UL active BWP can refer to the type-1 ROs configured on the UL active BWP of the serving cell by the higher layer parameter or DCI, wherein these configured type-1 ROs can be potentially scheduled by the DCI.

Figure 26:
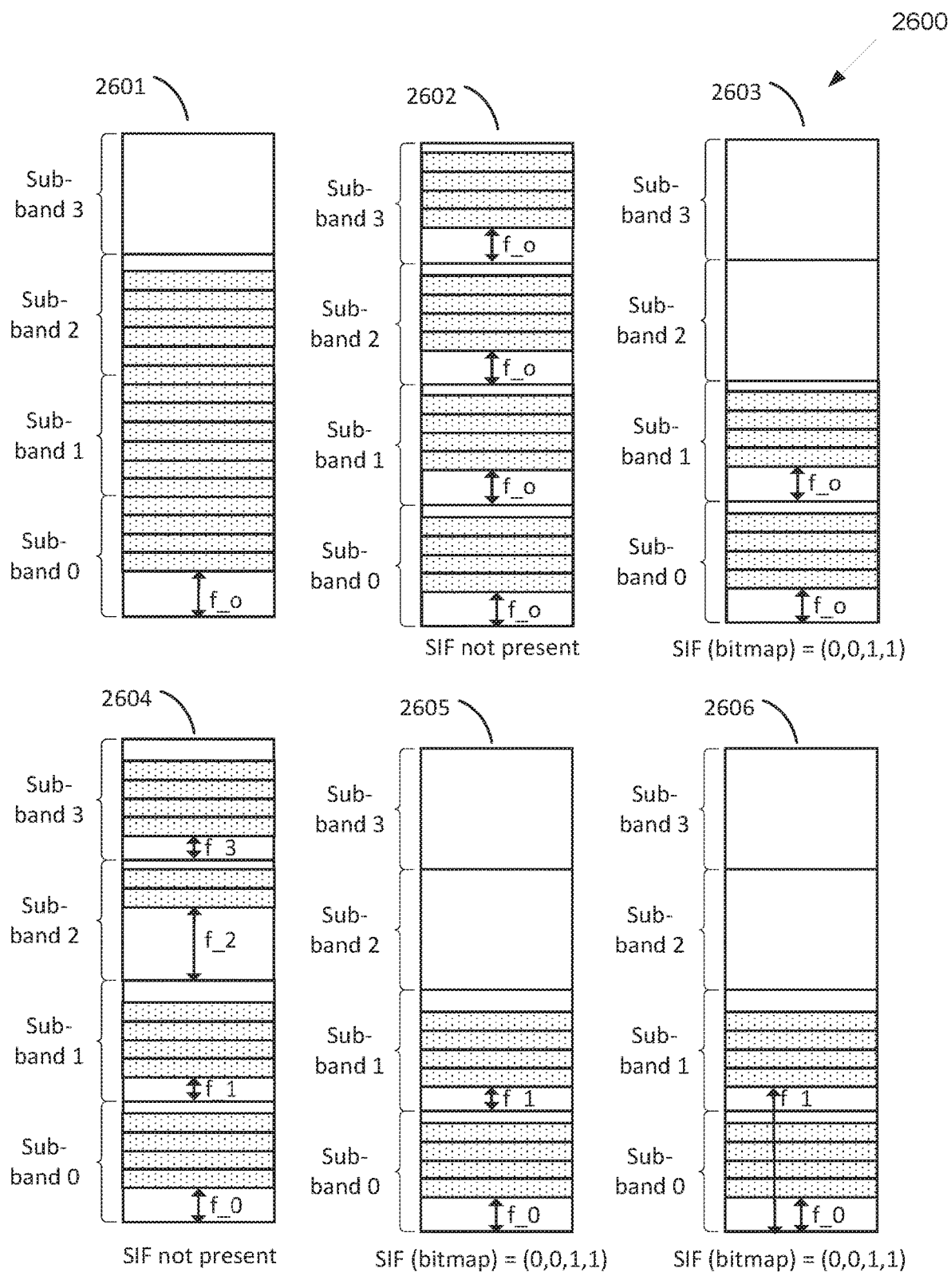
FIG. 26 illustrates yet another example frequency domain resource allocation according to embodiments of the present disclosure.

FIG. 26 illustrates yet another example frequency domain resource allocation 2600 according to embodiments of the present disclosure. An embodiment of the frequency domain resource allocation 2600 shown in FIG. 26 is for illustration only. FIG. 26 does not limit a scope of the present disclosure.

An illustration of this example is provided in FIG. 26 (e.g., 2601) wherein f_o refers to the configured frequency offset within the active UL BWP.

In one example, when the bandwidth of the configured active UL BWP containing the DCI-scheduled type-1 RO(s) is larger than the sub-band bandwidth, a single frequency offset value from the lowest type-1 RO in the frequency domain with respect to the starting PRB of the sub-band can be configured by the DCI or higher layer parameter, which applies to every sub-band within the configured active UL BWP that potentially contains the DCI-scheduled type-1 RO(s).

In one sub-example, for the sub-band with M PRBs, and each type-1 RO containing L PRBs, the frequency offset indication field can be of $\lceil \log_2(M-L)\rceil$ bits.

In another sub-example, for the sub-band with M PRBs, and each type-1 RO containing L PRBs, the frequency offset indication field can be of $\lceil \log_2(M)\rceil$ bits.

In yet another sub-example, the lowest type-1 RO in the frequency domain of the sub-band can refer to the type-1 RO scheduled by the DCI.

In yet another sub-example, the lowest type-1 RO in the frequency domain of the sub-band can refer to the type-1 ROs configured on the sub-band of the serving cell by the higher layer parameter or DCI, wherein these configured type-1 ROs can be potentially scheduled by the DCI.

An illustration of this example is provided in FIG. 26 (e.g., 2602), wherein the SIF field is not present and thus each sub-band within the active UL BWP can contain the type-1 ROs, and f_o refers to the configured frequency offset within the sub-band.

Another illustration of this example is provided in FIG. 26 (e.g., 2603), wherein the SIF field is present and sub-band 0 and sub-band 1 within the active UL BWP can contain the type-1 ROs, and f_o refers to the configured frequency offset within the sub-band.

In one example, when the bandwidth of the configured active UL BWP containing the DCI-scheduled type-1 RO(s) is larger than the sub-band bandwidth, for every sub-band within the configured active UL BWP that contains the DCI-scheduled type-1 RO(s), a separate frequency offset value from the lowest type-1 RO in the frequency domain with respect to the starting PRB of the sub-band or staring PRB of the UL BWP can be configured by the DCI or higher layer parameter.

In one sub-example, the frequency offset indication field for this sub-band can be of $P=\lceil \log_2(M-L) \rceil$ bits, wherein L is number of PRBs in a type-1 RO, and M is number of PRBs in a sub-band and UL BWP if the offset is with respect to starting PRB of sub-band and UL BWP respectively.

In one sub-example, the frequency offset indication field for this sub-band can be of $P=\lceil \log_2(M) \rceil$ bits, wherein L is number of PRBs in a type-1 RO, and M is number of PRBs in a sub-band and UL BWP if the offset is with respect to starting PRB of sub-band and UL BWP respectively.

In another sub-example, when the SIF field is not present and there are N sub-bands within the active UL BWP, the total number of bits for frequency offset indication can be of N×P bits, wherein P is defined in the aforementioned examples.

In yet another sub-example, when the SIF field is present and there are n sub-bands within the active UL BWP configured to contain the type-1 ROs, the total number of bits for frequency offset indication can be of n×P bits, wherein P is defined in the aforementioned examples.

In yet another sub-example, the lowest type-1 RO in the frequency domain can refer to the type-1 RO scheduled by the DCI.

In yet another sub-example, the lowest type-1 RO in the frequency domain can refer to the type-1 ROs configured on the sub-band or UL BWP of the serving cell by the higher layer parameter or DCI, wherein these configured type-1 ROs can be potentially scheduled by the DCI.

An illustration of this example is provided in FIG. 26 (e.g., 2604), wherein the SIF field is not present and each sub-band within the active UL BWP can contain the type-1 ROs, and f_0, f_1, f_2, f_3 refers to the configured frequency offset within sub-band 0, sub-band 1, sub-band 2, sub-band 3 respectively.

Another illustration of this example is provided in FIG. 26 (e.g., 2605), wherein the SIF field is present and sub-band 0 and sub-band 1 within the active UL BWP can contain the type-1 ROs, and f_0, f_1 refers to the configured frequency offset within sub-band 0, sub-band 1 respectively.

Another illustration of this example is provided in FIG. 26 (e.g., 2606), wherein the SIF field is present and sub-band 0 and sub-band 1 within the active UL BWP can contain the type-1 ROs, and f_0, f_1 refers to the configured frequency offset with respect to starting PRB of the UL BWP for sub-band 0, sub-band 1 respectively.

In one example, a maximum number of FDM'ed type-1 ROs can be configured for the UL BWP or sub-band of the serving cell containing the DCI scheduled type-1 ROs by the higher layer parameter or DCI.

In one sub-example, when the maximum number of FDM'ed type-1 ROs M_t is configured within the UL BWP, and the configured frequency offset value f_o is according to the aforementioned examples and embodiments, then the frequency-domain assignment for the M_t FDM'ed DCI-scheduled type-1 ROs can start at f_o with respect to PRB 0 of the UL BWP, with a potential gap of g PRBs in between the type-1 ROs, wherein g can be fixed by specification, configured by DCI or higher layer parameter. For instance, 2601 of FIG. 26 provides an illustration of this sub-example with M_t=16 and g=0.

In another sub-example, when the number of FDM'ed type-1 ROs M_t is configured within the UL BWP, and the configured frequency offset value is according to the aforementioned examples, then the frequency-domain assignment for the M_t FDM'ed DCI-scheduled type-1 ROs can be allocated.

In one instance, increasing order of frequency-domain resource within each configured sub-band first, wherein the allocation is according to the configured frequency offset of the sub-band, with a potential gap of g PRBs in between the type-1 ROs (g can be fixed by specification, configured by DCI or higher layer parameter), and the FDM'ed type-1 ROs need to be contained within the sub-band.

In another instance, in increasing order of frequency-domain resource across different configured sub-bands; and the scheduled type-1 ROs that are not mapped onto any sub-band may be discard.

For instance, 2602 and 2604 of FIG. 26 provide an illustration of this sub-example with M_t=16 and g=0. In the instance of 1104, 2 scheduled FDM'ed ROs are discarded by the UE.

In another sub-example, when the maximum number of FDM'ed type-1 ROs M_t is configured within a sub-band, and the configured frequency offset value is according to the aforementioned examples, then the frequency-domain assignment for the M_t FDM'ed DCI-scheduled type-1 ROs can start at the configured frequency offset with respect to PRB 0 of the sub-band or UL BWP, with a potential gap of g PRBs in between the type-1 ROs, wherein g can be fixed by specification, configured by DCI or higher layer parameter. For instance, 2602, 2603, 2605, and 2606 of FIG. 26 provide illustrations of this sub-example with M_t=4 and g=0.

In another sub-example, a set of supported values S for the maximum number of FDM'ed type-1 ROs M_t within the UL BWP or sub-band can be configured by higher layer parameter or fixed in specification, and the bit-width to indicate the maximum number of FDM'ed type-1 ROs can be $n \times \lceil \log_2(|S|) \rceil$, wherein n is the number of configured sub-bands to contain DCI-scheduled type-1 ROs when the maximum number of FDM'ed type-1 ROs is configured differently across sub-bands; and 1 otherwise. For instance, S can be {1, 2, 4, 8}.

In another sub-example, the type-1 ROs configured through the maximum number of FDM'ed type-1 ROs can be common for UEs associated with the serving cell, and all or a subset of these type-1 ROs can potentially be scheduled by DCI.

In one example, DCI or higher layer parameter can configure a number of FDM'ed type-1 ROs M within the UL BWP or sub-band containing the type-1 ROs of the serving cell; such that the UE can obtain the frequency-domain resource assignment for the scheduled type-1 ROs through the configured number of FDM'ed type-1 ROs and the configured frequency offset value, e.g., according to one of the aforementioned examples.

In one sub-example, the number of FDM'ed type-1 ROs configured within the UL BWP or sub-band containing the type-1 ROs of the serving cell can be mapped to the UL BWP or sub-band according to the same procedure as the aforementioned examples, and assuming the maximum number of configured FDM'ed type-1 ROs M_t in the aforementioned example is the same as the number of configured FDM'ed type-1 ROs M in this example.

In another sub-example, when the number of FDM'ed type-1 ROs M is configured within a sub-band, and there are multiple sub-bands configured to contain the DCI-scheduled type-1 RO, one M value can be configured by DCI or higher layer parameter; which may be the same for every sub-band configured to contain the DCI-scheduled type-1 RO. For instance, 2602, 2603, and 2605 of FIG. 26 provide illustrations of this sub-example with M=4.

In another sub-example, when the number of FDM'ed type-1 ROs M is configured within a sub-band, and there are multiple sub-bands configured to contain the DCI-scheduled type-1 RO, a separate value of M can be configured by DCI or higher layer parameter for each sub-band configured to contain the DCI-scheduled type-1 RO. For instance, 2604 of FIG. 26 provide illustrations of this sub-example with M=4, 4, 2, 4 for sub-band 0, 1, 2, 3 respectively.

In another sub-example, when DCI configures the number of FDM'ed type-1 ROs M within the UL BWP, or within the sub-band and same M is shared across sub-bands, the bit-width to indicate M is min ($\lceil \log_2(N_{RB}/L)\rceil$, $\lceil \log_2 M_t\rceil$), wherein $N_{RB}$ is the number of RBs for UL BWP (or sub-band), L is the number of RBs for type-1 RO; and $M_t$, if configured, is the max number FDM'ed type-1 ROs within UL BWP (or sub-band) according to the aforementioned example, otherwise $M_t$ can be treated as infinity.

In another sub-example, when DCI configures the number of FDM'ed type-1 ROs M within the sub-band and a separate M is configured across sub-bands, the max bit-width for this example is $n\times\min(\lceil \log_2(N_{RB}/L)\rceil, \lceil \log_2 M\_t\rceil)$, wherein $N_{RB}$ is the number of RBs for each sub-band, L is the number of RBs for type-1 RO, and n is the number of configured sub-bands to contain DCI-scheduled type-1 ROs; and M_t, if configured, is the max number FDM'ed type-1 ROs within sub-band according to the aforementioned examples, otherwise M_t can be treated as infinity.

In another sub-example, a set of supported values S for the number of FDM'ed type-1 ROs M within the UL BWP or sub-band can be configured by higher layer parameter or fixed in specification, and the bit-width to indicate the number of FDM'ed type-1 ROs can be $n\times\lceil \log_2(|S|)\rceil$, wherein n is the number of configured sub-bands to contain DCI-scheduled type-1 ROs when the number of FDM'ed type-1 ROs is configured differently across sub-bands; and 1 otherwise. For instance, S can be {1, 2, 4, 8}. In another instance, |S| can be 1, e.g., S={1}, which indicates M value is fixed in the spec.

In another sub-example, the scheduled type-1 ROs with the frequency-domain resource assignment obtained by the UE through the aforementioned examples, can be by default available to be utilized by the UE.

In one example, DCI can configure a frequency-domain resource assignment field for the UL BWP or sub-band of the serving cell containing type-1 ROs, which can indicate to the UE the indexes of the scheduled type-1 ROs among the maximum number of FDM'ed type-1 ROs configured for the UL BWP or sub-band.

In one sub-example, a UE can obtain the frequency-domain resource assignment for scheduled type-1 ROs through the frequency-domain resource assignment field. For instance, a UE can determine scheduled type-1 RO(s) through the frequency-domain resource assignment field, along with the configured frequency offset value, e.g., according to the aforementioned examples.

In another sub-example, when the maximum number of FDM'ed type-1 ROs configured for the UL BWP or sub-band is M_t, the frequency-domain resource assignment field can be a full bitmap with a bitwidth of P=M_t bits.

In another sub-example, when the maximum number of FDM'ed type-1 ROs configured for the UL BWP or sub-band is M_t, the frequency-domain resource assignment field can indicate one scheduled type-1 RO with a bitwidth of $P=\lceil \log_2(M\_t)\rceil$ bits.

In another sub-example, when the maximum number of FDM'ed type-1 ROs configured for the UL BWP or sub-band is M_t; the maximum number of FDM'ed type-1 ROs are indexed by increasing order of frequency-domain resource position and the indexes for the scheduled FDM'ed type-1 RO are consecutive, the frequency-domain resource assignment field can indicate the scheduled type-1 RO(s) with a bit-width of $P=\lceil \log_2((M\_t+1)\times M\_t/2)\rceil$ bits.

In another sub-example, when there are multiple sub-bands configured to contain the DCI-scheduled type-1 RO, one frequency-domain resource assignment field can be configured by DCI, which may be the same for every sub-band configured to contain the DCI-scheduled type-1 RO.

In yet another sub-example, when there are n (n>1) sub-bands configured to contain the DCI-scheduled type-1 RO, a separate frequency-domain resource assignment field can be configured by DCI for each sub-band configured to contain the DCI-scheduled type-1 RO, and thus the union of the frequency-domain resource assignment fields across configured sub-bands has bitwidth of n×P bits.

In one example, one or multiple of the examples in the aforementioned examples can be utilized in configuring multiple type-1 PRACH resources across multiple LBT sub-bands and/or carriers, which can be utilized to increase the PRACH transmission opportunity when combined with LBT operations for PRACH transmission are performed in parallel across different sub-bands containing scheduled type-1 ROs.

In one example, the frequency-domain resource allocation information of DCI-scheduled type-1 RO covered in this embodiment can be included in one or more than one DCI formats, and/or higher layer parameters.

In one sub-example, the frequency-domain resource allocation information such as the maximum number of FDM'ed type-1 ROs configured for the UL BWP or sub-band can be indicated through a group-common (GC) DCI format, such that the connected UEs associated with the serving cell are aware of the frequency-domain resources scheduled for type-1 ROs.

In another sub-example, the frequency-domain resource assignment field can be a UE-specific DCI format, such that the UE can be indicated the frequency-domain resource for scheduled type-1 RO(s), among the maximum number of FDM'ed type-1 ROs configured for the UL BWP or sub-band of the cell, which can be indicated through a GC DCI format or higher layer parameter.

In one embodiment, time-domain resource allocation of DCI scheduled type-1 RO is provided.

Another design consideration is the indication of the time-domain resource allocation of the type-1 RO from the DCI, including the configuration of the PRACH format (i.e., time-domain duration of each type-1 RO), and the remaining time-domain resource related configurations other than the PRACH format.

In one embodiment, the PRACH format for the DCI-scheduled type-1 RO can be configured through higher layer parameter or explicitly through the DCI scheduling the type-1 RO.

In one example, the PRACH format can be indicated through $\lceil \log_2 N \rceil$ bits in the DCI, wherein N is the number of supported PRACH formats for type-1 RO.

In one example, the PRACH format for the DCI-scheduled type-1 RO can be jointly configured with other time-domain related configurations for the DCI-scheduled type-1 RO through an index to a configuration table.

In one sub-example, the other time-domain related configurations for the type-1 RO can include one or multiple of the starting symbol for the type-1 RO, the number of type-1 ROs in a slot, the offset from DCI to the slot containing the type-1 RO, the number of slots containing the type-1 RO.

In another sub-example, the indication can be through a DCI field with $\lceil \log_2 N_2 \rceil$ bits, wherein $N_2$ is the number of entries in the joint configuration table.

In another sub-example, the indication can be through the higher layer parameter.

In one example, the UE can derive the time-domain duration for each type-1 RO through the configured PRACH format for type-1 RO.

In one example, the type of the LBT associated the type-1 RO can be configured using one of the following options: (1) fixed in the specification; (2) indicated through the DCI scheduling the type-1 RO; (3) configured using a higher layer parameter.

In one example, the LBT type for DCI-scheduled type-1 RO can be fixed to be one of CAT-2 LBT or no-LBT.

In one example, the LBT type for DCI-scheduled type-1 RO can be configured by DCI. In one sub-example, the DCI can include a LBT type field with bitwidth of $\lceil \log_2 N \rceil$ bit, wherein N can be the number of supported LBT types for type-1 ROs, and the LBT types can include one or multiple of no-LBT, CAT-2 LBT, and CAT-4 LBT with priority class value 1 to 4.

For the remaining time-domain resource allocation related configurations other than the PRACH format, one or multiple of the following examples can be used.

In one example, the time domain resource for DCI-scheduled type-1 RO can be indicated through time-domain offset with respect to the slot containing the DCI scheduling the type-1 RO.

In one example, the time-domain offset from the DCI-scheduled type-1 RO with respect to the slot containing the DCI scheduling the type-1 RO can be indicated in the DCI through one or multiple of: (1) a slot offset $K_2$ ($K_2>=0$) from the slot containing the DCI-scheduled type-1 RO to the slot containing the DCI scheduling the type-1 RO; and (2) an OFDM symbol offset $O_{sym}^{RO}$ ($O_{sym}^{RO}>=0$) from the DCI-scheduled type-1 RO to the starting symbol (i.e., 0-th symbol) of the slot containing the type-1 RO.

Figure 27:
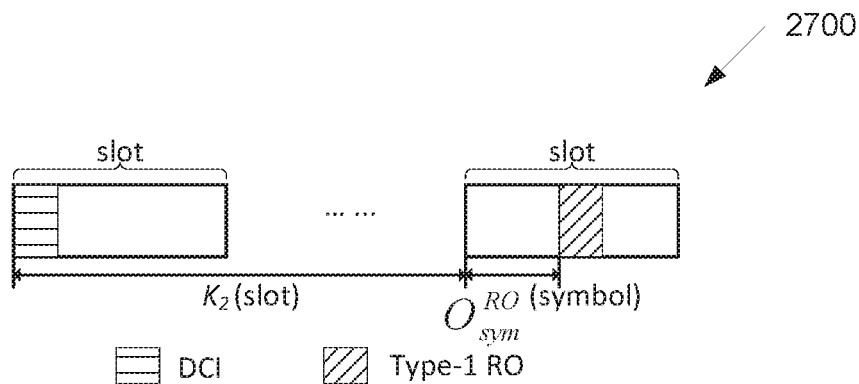
FIG. 27 illustrates an example time domain resource allocation according to embodiments of the present disclosure.

FIG. 27 illustrates an example time domain resource allocation 2700 according to embodiments of the present disclosure. An embodiment of the time domain resource allocation 2700 shown in FIG. 27 is for illustration only. FIG. 27 does not limit a scope of the present disclosure.

An illustration of the slot offset $K_2$ and OFDM symbol offset $O_{sym}^{RO}$ is provided in FIG. 27.

In one sub-example, the OFDM symbol offset $O_{sym}^{RO}$ ($O_{sym}^{RO}>=0$) can also be interpreted as the offset from the expected starting symbol of the DCI-scheduled type-1 RO, to the starting symbol (i.e., 0-th symbol) of the slot containing the type-1 RO. For instance, when the LBT for type-1 RO is CAT-4 LBT, the expected starting symbol of the type-1 RO can assume every step of the CAT-4 LBT is successful.

In another sub-example, only the slot offset $K_2$ can be configured by DCI, with the OFDM symbol offset value $O_{sym}^{RO}$ can be either fixed by specification or configurable by higher layer parameter. For instance, $O_{sym}^{RO}$ can be 0.

In another sub-example, only the OFDM symbol offset value $O_{sym}^{RO}$ can be configured by DCI, with the slot offset $K_2$ can be either fixed by specification or configured by higher layer parameter. For instance, $K_2$ can be fixed to be 0, which means the type-1 RO is configured within the same slot as in the DCI scheduling type-1 RO.

In another sub-example, for the supported set of slot offset values $S_{slot}$, the slot offset value can be indicated through a DCI field with a bitwidth of $\lceil \log_2 |S_{slot}| \rceil$; wherein $S_{slot}$ can be one of fixed in the specification, or configurable by higher layer parameter, or either configured by higher layer parameter if corresponding parameter is present and otherwise a default fixed set of values is applied.

In another sub-example, for the supported set of slot offset values $S_{slot}$, one or more than one slot offset values can be indicated through a DCI field with a bitwidth of $|S_{slot}|$; wherein $S_{slot}$ can be one of fixed in the specification, or configurable by higher layer parameter, or either configured by higher layer parameter if corresponding parameter is present and otherwise a default fixed set of values is applied.

In another sub-example, for the supported set of OFDM symbol offset value $S_{sym}$, the OFDM symbol offset can be indicated through a DCI field with a bit-width of $\lceil \log_2 |S_{sym}| \rceil$; wherein $S_{sym}$ can be one of fixed in the specification, or configurable by higher layer parameter, or either configured by higher layer parameter if corresponding parameter is present and otherwise a default fixed set of values is applied, or inferred based on other type-1 RO related parameters (e.g., type-1 RO duration). For instance, $S_{sym}$ can be fixed to be $\{0, 1, 2 \ldots, 14-L_{RO}\}$, wherein $L_{RO}$ is the symbol duration of each type-1 RO.

In one example, the DCI scheduling type-1 RO can also indicate a number of TDM'ed type-1 ROs within the slot containing the DCI-scheduled type-1 RO $n_{RO,slot}$.

In one sub-example, the number of TDM'ed type-1 ROs within the slot $n_{RO,slot}$ can be 1 by default, if it is not configured.

In another sub-example, when the number of TDM'ed type-1 ROs $n_{RO,slot}$ is configured, the OFDM symbol offset $O_{sym}^{RO}$ from the DCI-scheduled type-1 RO to the starting symbol of the slot containing the type-1 RO can refer to the offset to the first type-1 RO among the configured TDM'ed type-1 ROs in the slot.

In yet another sub-example, the bit-width of the DCI field to indicate the number of TDM'ed type-1 ROs within the slot $n_{RO,slot}$ can be fixed, or variable depending on other type-1 RO parameters (e.g., type-1 RO duration). For instance, the bit-width can be fixed to be 3. In another instance, the bit-width can be $\log_2 \lceil 14/L_{RO} \rceil$, wherein $L_{RO}$ is the symbol duration of each type-1 RO. In another instance, the bit-width can be $\log_2 \lceil (14-O_{sym}^{RO})/L_{RO} \rceil$, wherein $L_{RO}$ is the symbol duration of each type-1 RO, $O_{sym}^{RO}$ is the OFDM symbol offset.

Figure 28:
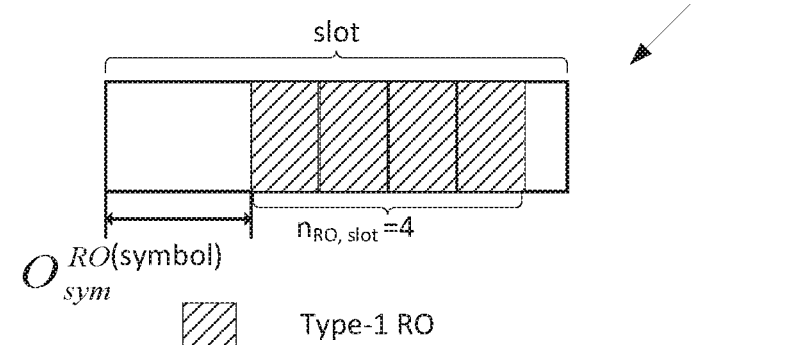
FIG. 28 illustrates another example time domain resource allocation according to embodiments of the present disclosure.

FIG. 28 illustrates another example time domain resource allocation 2800 according to embodiments of the present disclosure. An embodiment of the time domain resource allocation 2800 shown in FIG. 28 is for illustration only. FIG. 28 does not limit a scope of the present disclosure.

An illustration of the number of TDM'ed type-1 ROs within the slot with $n_{RO,slot}=4$ is provided in FIG. 28.

In one example, the DCI can indicate the number of symbols allocated for type-1 ROs within the type-1 RO slot $L_{RO,slot}$.

In one sub-example, based on the number of symbols allocated for type-1 ROs $L_{RO,slot}$, and other type-1 RO parameters, the UE can infer the number of TDM'ed type-1 ROs within the slot containing the DCI-scheduled type-1 RO $n_{RO,slot}$ without explicit indication. For instance, $n_{RO,slot}=L_{RO,slot}/L_{RO}$, wherein $L_{RO}$ is the symbol duration of each type-1 RO.

In one example, the DCI scheduling type-1 RO can also indicate a number of slots containing the DCI-scheduled type-1 RO $n_{slot}$.

In one sub-example, for the supported set of number of slot values $S_{n,slot}$, the number of slots containing the DCI-scheduled type-1 RO can be indicated through a DCI field with a bitwidth of $\lceil \log_2 |S_{n,slot}| \rceil$; wherein $S_{n,slot}$ can be one of fixed in the specification, or configurable by higher layer parameter, or either configured by higher layer parameter if corresponding parameter is present and otherwise a default fixed set of values is applied. For instance, $S_{n,slot}$ can be $\{1, 2, 4, 8\}$.

In another sub-example, when the number of slots $n_{slot}$ is configured, the $n_{slot}$ slots containing the DCI-scheduled type-1 ROs starts with the slot configured by the slot offset $K_2$ as in the aforementioned examples and embodiments; and the following $n_{slot}-1$ slots, wherein these slots can have the same symbol allocation for type-1 ROs as in the first slot containing the DCI-scheduled type-1 ROs. An illustration of this sub-example is provided in FIG. 29, wherein $n_{slot}=4$.

Figure 29:
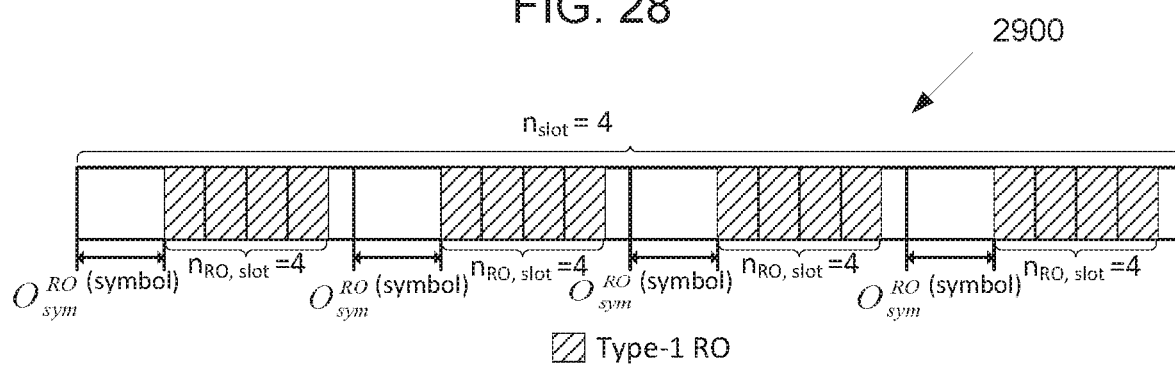
FIG. 29 illustrates yet another example time domain resource allocation according to embodiments of the present disclosure.

FIG. 29 illustrates yet another example time domain resource allocation 2900 according to embodiments of the present disclosure. An embodiment of the time domain resource allocation 2900 shown in FIG. 29 is for illustration only. FIG. 29 does not limit a scope of the present disclosure.

In another sub-example, when the number of slots $n_{slot}$ is configured, the $n_{slot}$ slots containing the DCI-scheduled type-1 ROs starts with the slot configured by the slot offset $K_2$ as in the aforementioned examples and embodiments; and the following $n_{slot}-1$ slots, wherein type-1 ROs in these slots can follow the same fixed allocation potentially different from the first slot containing the DCI-scheduled type-1 ROs. For instance, the fixed allocation can be the type-1 RO starts at the first symbol of the slot, and the number of type-1 ROs within each slot can be $\lfloor 14/L_{RO} \rfloor$ with $L_{RO}$ the duration of type-1 RO. In another instance, the fixed allocation can be within the configured $n_{slot}$ slots, the type-1 RO are consecutively allocated without time-domain gaps from the first slot containing the DCI-scheduled type-1 ROs. An illustration of both instances is provided in FIG. 30, wherein $n_{slot}=2$, $L_{RO}=2$, and $O_{sym}^{RO}=6$.

Figure 30:
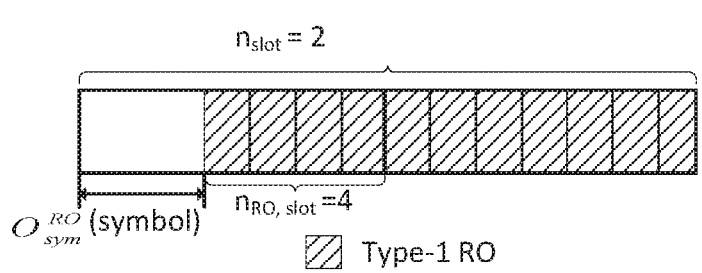
FIG. 30 illustrates yet another example time domain resource allocation according to embodiments of the present disclosure.

FIG. 30 illustrates yet another example time domain resource allocation 3000 according to embodiments of the present disclosure. An embodiment of the time domain resource allocation 3000 shown in FIG. 30 is for illustration only. FIG. 30 does not limit a scope of the present disclosure.

In one example, the slot offset $K_2$, symbol offset $O_{sym}^{RO}$, and number of type-1 ROs per slot $n_{RO,slot}$ or the number of symbols allocated for type-1 ROs within the type-1 RO slot $L_{RO,slot}$, can be jointly indicated by reusing the PUSCH time-domain resource allocation configuration from NR with potential re-interpretation of certain fields.

In one sub-example, the time-domain resource configuration for type-1 ROs can reuse the PUSCH time-domain resource allocation table for normal CP with 16 rows (e.g., either Default A or pusch-TimeDomainAllocationList configured by higher layer), and each row corresponds to a set of {PUSCH mapping type, starting slot offset $K_2$, starting symbol S, and PUSCH length L}. Slot offset $K_2$ and starting symbol S of PUSCH time-domain resource allocation can be directly reused for slot offset $K_2$ and symbol offset $O_{sym}^{RO}$ of type-1 ROs; PUSCH length L of PUSCH resource allocation can be interpreted as configuring the number of type-1 ROs per slot $n_{RO,slot}$ for type-1 ROs as $n_{RO,slot}=\lfloor L/L_{RO} \rfloor$ with $L_{RO}$ being type-1 RO duration, or directly configuring the number of symbols allocated for type-1 ROs within the type-1 RO slot $L_{RO,slot}=L$; and PUSCH mapping type from NR can be neglected for type-1 ROs.

In another sub-example, more rows can be added to the PUSCH time-domain resource allocation table when the table is utilized in configuring time-domain resource of type-1 ROs.

In one example, PRACH format, symbol offset $O_{sym}^{RO}$, and number of type-1 ROs per slot $n_{RO,slot}$ can be jointly indicated by reusing the NR PRACH configuration table with potential re-interpretation of certain fields.

In one sub-example, the preamble format, the starting symbol and number of time-domain PRACH occasions within a PRACH slot of PRACH configuration table can be directly reused to indicate the PRACH format, symbol offset $O_{sym}^{RO}$, and number of type-1 ROs per slot $n_{RO,slot}$ of the type-1 RO.

In another sub-example, the slot offset $K_2$ for DCI-scheduled type-1 RO can be either separately indicated by the DCI or higher layer parameter; or implicitly indicated through the PRACH configuration table, such as the earliest valid PRACH slot indicated from the PRACH configuration table.

In another sub-example, all or a subset of the NR PRACH configuration table can be used to allocate the time-domain resource allocations of the type-1 ROs.

In one example, a new type-1 RO time-domain resource allocation table can be defined to indicate the configuration of all or a subset of the slot offset $K_2$, symbol offset $O_{sym}^{RO}$, number of type-1 ROs per slot $n_{RO,slot}$, number of type-1 RO slots $n_{slot}$, and PRACH format or PRACH duration.

In one sub-example, each row of the type-1 RO time-domain configuration table can be used to indicate the {type-1 preamble format; starting symbol offset $O_{sym}^{RO}$, slot offset $K_2$, number of type-1 ROs per slot $n_{RO,slot}$, number of symbols allocated for type-1 ROs within the type-1 RO slot $L_{RO,slot}$}. In addition, the DCI can indicate one row index into the table to configure the time-domain resource of the type-1 ROs.

In another sub-example, each row of the type-1 RO time-domain configuration table can be used to indicate the {starting symbol offset $O_{sym}^{RO}$, slot offset $K_2$, number of symbols allocated for type-1 ROs within the type-1 RO slot $L_{RO,slot}$}. In addition, the DCI can indicate one or multiple row indexes into the table to indicate the time-domain resource of the type-1 ROs configured on different type-1 RO slots.

In another sub-example, a default type-1 RO time-domain resource allocation table can be defined in specification, and the higher layer can also configure a type1-RO time domain allocation list parameter type1RO-TimeDomainAllocationList; the default type-1 RO time-domain resource allocation table can be used if type1RO-TimeDomainAllocationList is not configured; otherwise type1RO-TimeDomainAllocationList is used.

In one example, the time-domain resources for DCI-scheduled type-1 ROs can be contained within the channel occupancy time of the gNB-initiated COT containing the DCI scheduling the type-1 RO.

In one example, the time-domain resource allocation information of DCI-scheduled type-1 RO covered in the aforementioned examples can be included through a group-common (GC) DCI format or higher layer parameter, such that the connected UEs associated with the serving cell are aware of the time-domain resources scheduled for type-1 ROs. In addition, a time-domain resource assignment field can be indicated to the UE through a UE-specific DCI format, such that the UE can be indicated the time-domain resource for scheduled type-1 RO(s), among the common time-domain resource allocation for DCI-scheduled type-1 RO configured through GC DCI format or higher layer parameter.

In one embodiment, the time-domain resource for DCI-scheduled type-1 RO can be indicated through utilizing the channel occupancy time (COT) structure of the gNB-initiated COT containing the DCI scheduling the type-1 RO, wherein the structure of the COT refers to the slot format (i.e., transmit direction for each symbol of slot is DL/UL/flexible) of the slots within the COT.

In one example, given the COT structure of the gNB-initiated COT containing the DCI-scheduling type-1 RO(s), the valid slot(s) wherein type-1 ROs can be scheduled within the COT can be determined by the UE.

In one example, DCI can indicate one slot containing the DCI-scheduled type 1 RO(s) through a time-domain resource assignment field with bit-width of $\lceil \log_2 |S| \rceil$ bits, wherein S is a set which can be one of: all slots within the gNB-initiated COT; slot(s) within the gNB-initiated COT that contain UL symbols or flexible symbols; slot(s) within the gNB-initiated COT contains only UL symbols or flexible symbols; slot(s) within the gNB-initiated COT and is no earlier than the slot containing the DCI to scheduled type-1 ROs; slot(s) within the gNB-initiated COT that contain UL symbols or flexible symbols, and is no earlier than the slot containing the DCI to scheduled type-1 ROs; and/or slot(s) within the gNB-initiated COT contains only UL symbols or flexible symbols, and is no earlier than the slot containing the DCI to scheduled type-1 ROs. An illustration of this example is provided in FIG. 31, wherein the gNB-initiated COT is 8 slots, with the first and second four slots being full DL slots and UL slots respectively.

Figure 31:
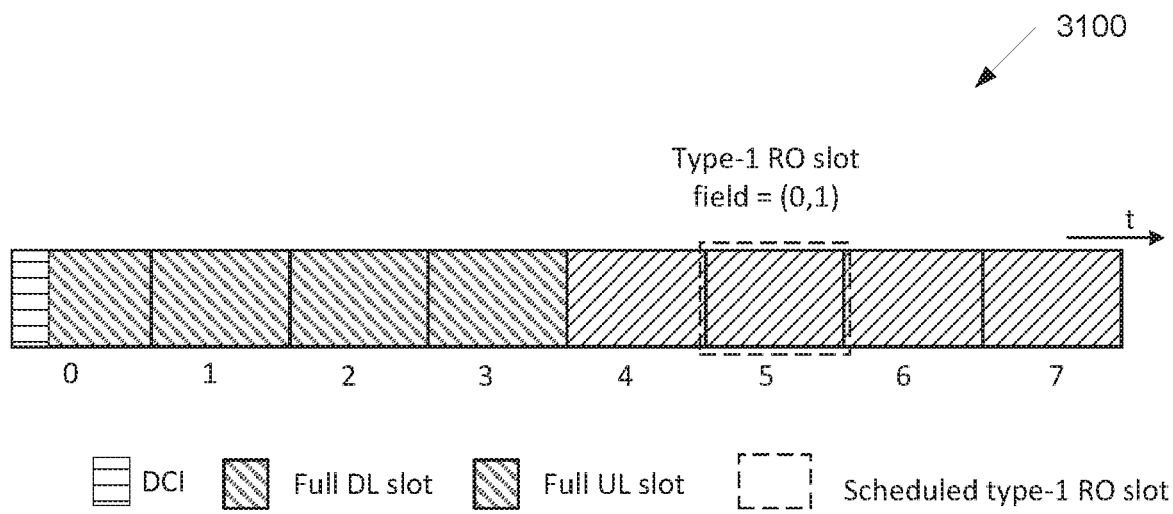
FIG. 31 illustrates yet another example time domain resource allocation according to embodiments of the present disclosure.

FIG. 31 illustrates yet another example time domain resource allocation 3100 according to embodiments of the present disclosure. An embodiment of the time domain resource allocation 3100 shown in FIG. 31 is for illustration only. FIG. 31 does not limit a scope of the present disclosure.

As illustrated in FIG. 31, S is the set of slots within the gNB-initiated COT that contain UL symbols or flexible symbols, i.e., S={4, 5, 6, 7}-th slot of the COT. The corresponding DCI field (i.e., type-1 RO slot field in FIG. 31) indicates the $2^{nd}$ element in set S, which is the 5-th slot within the COT, contains scheduled type-1 ROs.

In one example, DCI can indicate one or multiple slots containing the DCI-scheduled type 1 RO(s) through a time-domain resource assignment field, which can be a bitmap with bit-width of |S| bits, wherein S is a set which can be one of: all slots within the gNB-initiated COT; slot(s) within the gNB-initiated COT that contain UL symbols or flexible symbols; slot(s) within the gNB-initiated COT contains only UL symbols or flexible symbols; slot(s) within the gNB-initiated COT and is no earlier than the slot containing the DCI to scheduled type-1 ROs; slot(s) within the gNB-initiated COT that contain UL symbols or flexible symbols, and is no earlier than the slot containing the DCI to scheduled type-1 ROs; and/or slot(s) within the gNB-initiated COT contains only UL symbols or flexible symbols, and is no earlier than the slot containing the DCI to scheduled type-1 ROs.

Figure 32:
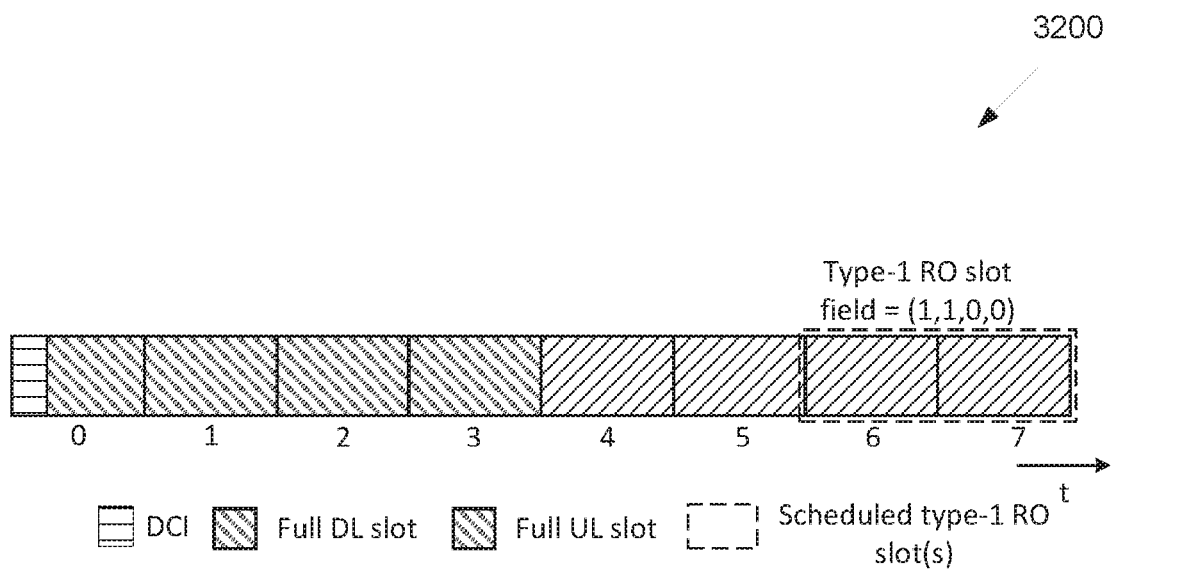
FIG. 32 illustrates yet another example time domain resource allocation according to embodiments of the present disclosure.

FIG. 32 illustrates yet another example time domain resource allocation 3200 according to embodiments of the present disclosure. An embodiment of the time domain resource allocation 3200 shown in FIG. 32 is for illustration only. FIG. 32 does not limit a scope of the present disclosure.

An illustration of this example is provided in FIG. 32 with same COT structure as in FIG. 31. The DCI field in FIG. 32 is a bitmap (i.e., type-1 RO slot field in FIG. 32) which indicates the $3^{rd}$ and $4^{th}$ elements in set S, which is the 6-th slot and 7-th slot within the COT, contain scheduled type-1 ROs.

In one example, the starting symbol for the DCI-scheduled type-1 RO can be the first symbol within the scheduled slot(s) according to the aforementioned examples that are an UL symbol, or is either an UL symbol or flexible symbol.

In one example, one or multiple time-domain resource configuration parameters, including the symbol offset from the DCI-scheduled type-1 RO to the starting symbol (i.e., 0-th symbol) of the slot containing the type-1 RO $O_{sym}^{RO}$, number of type-1 ROs in the slot containing the type-1 RO(s) $n_{RO,slot}$, number of type-1 RO slots $n_{slot}$, PRACH format or PRACH duration, can be configured according to the aforementioned examples.

In one example, the UE can utilize the first DCI-scheduled type-1 RO in time-domain among DCI-scheduled type-1 ROs for PRACH transmission, after the corresponding LBT process is completed.

In one embodiment, configuration of PRACH sequence of DCI scheduled type-1 RO is provided.

In addition to the configuration of time-domain and frequency-domain resources, another design consideration is the configuration of the type-1 RO related parameters for determining the PRACH sequence including the root sequence, cyclic shift, and the set type (i.e., unrestricted, restricted set A, or restricted set B).

In one embodiment, the parameters for the root sequences and their cyclic shifts in the PRACH preamble sequence set, including the index to root sequence, cyclic shift, and set type, can be determined from higher layer parameters.

In one example, the higher layer parameters to determine the root sequences and their cyclic shifts in the PRACH preamble sequence set for DCI-scheduled type-1 ROs can reuse the same higher layer parameters as those in determining the type-0 ROs of NR.

In one sub-example, higher layer parameters can be including one or multiple of: prach-RootSequenceIndex, msg1-SubcarrierSpacing, restrictedSetConfig, zeroCorrelationZoneConfig from the NR.

In one example, one or more than one additional higher layer parameters (i.e., RRC) can be introduced for determining the root sequences and their cyclic shifts in the PRACH preamble sequence set for DCI-scheduled type-1 ROs.

In one sub-example, the one or more than one additional higher layer parameters can be choosing from: type1-RO-RootSequenceIndex, type1-RO-SubcarrierSpacing, type1-RO type1-RO-restrictedSetConfig, type1-RO-zeroCorrelationZoneConfig.

In one example, one or multiple parameters for the root sequences and their cyclic shifts in the PRACH preamble sequence set for DCI-scheduled type-1 ROs, including the index to root sequence, cyclic shift, and set type, can be determined from the DCI scheduling the type-1 RO; and the remaining parameters to determine the PRACH sequence of type-1 RO, if any, can be determined from higher layer parameter(s) or fixed in the specification.

In one example, the index to the root sequence of the DCI-scheduled type-1 RO can be indicated through the index to the logical root sequence index or physical root sequence index; and for the supported set of logical/physical root sequence index U, the corresponding DCI field contains $\lceil \log_2|U| \rceil$ bits to indicated the selected root sequence index.

For instance, if the type-1 RO has a PRACH sequence of length L, the DCI field to determine the index to the root sequence can contain $\lceil \log_2|L-1| \rceil$ bits.

In one example, the cyclic shift of the DCI-scheduled type-1 RO can be determined through the set type (unrestricted set, restricted set type A or restricted set type B), and parameter $N_{cs}$ which can be determined from parameter zeroCorrelationZoneConfig. The DCI field to indicate the set type can contain $\lceil \log_2|S| \rceil$ bits wherein S is the set of supported set types; and for a given set type, and the set of supported zeroCorrelationZoneConfig Z, the corresponding DCI field contains $\lceil \log_2|Z| \rceil$ bits to determine the cyclic shift of the DCI-scheduled type-1 RO.

For instance, if the DCI-scheduled type-1 RO follows short preamble sequence as in NR, then the set type is fixed to be unrestricted set; and if the set of supported zeroCorrelationZoneConfig Z follows NR, then |Z|=16 and thus the DCI field contains 4 bits to determine the cyclic shift of the DCI-scheduled type-1 RO.

In one embodiment, DCI format for scheduling type-1 RO is provided. Another design consideration is the format for the DCI which dynamically schedules the type-1 RO.

In one example, the DCI format to dynamically schedule type-1 RO can be DCI format 0_0 or DCI format 0_1 from NR with potential modifications to existing fields of DCI format 0_0 or 0_1.

In one example, DCI format 0_0 or 0_1 can be used for scheduling of type-1 ROs if DCI format 0_0 or 0_1 is with CRC scrambled by C-RNTI, and when one or multiple existing fields in DCI format 0_0 or 0_1 is equal to a pre-determined value respectively.

In one sub-example, the existing field can also be one or multiple of the {frequency hopping flag, modulation and coding scheme, new data indicator, redundancy version, HARQ process number, TPC command for scheduled PUSCH, padding bits}. For instance, the existing field can be the modulation and coding scheme, wherein the pre-determined value can be one of {28, 29, 30, 31}, which corresponds to reserved values for MCS index in the NR.

In one example, DCI format 0_0 or DCI format 0_1 can be modified or enhanced according to Embodiment 1 and Embodiment 2 of this disclosure to indicate the frequency-domain resource allocation and time-domain resource allocation for DCI-scheduled type-1 RO respectively.

In one example, DCI format 0_0 or DCI format 0_1 can be modified or enhanced to indicate configuration of PRACH sequence of DCI scheduled type-1 RO according to the aforementioned embodiment.

In one example, the DCI format to dynamically schedule type-1 RO can be DCI format 1_0 or DCI format 1_1 from the NR with potential modifications to existing fields of DCI format 1_0 or 1_1.

In one example, DCI format 1_0 or 1_1 can be used for scheduling of type-1 ROs if DCI format 1_0 or 1_1 is with CRC scrambled by C-RNTI, and when one or multiple existing fields in DCI format 1_0 or 1_1 is equal to a pre-determined value respectively.

In one sub-example, the existing field can also be one or multiple of the {VRB-to-PRB mapping, modulation and coding scheme, new data indicator, redundancy version, HARQ process number}. For instance, the existing field can be the modulation and coding scheme, wherein the pre-determined value can be one of {28, 29, 30, 31}, which corresponds to reserved values for MCS index in the NR.

In one embodiment, a new DCI format can be introduced for NR-U to dynamically schedule type-1 RO, and the new DCI format can be denoted by DCI format X.

In one example, the DCI format X can be used for scheduling of type-1 ROs if DCI format X is with CRC scrambled by C-RNTI, and with potentially additional format indicator.

In one example, all or a subset of the information fields and corresponding sub-fields from TABLE 4 can be transmitted by means of the DCI format X with CRC scrambled by C-RNTI:

TABLE 4

Information fields

| Information field transmitted | Sub-information/sub-fields of the information field |
|---|---|
| Carrier indicator | |
| UL/SUL indicator | |
| BWP indicator | |
| Sub-band indicator | |
| LBT type | |
| PRACH format | |
| PRACH sequence parameters | Root sequence |
| | Cyclic shift |
| | Set type |
| Frequency domain resource assignment | Frequency offset indication field |
| | Max number of FDM'ed type-1 ROs |
| | Frequency-domain resource assignment field |
| Time domain resource assignment | starting symbol offset $O_{sym}^{RO}$ |
| | slot offset $K_2$ |
| | number of type-1 ROs per slot $n_{RO, slot}$ |
| | number of symbols allocated for type-1 ROs within the type-1 RO slot $L_{RO, slot}$ |
| | time-domain resource assignment field |

In one sub-example, all or a subset of the sub-fields for each information field can be jointly configured through DCI format X. For instance, all or a sub-set of the sub-fields in the time domain resource assignment can be jointly configured by DCI format X through a time domain resource allocation table.

In another sub-example, more than one information fields can be jointly configured through DCI format X. For instance, PRACH format can be jointly configured with all or a sub-set of the sub-fields in the time domain resource assignment field through a type-1 RO configuration table.

In another sub-example, an information field, or a subset of the sub-fields of an information field in TABLE 4 can be not transmitted through the DCI format X if: the information is indicated through higher layer parameters (e.g., the PRACH format and/or PRACH sequence parameters can be indicated through higher layer parameter); the information is fixed or has default value which is defined in the specification; the information can be inferred based on other existing information (e.g., number of type-1 ROs per slot can be inferred from PRACH format and starting symbol offset if the slot only contains type-1 ROs after starting symbol offset); or the parameter/configuration corresponding to the information is not applied (e.g., time-domain resource assignment field is present only when the time-domain resource for type-1 RO is indicated through COT structure of the gNB-initiated COT).

In another sub-example, if an information field or a subset of the sub-fields of an information field in TABLE 4 is configured through higher layer parameter or has a default value defined in the specification, and the DCI format X also defines value(s) for the information field or a subset of the sub-fields, the value(s) defined by DCI format X can overwrite the values defined by higher layer or the default values from specification.

In another sub-example, the number of bits for each information field of DCI format X is specified in the examples and corresponding examples of the aforementioned embodiments and examples.

In one example, the DCI format to dynamically schedule the ROs can be a group-common DCI format.

In one example, the group common DCI format can be format 2_X, and the DCI format 2_X is used to transmit DCI-scheduled RO information when the CRC is scrambled by a RNTI dedicated to DCI-scheduled ROs. In one sub-example, the DCI format can be format 2_X with X>=4. In another sub-example, the RNTI dedicated to DCI-scheduled ROs can be called RO-RNTI.

In one example, the group common DCI can indicate the common frequency-domain resource and time-domain resource for DCI-scheduled type-1 ROs of the serving cell/BWP/sub-band; and a UE-specific DCI format can optionally further indicate the actual scheduled type-1 RO for the UE through a frequency-domain resource assignment field and/or time-domain resource assignment field.

In one example, for the UE that has detected the group common DCI and obtained time/frequency domain resource for DCI scheduled type-1 ROs, and the UE has scheduled UL transmissions other than PRACH on those resources for DCI-scheduled type-1 ROs, the UE does not need to transmit on such resources and rate matches among remaining scheduled RBs for scheduled UL transmission.

In one example, the embodiments of this disclosure can also be applied to scheduled additional type-1 ROs through DCI for licensed-band NR system, wherein the information fields transmitted through the corresponding DCI format does not need to include the LBT type.

Figure 33:
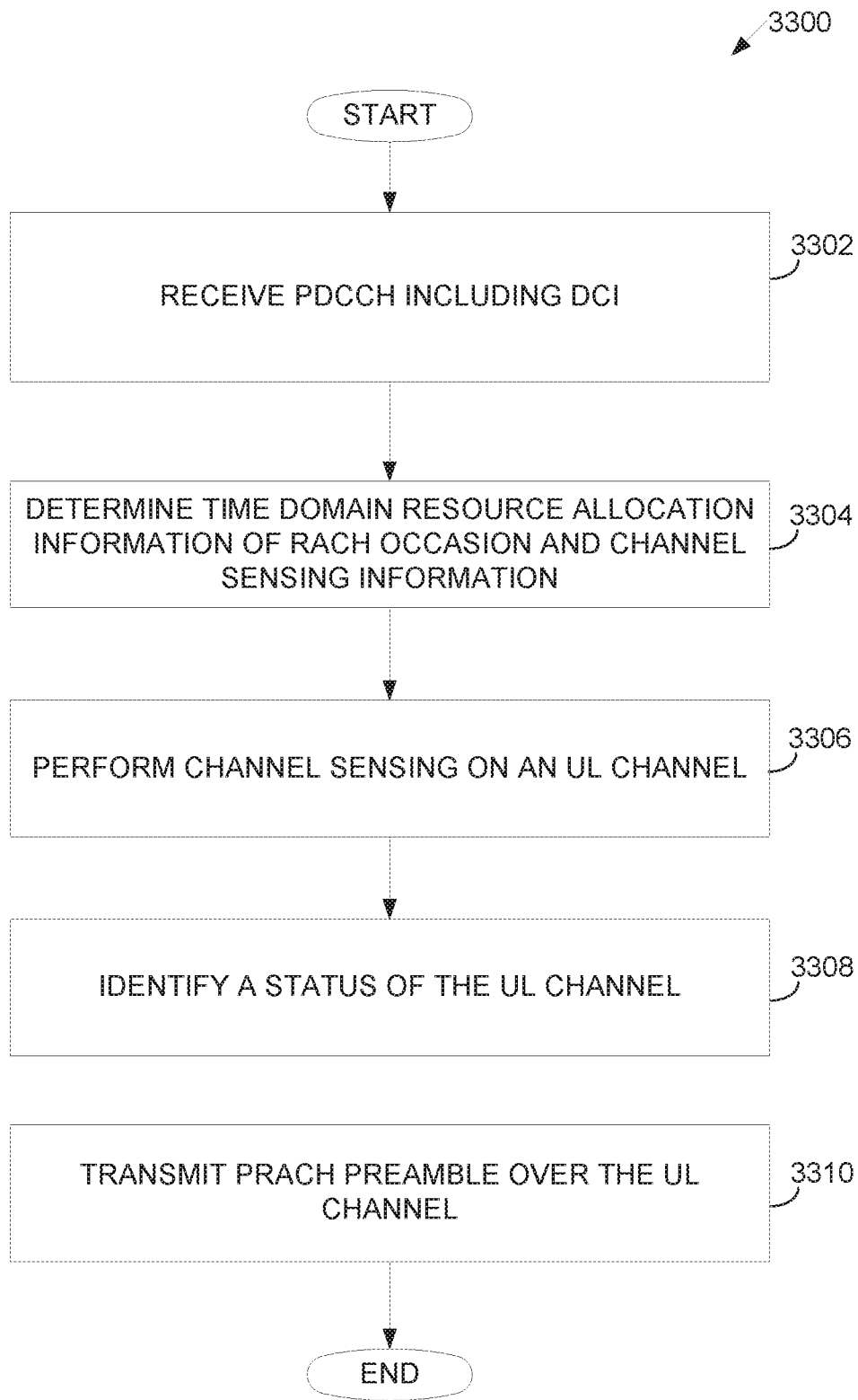
FIG. 33 illustrates a flow chart of a method for configuration of RACH occasion according to embodiments of the present disclosure.

FIG. 33 illustrates a flow chart of a method 3300 for configuration of RACH occasion according to embodiments of the present disclosure, as may be performed by a user equipment (UE) (e.g., 111-116 as illustrated in FIG. 1). An embodiment of the method 3300 shown in FIG. 33 is for illustration only. FIG. 33 does not limit a scope of the present disclosure.

As illustrated in FIG. 33, the method 3300 begins at step 3302. In step 3302, a UE receives, from a base station (BS), a physical downlink control channel (PDCCH) including downlink control information (DCI).

In step 3304, the UE determines, based on the received DCI, time domain resource allocation information of a random access channel (RACH) occasion and channel sensing information.

In one embodiment, the time domain resource allocation information includes at least one of: a slot offset between a slot including the DCI and a slot including the RACH occasion; an orthogonal frequency division multiplexing (OFDM) symbol offset between a first symbol of the slot including the RACH occasion and a first symbol of the RACH occasion; or a number of time division multiplexed RACH (TDMed RACH) occasions within the slot including the RACH occasion.

In one embodiment, the channel sensing information includes a type of channel sensing comprising one of: a first type with no channel sensing; a second type with fixed channel sensing duration; or a third type with variable channel sensing duration.

In step 3306, the UE performs channel sensing on an uplink (UL) channel based on the determined channel sensing information.

In step 3308, the UE identifies a status of the UL channel based on a result of the channel sensing on the UL channel.

In step 3310, the UE transmits, to the BS, a physical random access channel (PRACH) preamble over the UL channel based on the determined time domain resource allocation information and the identified status of the UL channel.

In one embodiment, the UE further determines at least one of: frequency domain resource allocation information of the RACH occasion; a PRACH format associated with the PRACH preamble; or information of a sequence generating the PRACH preamble.

In such embodiment, the frequency domain resource allocation information of the RACH occasion includes at least one of: a carrier indicator; a bandwidth part (BWP) indicator; a number of frequency division multiplexed RACH (FDMed RACH) occasions within a BWP including the RACH occasion; or an indication of resource blocks (RB) for the RACH occasion in the BWP including the RACH occasion.

In such embodiment, the information of a sequence generating the PRACH preamble includes at least one of: a root index of the sequence generating the PRACH preamble; a cyclic shift applied to the sequence generating the PRACH preamble; or a type of restriction set for the sequence generating the PRACH preamble, and wherein a format of the DCI is one of: a DCI format 0_0; a DCI format 0_1; a DCI format 1_0; a DCI format 1_1; or a new DCI format.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system supporting a shared spectrum channel access, the UE comprising:

at least one transceiver configured to receive, from a base station (BS), a physical downlink control channel (PDCCH) including downlink control information (DCI); and at least one processor operably connected to the at least one transceiver, the at least one processor configured to:

determine, based on the received DCI, time domain resource allocation information of a random access channel (RACH) occasion and channel sensing information, wherein the time domain resource allocation information includes at least one of:
a slot offset between a slot including the DCI and a slot including the RACH occasion;
an orthogonal frequency division multiplexing (OFDM) symbol offset between a first symbol of the slot including the RACH occasion and a first symbol of the RACH occasion; or
a number of time division multiplexed RACH (TDMed RACH) occasions within the slot including the RACH occasion, perform channel sensing on an uplink (UL) channel based on the determined channel sensing information, and identify a status of the UL channel based on a result of the channel sensing on the UL channel, wherein the at least one transceiver is further configured to transmit, to the BS, a physical random access channel (PRACH) preamble over the UL channel based on the determined time domain resource allocation information and the identified status of the UL channel.

2. The UE of claim 1, wherein the channel sensing information includes a type of channel sensing comprising one of:
a first type with no channel sensing;
a second type with fixed channel sensing duration; or
a third type with variable channel sensing duration.

3. The UE of claim 1, wherein the at least one processor is further configured to determine at least one of:
frequency domain resource allocation information of the RACH occasion;
a PRACH format associated with the PRACH preamble; or
information of a sequence generating the PRACH preamble.

4. The UE of claim 3, wherein the frequency domain resource allocation information of the RACH occasion includes at least one of:
a carrier indicator;
a bandwidth part (BWP) indicator;
a number of frequency division multiplexed RACH (FDMed RACH) occasions within a BWP including the RACH occasion; or
an indication of resource blocks (RB) for the RACH occasion in the BWP including the RACH occasion.

5. The UE of claim 3, wherein the information of a sequence generating the PRACH preamble includes at least one of:
a root index of the sequence generating the PRACH preamble;
a cyclic shift applied to the sequence generating the PRACH preamble; or
a type of restriction set for the sequence generating the PRACH preamble.

6. The UE of claim 1, wherein a format of the DCI is one of:
a DCI format 0_0;
a DCI format 0_1;
a DCI format 1_0;
a DCI format 1_1; or
a new DCI format.

7. A base station (BS) in a wireless communication system supporting a shared spectrum channel access, the BS comprising:

at least one processor configured to determine time domain resource allocation information of a random access channel (RACH) occasion and channel sensing information, wherein the time domain resource allocation information includes at least one of:
a slot offset between a slot including downlink control information (DCI) and a slot including the RACH occasion;
an orthogonal frequency division multiplexing (OFDM) symbol offset between a first symbol of the slot including the RACH occasion and a first symbol of the RACH occasion; or
a number of time division multiplexed RACH (TDMed RACH) occasions within the slot including the RACH occasion; and at least one transceiver operably connected to the at least one processor, the at least one transceiver configured to:
transmit, to a user equipment (UE), a physical downlink control channel (PDCCH) including the DCI, wherein the DCI includes the time domain resource allocation information of the RACH occasion and the channel sensing information; and
receive, from the UE, a physical random access channel (PRACH) preamble over an uplink (UL) channel based on the time domain resource allocation information and a status of the UL channel, wherein channel sensing on the UL channel is performed, by the UE, based on the channel sensing information, and the status of the UL channel is determined, by the UE, based on a result of the channel sensing on the UL channel.

8. The BS of claim 7, wherein the channel sensing information includes a type of channel sensing comprising one of:
a first type with no channel sensing;
a second type with fixed channel sensing duration; or
a third type with variable channel sensing duration.

9. The BS of claim 7, wherein the at least one processor is further configured to determine at least one of:
frequency domain resource allocation information of the RACH occasion;
a PRACH format associated with the PRACH preamble; or
information of a sequence generating the PRACH preamble.

10. The BS of claim 9, wherein the frequency domain resource allocation information of the RACH occasion includes at least one of:
a carrier indicator;
a bandwidth part (BWP) indicator;
a number of frequency division multiplexed RACH (FDMed RACH) occasions within a BWP including the RACH occasion; or
an indication of resource blocks (RB) for the RACH occasion in the BWP including the RACH occasion.

11. The BS of claim 9, wherein the information of a sequence generating the PRACH preamble includes at least one of:
- a root index of the sequence generating the PRACH preamble;
- a cyclic shift applied to the sequence generating the PRACH preamble; or
- a type of restriction set for the sequence generating the PRACH preamble.

12. The BS of claim 7, wherein a format of the DCI is one of:
- a DCI format 0_0;
- a DCI format 0_1;
- a DCI format 1_0;
- a DCI format 1_1; or
- a new DCI format.

13. A method of user equipment (UE) in a wireless communication system supporting a shared spectrum channel access, the method comprising:
- receiving, from a base station (BS), a physical downlink control channel (PDCCH) including downlink control information (DCI);
- determining, based on the received DCI, time domain resource allocation information of a random access channel (RACH) occasion and channel sensing information, wherein the time domain resource allocation information includes at least one of:
  - a slot offset between a slot including the DCI and a slot including the RACH occasion;
  - an orthogonal frequency division multiplexing (OFDM) symbol offset between a first symbol of the slot including the RACH occasion and a first symbol of the RACH occasion; or
  - a number of time division multiplexed RACH (TDMed RACH) occasions within the slot including the RACH occasion;
- performing channel sensing on an uplink (UL) channel based on the determined channel sensing information;
- identifying a status of the UL channel based on a result of the channel sensing on the UL channel; and
- transmitting, to the BS, a physical random access channel (PRACH) preamble over the UL channel based on the determined time domain resource allocation information and the identified status of the UL channel.

14. The method of claim 13, wherein the channel sensing information includes a type of channel sensing comprising one of:
- a first type with no channel sensing;
- a second type with fixed channel sensing duration; or
- a third type with variable channel sensing duration.

15. The method of claim 13, further comprising determining at least one of:
- frequency domain resource allocation information of the RACH occasion;
- a PRACH format associated with the PRACH preamble; or
- information of a sequence generating the PRACH preamble.

16. The method of claim 15, wherein the frequency domain resource allocation information of the RACH occasion includes at least one of:
- a carrier indicator;
- a bandwidth part (BWP) indicator;
- a number of frequency division multiplexed RACH (FDMed RACH) occasions within a BWP including the RACH occasion; or
- an indication of resource blocks (RB) for the RACH occasion in the BWP including the RACH occasion.

17. The method of claim 15, wherein the information of a sequence generating the PRACH preamble includes at least one of:
- a root index of the sequence generating the PRACH preamble;
- a cyclic shift applied to the sequence generating the PRACH preamble; or
- a type of restriction set for the sequence generating the PRACH preamble, and wherein a format of the DCI is one of:
- a DCI format 0_0;
- a DCI format 0_1;
- a DCI format 1_0;
- a DCI format 1_1; or
- a new DCI format.

* * * * *